(12) United States Patent
Shimizu et al.

(10) Patent No.: US 11,429,017 B2
(45) Date of Patent: Aug. 30, 2022

(54) PROJECTION APPARATUS

(71) Applicant: FUJIFILM Corporation, Tokyo (JP)

(72) Inventors: Hitoshi Shimizu, Saitama (JP);
Takeharu Omata, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/243,761

(22) Filed: Apr. 29, 2021

(65) Prior Publication Data
US 2021/0247682 A1    Aug. 12, 2021

Related U.S. Application Data

(63) Continuation of application No. PCT/JP2019/040643, filed on Oct. 16, 2019.

(30) Foreign Application Priority Data

Nov. 13, 2018    (JP) .............................. JP2018-213323

(51) Int. Cl.
*G03B 21/30* (2006.01)
*G03B 21/14* (2006.01)
*H04N 9/31* (2006.01)

(52) U.S. Cl.
CPC ........... *G03B 21/30* (2013.01); *G03B 21/145* (2013.01); *H04N 9/3155* (2013.01)

(58) Field of Classification Search
CPC .... G03B 21/30; G03B 21/142; G03B 21/145; H04N 9/3141; H04N 9/3155; H04N 9/3158; H04N 9/3185
See application file for complete search history.

(56) References Cited

U.S. PATENT DOCUMENTS 5,639,152 A * 6/1997 Nelson ................ G03B 21/132
353/119
5,692,821 A * 12/1997 Rodriguez, Jr. ........ F21V 29/77
353/52
(Continued)

FOREIGN PATENT DOCUMENTS

CN    1849554 A    10/2008
CN    101676793 A    3/2010
(Continued)

OTHER PUBLICATIONS

International Preliminary Report on Patentability and Written Opinion of the International Searching Authority (Forms PCT/IB/326, PCT/IB/373 and PCT/ISA/237) for corresponding International Application No. PCT/JP2019/040643, dated May 27, 2021, with English translation.

(Continued)

*Primary Examiner* — Sultan Chowdhury
(74) *Attorney, Agent, or Firm* — Birch, Stewart, Kolasch & Birch, LLP

(57) ABSTRACT

An object of the present invention is to provide a projection apparatus capable of appropriately performing control relating to rotation of the projection lens. A projection apparatus according to a first aspect of the present invention includes a housing; a power supply; and a projection lens attached to the housing, the projection lens having a holder and a locking mechanism unit that brings rotation of the holder into a locked state or an unlocked state. Rotation of the holder is in the locked state when the power supply has been turned on. With the first aspect, since the power is turned on in a state in which the projection lens is not rotatable, the locked state can be safely unlocked by user's intention and the holder can be rotated.

19 Claims, 66 Drawing Sheets

(56) References Cited

U.S. PATENT DOCUMENTS

| | | | |
|---|---|---|---|
| 11,194,235 B2* | 12/2021 | Amano | G02B 7/021 |
| 2002/0154278 A1 | 10/2002 | Masuda | |
| 2005/0105063 A1 | 5/2005 | Kitabayashi | |
| 2009/0086173 A1* | 4/2009 | Combs | G03B 21/134 |
| | | | 353/122 |
| 2010/0195063 A1* | 8/2010 | Fujimaki | G03B 5/04 |
| | | | 353/101 |
| 2015/0022789 A1 | 1/2015 | Sato | |
| 2016/0252802 A1* | 9/2016 | Yamaguchi | H04N 9/3141 |
| | | | 353/43 |
| 2017/0293210 A1 | 10/2017 | Shimizu | |
| 2018/0091786 A1 | 3/2018 | Sato | |
| 2018/0335811 A1 | 11/2018 | Mori | |
| 2019/0219802 A1 | 7/2019 | Kuroda | |
| 2019/0219915 A1 | 7/2019 | Kayano | |
| 2020/0292923 A1 | 9/2020 | Amano et al. | |

FOREIGN PATENT DOCUMENTS

| | | |
|---|---|---|
| JP | 2002-365725 A | 12/2002 |
| JP | 2006-23381 A | 1/2006 |
| JP | 2008-191196 A | 8/2008 |
| JP | 2014-71193 A | 1/2015 |
| JP | 2015-11324 A | 1/2015 |
| JP | 2018-194700 A | 12/2018 |
| WO | WO 2012/085990 A1 | 6/2012 |
| WO | WO 2018/055963 A1 | 3/2018 |
| WO | WO 2018/055964 A1 | 3/2018 |
| WO | WO 2019/107413 A1 | 6/2019 |

OTHER PUBLICATIONS

International Search Report (Form PCT/ISA/210) for corresponding International Application No. PCT/JP2019/040643, dated Dec. 24, 2019.

Japanese Decision to Grant a Patent for Japanese Application No. 2018-213323, dated Dec. 11, 2019, with English translation.

Japanese Notice of Reasons for Refusal for Japanese Application No. 2018-213323, dated Sep. 6, 2019, with English translation.

Chinese Office Action and Search Report for corresponding Chinese Application No. 201980074735.X, dated Dec. 6, 2021, with an English translation.

* cited by examiner

FIG. 50
(a) 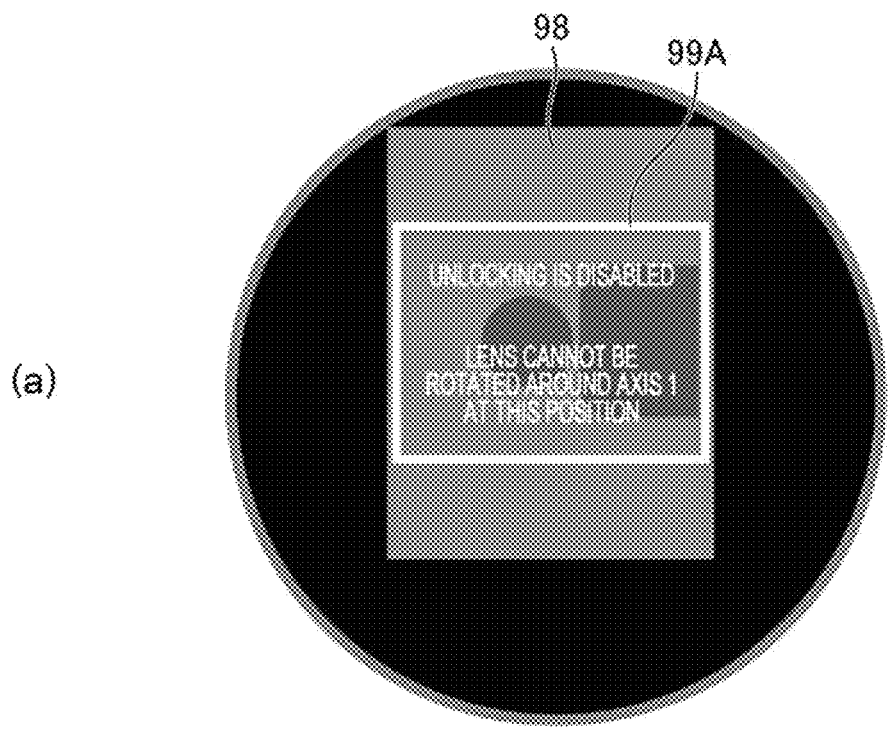
(b) 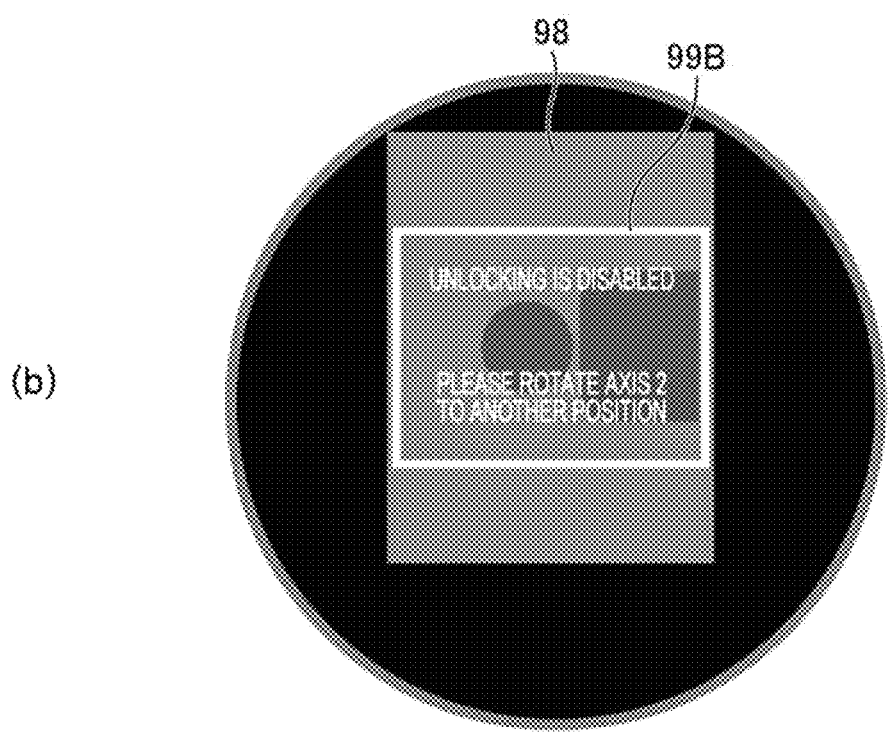

FIG. 56
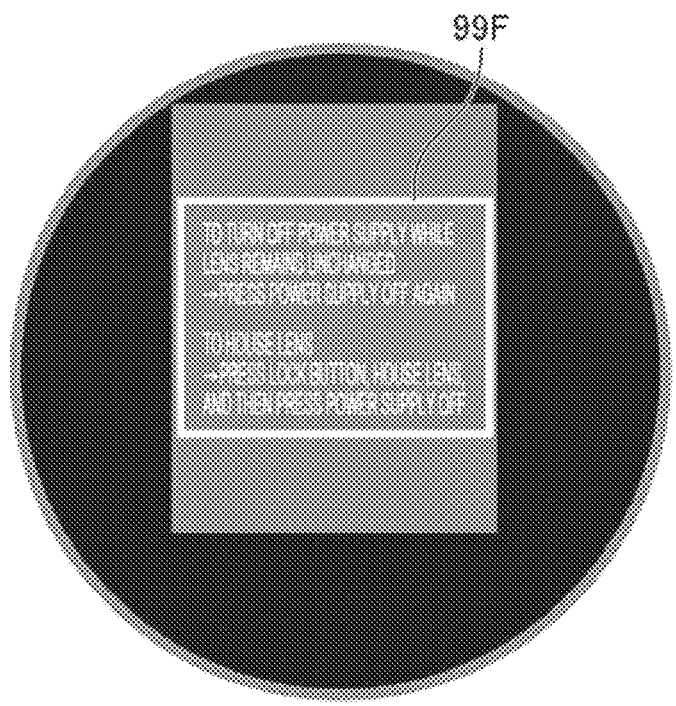
(a)
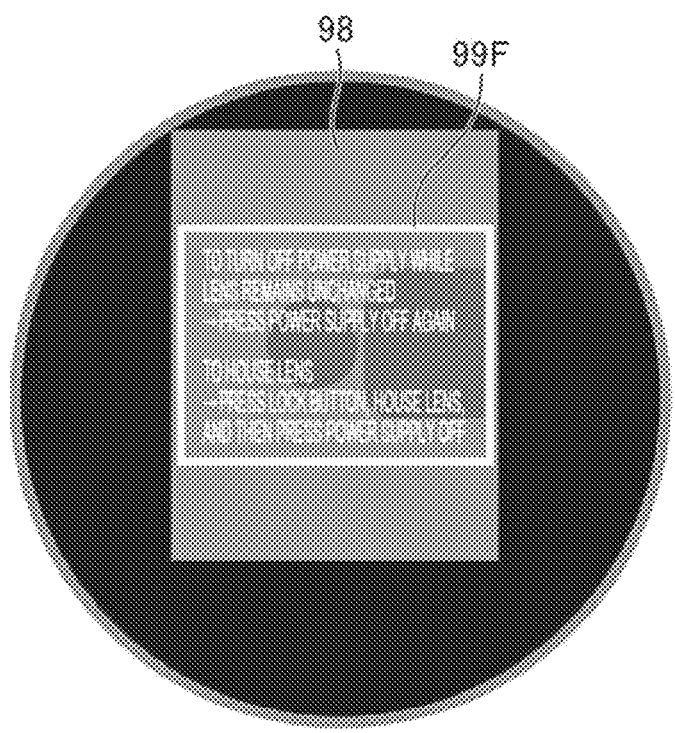
(b)

FIG. 59
| LENS POSTURE NO. | 2 |
|---|---|
| IMAGE ANGLE WHEN VIEWED IN PROJECTION DIRECTION | 0° |
| WITHOUT IMAGE INPUT | 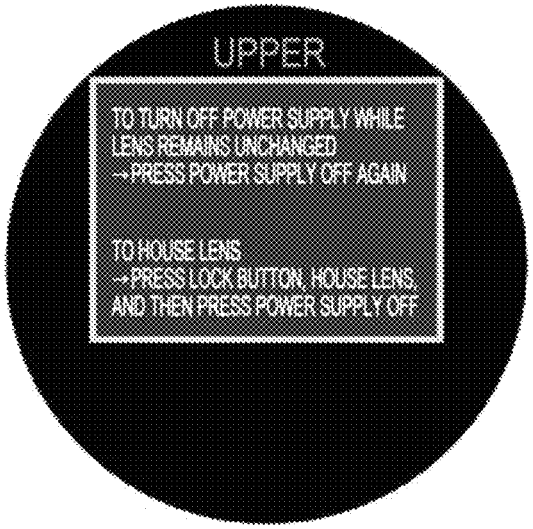 |
| CORRECTION ANGLE OF OSD IMAGE | 0° |
| WITH IMAGE INPUT |  |
| CORRECTION ANGLE OF PROJECTION IMAGE | 0° |
| CORRECTION ANGLE OF OSD IMAGE | 0° |

FIG. 60
| LENS POSTURE NO. | 5 |
|---|---|
| IMAGE ANGLE WHEN VIEWED IN PROJECTION DIRECTION | 90° |
| WITHOUT IMAGE INPUT | 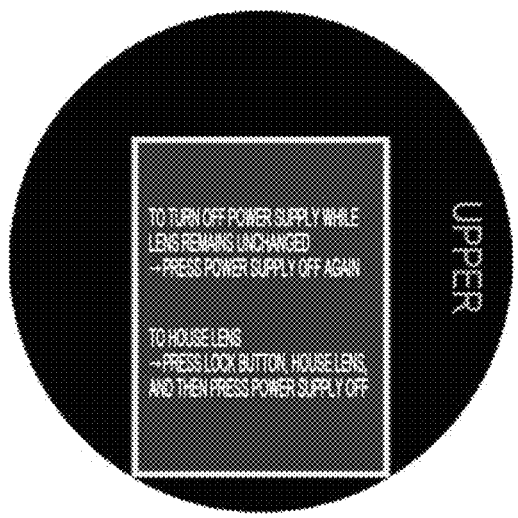 |
| CORRECTION ANGLE OF OSD IMAGE | 270° |
| WITH IMAGE INPUT | 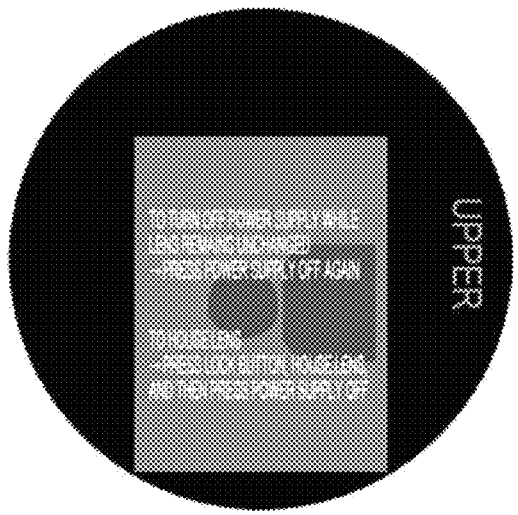 |
| CORRECTION ANGLE OF PROJECTION IMAGE | 0° |
| CORRECTION ANGLE OF OSD IMAGE | 270° |

FIG. 61
| LENS POSTURE NO. | 8 |
|---|---|
| IMAGE ANGLE WHEN VIEWED IN PROJECTION DIRECTION | 180° |
| WITHOUT IMAGE INPUT |  |
| CORRECTION ANGLE OF OSD IMAGE | 180° |
| WITH IMAGE INPUT |  |
| CORRECTION ANGLE OF PROJECTION IMAGE | 180° |
| CORRECTION ANGLE OF OSD IMAGE | 180° |

FIG. 62

| LENS POSTURE NO. | 11 |
|---|---|
| IMAGE ANGLE WHEN VIEWED IN PROJECTION DIRECTION | 270° |
| WITHOUT IMAGE INPUT | |
| CORRECTION ANGLE OF OSD IMAGE | 90° |
| WITH IMAGE INPUT | |
| CORRECTION ANGLE OF PROJECTION IMAGE | 0° |
| CORRECTION ANGLE OF OSD IMAGE | 90° |

FIG. 64

| LENS POSTURE NO. | 2 | 5 | 8 | 11 |
|---|---|---|---|---|
| IMAGE ANGLE WHEN VIEWED IN PROJECTION DIRECTION | 0° | 90° | 180° | 270° |
| FIRST CORRECTION MODE | (UPPER) | (UPPER) | (UPPER) | (UPPER) |
| CORRECTION ANGLE OF PROJECTION IMAGE | 0° | 0° | 180° | 0° |
| SECOND CORRECTION MODE | (UPPER) | (UPPER) | (UPPER) | (UPPER) |
| CORRECTION ANGLE OF PROJECTION IMAGE | 0° | 180° | 180° | 0° |

FIG. 67
| LENS POSTURE NO. | SCHEMATIC DIAGRAM |
|---|---|
| 2 | 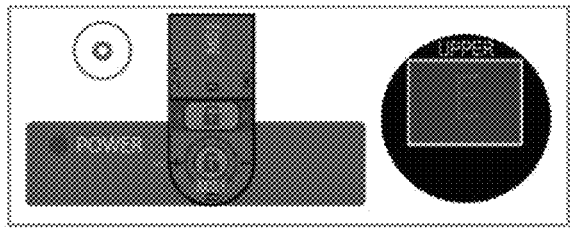 |
| 3 | 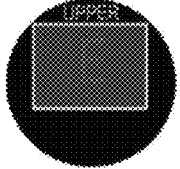 |
| 4 | 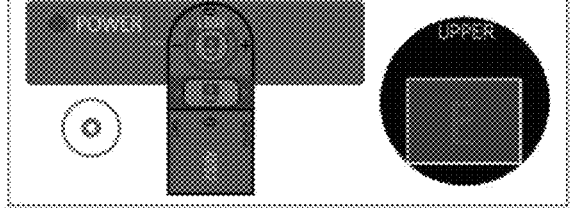 |
| 5 | 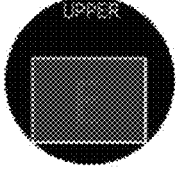 |
| 6 | 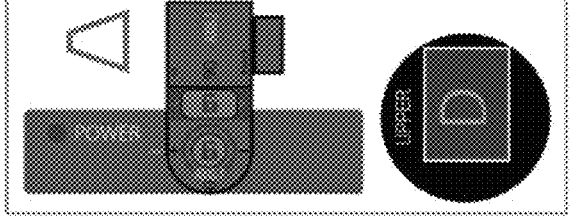 |

FIG. 68

| LENS POSTURE NO. | SCHEMATIC DIAGRAM |
|---|---|
| 7 | |
| 8 | |
| 9 | |
| 10 | |
| 11 | |
| 12 | |

FIG. 69
| LENS POSTURE NO. | SCHEMATIC DIAGRAM |
|---|---|
| 2 | 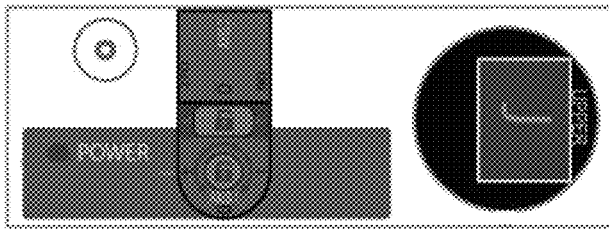 |
| 3 | 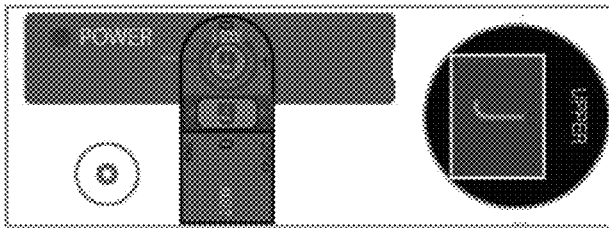 |
| 4 | 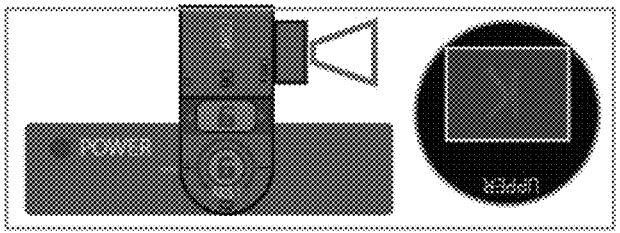 |
| 5 | 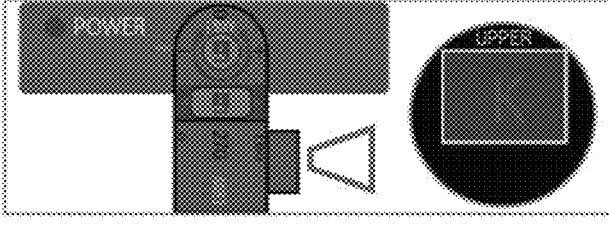 |
| 6 | 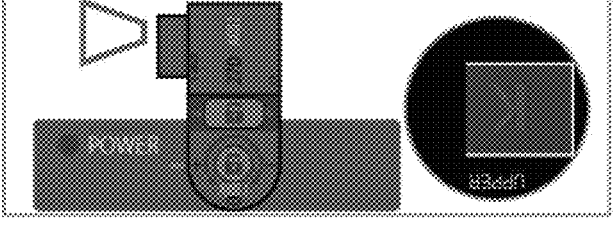 |

FIG. 70

| LENS POSTURE NO. | SCHEMATIC DIAGRAM |
|---|---|
| 7 | |
| 8 | |
| 9 | |
| 10 | |
| 11 | |
| 12 | |

[POSITION OF PROJECTION LENS WITH RESPECT TO MAIN BODY]

FIG. 72
[MAIN BODY IN FRONT IN PROJECTION DIRECTION]
(A)
yes
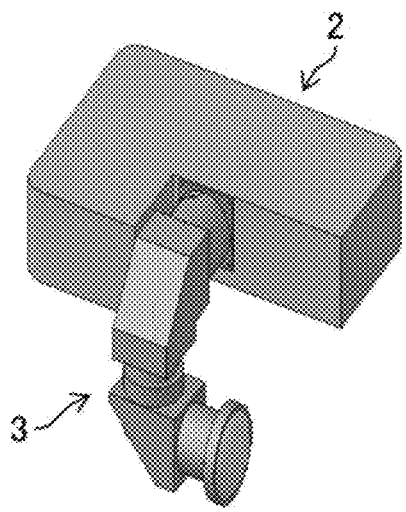
(B)
yes
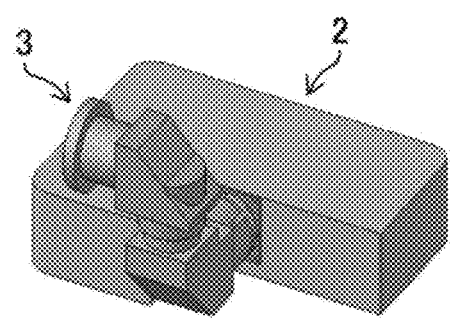
(C)
no
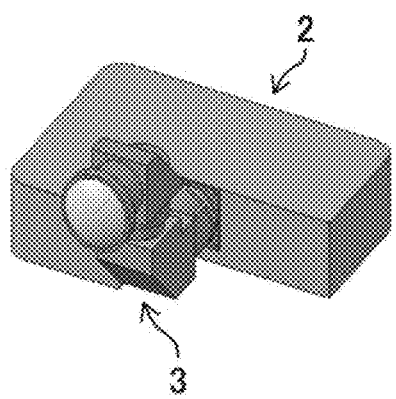

FIG. 73
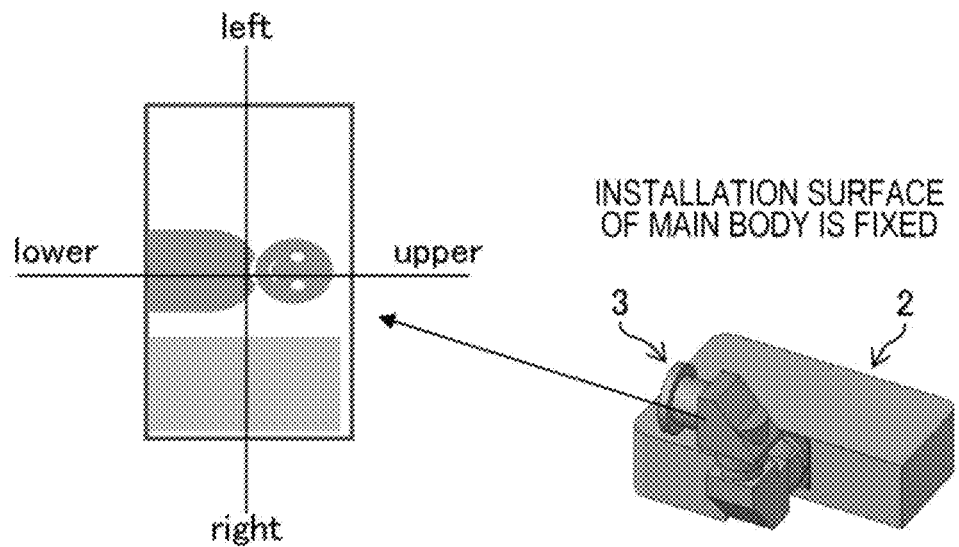
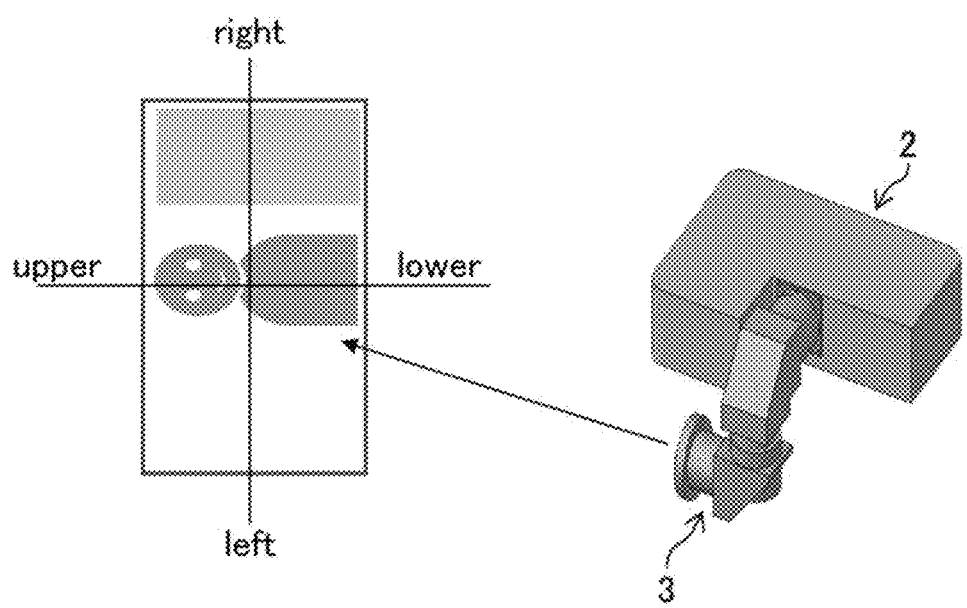

FIG. 75A

| ROTATION STATE NO. | FIGURE NO. (INSTALLATION STATE) | from Upper side | from Front side | PROJECTION IMAGE | FIRST ANGLE (°) | SECOND ANGLE (°) | MAIN BODY POSTURE |
|---|---|---|---|---|---|---|---|
| 1 | 7 | | | | 90 | 0 | HORIZONTALLY PLACED |
| 2 | 8 | | | | 0 | 0 | HORIZONTALLY PLACED |
| 3 | 9 | | | | 180 | 0 | HORIZONTALLY PLACED |
| 4 | 10 | | | | 0 | 90 | HORIZONTALLY PLACED |
| 5 | 11 | | | | 180 | 270 | HORIZONTALLY PLACED |
| 6 | 12 | | | | 0 | 270 | HORIZONTALLY PLACED |

FIG. 75B

| ROTATION STATE NO. | IMAGE ANGLE WHEN VIEWED IN PROJECTION DIRECTION (°) | VERTICAL/ HORIZONTAL DISPLAY OF IMAGE | PROJECTION LENS POSITION WITH RESPECT TO MAIN BODY | MAIN BODY IN FRONT IN PROJECTION DIRECTION | EXPECTED PROJECTION DIRECTION | SHIFT CORRECTION DIRECTION (PROJECTION) (IMAGE BASIS) | SHIFT AMOUNT | IMAGE ROTATION CORRECTION PROJECTION IMAGE (°) | OSD (°) |
|---|---|---|---|---|---|---|---|---|---|
| 1 | 180 | – | – | – | – | – | – | – | – |
| 2 | 0 | HORIZONTAL | upper side | yes | WALL SURFACE | upper | +2.5 | – | – |
| 3 | 0 | HORIZONTAL | lower side | yes | WALL SURFACE | lower | +2.5 | – | – |
| 4 | 270 | VERTICAL | upper side | yes | WALL SURFACE | right | +2.5 | – | 90 |
| 5 | 90 | VERTICAL | lower side | yes | WALL SURFACE | right | +2.5 | – | 270 |
| 6 | 90 | VERTICAL | upper side | yes | WALL SURFACE | left | +3 | – | 270 |

FIG. 76A

| ROTATION STATE NO. | FIGURE NO. (INSTALLATION STATE) | from Upper side | from Front side | PROJECTION IMAGE | FIRST ANGLE (°) | SECOND ANGLE (°) | MAIN BODY POSTURE |
|---|---|---|---|---|---|---|---|
| 7 | 13 | | | | 180 | 90 | HORIZONTALLY PLACED |
| 8 | 14 | | | | 0 | 180 | HORIZONTALLY PLACED |
| 9 | 15 | | | | 180 | 180 | HORIZONTALLY PLACED |
| 10 | 16 | | | | 90 | 180 | HORIZONTALLY PLACED |
| 11 | 17 | | | | 90 | 270 | HORIZONTALLY PLACED |
| 12 | 18 | | | | 90 | 90 | HORIZONTALLY PLACED |

FIG. 76B

| ROTATION STATE NO. | IMAGE ANGLE WHEN VIEWED IN PROJECTION DIRECTION (°) | VERTICAL/ HORIZONTAL DISPLAY OF IMAGE | PROJECTION LENS POSITION WITH RESPECT TO MAIN BODY | MAIN BODY IN FRONT IN PROJECTION DIRECTION | EXPECTED PROJECTION DIRECTION | SHIFT CORRECTION DIRECTION (PROJECTION IMAGE BASIS) | SHIFT AMOUNT | IMAGE ROTATION CORRECTION PROJECTION IMAGE (°) | OSD (°) |
|---|---|---|---|---|---|---|---|---|---|
| 7 | 270 | VERTICAL | lower side | yes | WALL SURFACE | left | +3 | -- | 90 |
| 8 | 180 | HORIZONTAL | upper side | no | WALL SURFACE | lower | +2 | 180 | 180 |
| 9 | 180 | HORIZONTAL | lower side | no | WALL SURFACE | upper | +2 | 180 | 180 |
| 10 | 180 | HORIZONTAL | same | no | WALL SURFACE | lower | +2 | 180 | 180 |
| 11 | 270 | VERTICAL | same | no | TOP SURFACE | right | +1 | -- | 90 |
| 12 | 90 | VERTICAL | same | no | FLOOR SURFACE | right | +1 | -- | 270 |

FIG. 77A

| ROTATION STATE NO. | FIGURE NO. (INSTALLATION STATE) | from Upper side | from Front side | PROJECTION IMAGE | FIRST ANGLE (°) | SECOND ANGLE (°) | MAIN BODY POSTURE |
|---|---|---|---|---|---|---|---|
| 1 | 19 | | | | 90 | 0 | VERTICALLY PLACED |
| 2 | 20 | | | | 0 | 0 | VERTICALLY PLACED |
| 3 | 21 | | | | 180 | 0 | VERTICALLY PLACED |
| 4 | 22 | | | | 0 | 90 | VERTICALLY PLACED |
| 5 | 23 | | | | 180 | 270 | VERTICALLY PLACED |
| 6 | 24 | | | | 0 | 270 | VERTICALLY PLACED |

FIG. 77B

| ROTATION STATE NO. | IMAGE ANGLE WHEN VIEWED IN PROJECTION DIRECTION (°) | VERTICAL/ HORIZONTAL DISPLAY OF IMAGE | PROJECTION LENS POSITION WITH RESPECT TO MAIN BODY | MAIN BODY IN FRONT IN PROJECTION DIRECTION | EXPECTED PROJECTION DIRECTION | SHIFT CORRECTION DIRECTION (PROJECTION) (IMAGE BASIS) | SHIFT AMOUNT | IMAGE ROTATION CORRECTION | |
|---|---|---|---|---|---|---|---|---|---|
| | | | | | | | | PROJECTION IMAGE (°) | OSD (°) |
| 1 | 270 | — | — | — | — | — | — | — | — |
| 2 | 90 | VERTICAL | upper side | yes | FLOOR SURFACE | upper | +1.5 | — | 270 |
| 3 | 90 | VERTICAL | lower side | yes | FLOOR SURFACE | lower | +1.5 | — | 270 |
| 4 | 180 | HORIZONTAL | upper side | yes | WALL SURFACE | lower | +2.5 | 180 | 180 |
| 5 | 0 | HORIZONTAL | lower side | yes | WALL SURFACE | upper | +2.5 | — | — |
| 6 | 180 | HORIZONTAL | upper side | yes | WALL SURFACE | left | +3 | 180 | 180 |

FIG. 78A
| ROTATION STATE NO. | FIGURE NO. (INSTALLATION STATE) | from Upper side | from Front side | PROJECTION IMAGE | FIRST ANGLE | SECOND ANGLE | MAIN BODY POSTURE |
|---|---|---|---|---|---|---|---|
| 7 | 25 |  | 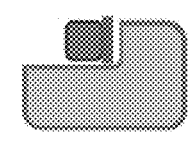 |  | 180 | 90 | VERTICALLY PLACED |
| 8 | 26 | 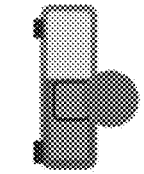 | 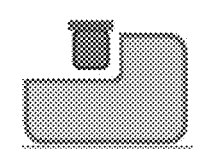 |  | 0 | 180 | VERTICALLY PLACED |
| 9 | 27 |  | 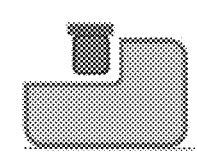 |  | 180 | 180 | VERTICALLY PLACED |
| 10 | 28 |  | 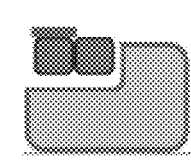 |  | 90 | 180 | VERTICALLY PLACED |
| 11 | 29 |  | 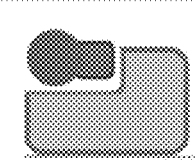 |  | 90 | 270 | VERTICALLY PLACED |
| 12 | 30 |  | 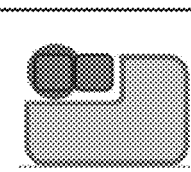 |  | 90 | 90 | VERTICALLY PLACED |

FIG. 78B

| ROTATION STATE NO. | IMAGE ANGLE WHEN VIEWED IN PROJECTION DIRECTION | VERTICAL/ HORIZONTAL DISPLAY OF IMAGE | PROJECTION LENS POSITION WITH RESPECT TO MAIN BODY | MAIN BODY IN FRONT IN PROJECTION DIRECTION | EXPECTED PROJECTION DIRECTION | SHIFT CORRECTION DIRECTION (PROJECTION IMAGE BASIS) | SHIFT AMOUNT | IMAGE ROTATION CORRECTION ||
|---|---|---|---|---|---|---|---|---|---|
| | | | | | | | | PROJECTION IMAGE (°) | OSD (°) |
| 7 | 0 | HORIZONTAL | lower side | yes | WALL SURFACE | left | +3 | – | – |
| 8 | 270 | VERTICAL | upper side | no | TOP SURFACE | lower | +1 | – | 90 |
| 9 | 270 | VERTICAL | lower side | no | TOP SURFACE | upper | +1 | – | 90 |
| 10 | 270 | VERTICAL | same | no | TOP SURFACE | left | +1 | – | 90 |
| 11 | 270 | VERTICAL | same | no | WALL SURFACE | right | +2 | – | 90 |
| 12 | 270 | VERTICAL | same | no | WALL SURFACE | right | +2 | – | 90 |

PROJECTION APPARATUS

CROSS-REFERENCE TO RELATED APPLICATIONS

The present application is a Continuation of PCT International Application No. PCT/JP2019/040643 filed on Oct. 16, 2019 claiming priority under 35 U.S.C. § 119(a) to Japanese Patent Application No. 2018-213323 filed on Nov. 13, 2018. Each of the above applications is hereby expressly incorporated by reference, in its entirety, into the present application.

BACKGROUND OF THE INVENTION

1. Field of the Invention

The present invention relates to a projection apparatus.

2. Description of the Related Art

As a projection apparatus (projector) that projects an image or the like on a screen, a wall surface, or the like, a type in which a projection direction is fixed has been used; however, a projection apparatus capable of changing a projection direction is being developed in recent years. For example, WO2018/055964A describes a projection lens and a projection apparatus capable of changing a projection direction by rotating a projection lens having a holder.

SUMMARY OF THE INVENTION

According to the technology described in WO2018/055964A, the projection lens can be rotated, but control for restricting a rotation state and other control relating to a rotation state are not considered.

The present invention is made in light of the situation and an object of the invention is to provide a projection apparatus capable of appropriately performing control relating to rotation of a projection lens.

In order to achieve the above-described object, a projection apparatus according to a first aspect of the present invention includes a housing; a power supply; and a projection lens attached to the housing, the projection lens having a holder and a locking mechanism unit that brings rotation of the holder into a locked state or an unlocked state. Rotation of the holder is in the locked state when the power supply has been turned on. With the first aspect, since the power is turned on in a state in which the projection lens is not rotatable, the locked state can be safely unlocked by user's intention and the holder can be rotated. That is, with the first aspect, it is possible to appropriately perform control relating to the rotation of the projection lens.

In a projection apparatus according to a second aspect, based on the first aspect, the locking mechanism unit has a moving portion configured to be movable and an urging portion that urges the moving portion; the moving portion moves in the locking mechanism unit to switch rotation of the holder between the locked state and the unlocked state; and, when the power supply has been turned off with rotation of the holder being in the locked state, the urging portion urges the moving portion to a position of the locked state such that rotation of the holder is in the locked state when the power supply has been turned on. The second aspect presents an example of a configuration for implementing that "rotation of the holder is in the locked state when the power has been turned on".

In a projection apparatus according to a third aspect, based on the second aspect, the locking mechanism unit has a groove; and the moving portion moves in the groove to switch rotation of the holder between the locked state and the unlocked state.

In a projection apparatus according to a fourth aspect, based on any one of the first to third aspects, the power supply is not turned off when an instruction to turn off the power supply has been input and the locking mechanism unit is not able to bring rotation of the holder into the locked state. With the third aspect, the power supply is not turned off when the rotation of the holder cannot be brought into the locked state. Thus, the power supply can be turned on and off in the locked state of the rotating portion.

A projection apparatus according to a fifth aspect, based on any one of the first to fourth aspects, further includes a light source.

A projection apparatus according to a sixth aspect, based on the fifth aspect, further includes an unlocking switch that unlocks the locked state. The light source is turned on when the unlocking switch has been input. Since it is considered that the user is preparing to use the projection apparatus such as changing the rotation state or setting the projection direction when the unlocking switch is input, the light source may be turned on when the unlocking switch has been input.

A projection apparatus according to a seventh aspect, based on the fifth or sixth aspect, further includes a light source control unit that controls the light source; and an emission optical system that is provided in the projection lens and that emits light from the light source. The projection lens is displaceable between a first position at which the emission optical system faces the housing and a second position other than the first position by rotation of the holder. When the power supply has been turned on, the light source control unit does not turn on the light source when the projection lens is at the first position, and turns on the light source when the projection lens is at the second position. When the light source is turned on in the state in which the projection lens is in the state at the first position, emitted light hits the housing, the temperature increases, and there is a concern that the increase in temperature adversely affects the operation of the projection apparatus. However, by controlling the light source like the seventh aspect, it is possible to prevent such an adverse effect. In each aspect of the present invention, the final lens group (the lens group farthest from the light source) or an optical system including the final lens group can be treated as an "emission optical system".

In a projection apparatus according to an eighth aspect, based on the projection apparatus according to any one of the first to seventh aspects, the holder has a second holder and a third holder; the locking mechanism unit has a first locking mechanism unit that brings rotation of the second holder into a locked state or an unlocked state, and a second locking mechanism unit that brings rotation of the third holder into a locked state or an unlocked state; and, when one of the second holder and the third holder is in an unlocked state, the locking mechanism unit brings the other into a locked state. With the eighth aspect, since the second and third holders are not simultaneously brought into the unlocked states and do not simultaneously rotate, it is possible to prevent the projection lens from rotating unexpectedly.

In a projection apparatus according to a ninth aspect, based on any one of the first to eighth aspects, the power supply is not turned on when an instruction to turn on the power supply has been input and the locking mechanism unit is in the unlocked state.

In a projection apparatus according to a tenth aspect, based on any one of the first to ninth aspects, the holder includes a first holder that is connected to the housing and through which light of a first optical axis passes, and a second holder through which light of a second optical axis obtained by bending light of the first optical axis passes. The second holder rotates with respect to the housing. The locking mechanism unit brings rotation of the second holder into the locked state or the unlocked state.

In a projection apparatus according to an eleventh aspect, based on any one of the first to tenth aspects, in the unlocked state, the user can perform a rotation operation of the holder.

As described above, according to the projection apparatus of the present invention, it is possible to appropriately perform the control relating to the rotation of the projection lens.

BRIEF DESCRIPTION OF THE DRAWINGS

FIG. 50 is a display example for making a notification of the reason why unlocking of the holders is disabled and an unlocking method;

FIG. 56 is a view illustrating an example of an OSD image when the power supply is turned off;

FIG. 59 is a table illustrating a projection image and an OSD image when the projection lens is in a lens posture No. 2;

FIG. 60 is a table illustrating a projection image and an OSD image when the projection lens is in a lens posture No. 5;

FIG. 61 is a table illustrating a projection image and an OSD image when the projection lens is in a lens posture No. 8;

FIG. 62 is a table illustrating a projection image and an OSD image when the projection lens is in a lens posture No. 11;

FIG. 64 is a table summarizing rotation correction of a projection image subjected to the rotation correction;

FIG. 67 is a schematic diagram illustrating the projection apparatus and shift states of a projection image when the projection apparatus main body is horizontally placed and the lens posture numbers are Nos. 2 to 6;

FIG. 68 is a schematic diagram illustrating the projection apparatus and shift states of a projection image when the projection apparatus main body is horizontally placed and the lens posture numbers are Nos. 7 to 12;

FIG. 69 is a schematic diagram illustrating the projection apparatus and shift states of a projection image when the projection apparatus main body is vertically placed and the lens posture numbers are Nos. 2 to 6;

FIG. 70 is a schematic diagram illustrating the projection apparatus and shift states of a projection image when the projection apparatus main body is vertically placed and the lens posture numbers are Nos. 7 to 12;

FIG. 72 is a view relating to "lens postures" that define whether or not the projection apparatus main body exists in front in a projection direction;

FIG. 73 is a diagram defining "shift correction directions" of a projection image;

FIG. 75A is a table summarizing rotation correction and shift correction of an image when the projection apparatus main body is horizontally placed and the lens posture numbers are Nos. 2 to 6;

FIG. 75B is another table summarizing rotation correction and shift correction of an image when the projection apparatus main body is horizontally placed and the lens posture numbers are Nos. 2 to 6;

FIG. 76A is a table summarizing rotation correction and shift correction of an image when the projection apparatus main body is horizontally placed and the lens posture numbers are Nos. 7 to 12;

FIG. 76B is another table summarizing rotation correction and shift correction of an image when the projection apparatus main body is horizontally placed and the lens posture numbers are Nos. 7 to 12;

FIG. 77A is a table summarizing rotation correction and shift correction of an image when the projection apparatus main body is vertically placed and the lens posture numbers are Nos. 2 to 6;

FIG. 77B is another table summarizing rotation correction and shift correction of an image when the projection apparatus main body is vertically placed and the lens posture numbers are Nos. 2 to 6;

FIG. 78A is a table summarizing rotation correction and shift correction of an image when the projection apparatus main body is vertically placed and the lens posture numbers are Nos. 7 to 12;

FIG. 78B is another table summarizing rotation correction and shift correction of an image when the projection apparatus main body is vertically placed and the lens posture numbers are Nos. 7 to 12.

DESCRIPTION OF THE PREFERRED EMBODIMENTS

Hereinafter, embodiments for implementing a projection apparatus and a projection lens according to the present invention will be described in detail with reference to the accompanying drawings.

External Configuration of Projection Apparatus

Figure 1:
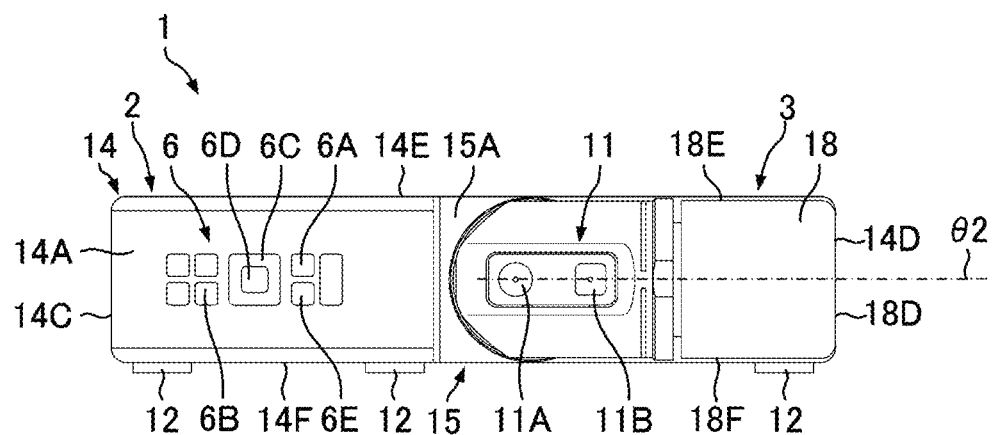
FIG. 1 is a front view of a projection apparatus.
Figure 2:
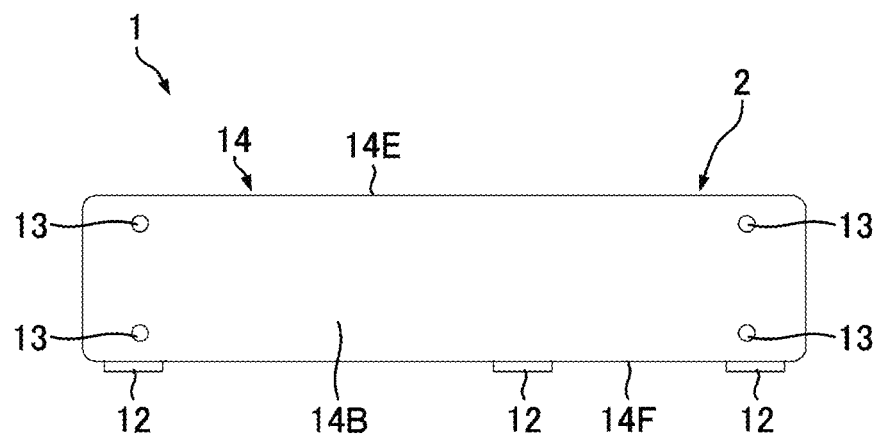
FIG. 2 is a rear view of the projection apparatus.
Figure 3:
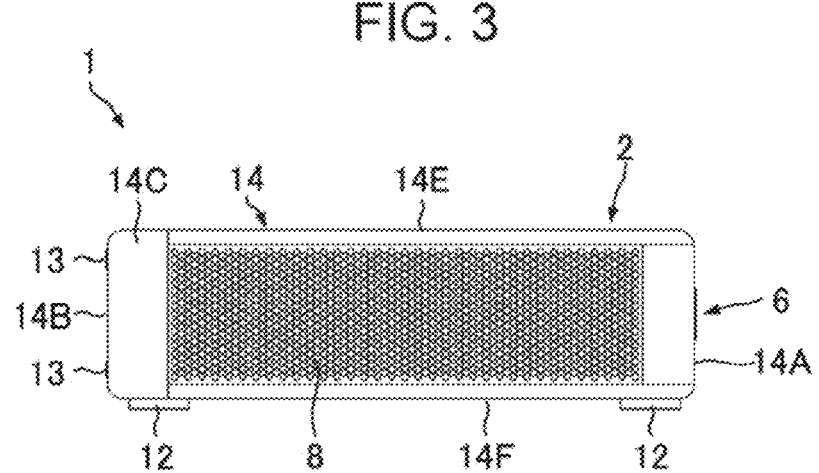
FIG. 3 is a left side view of the projection apparatus.
Figure 4:
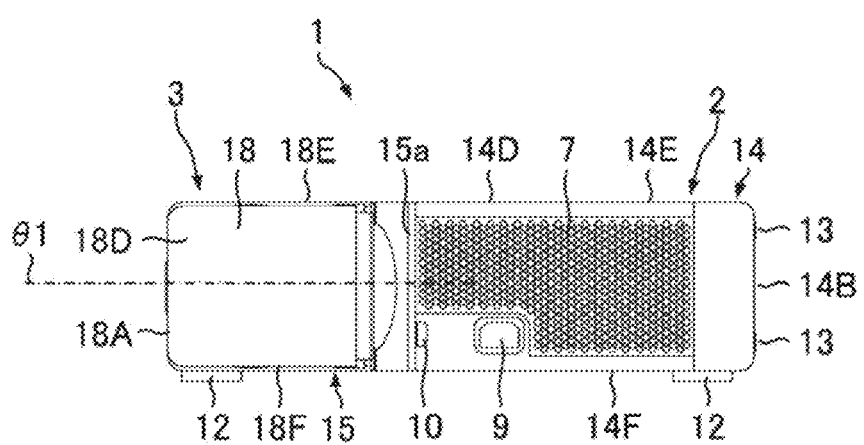
FIG. 4 is a right side view of the projection apparatus.
Figure 5:
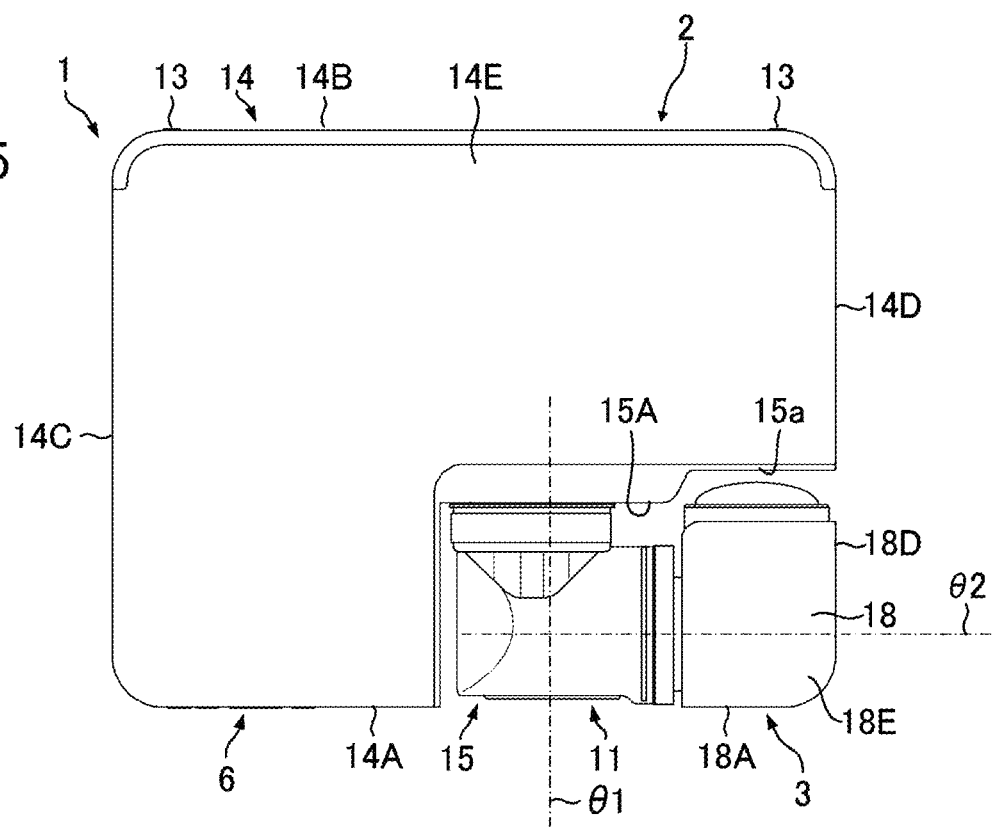
FIG. 5 is a plan view (top view) of the projection apparatus.
Figure 6:
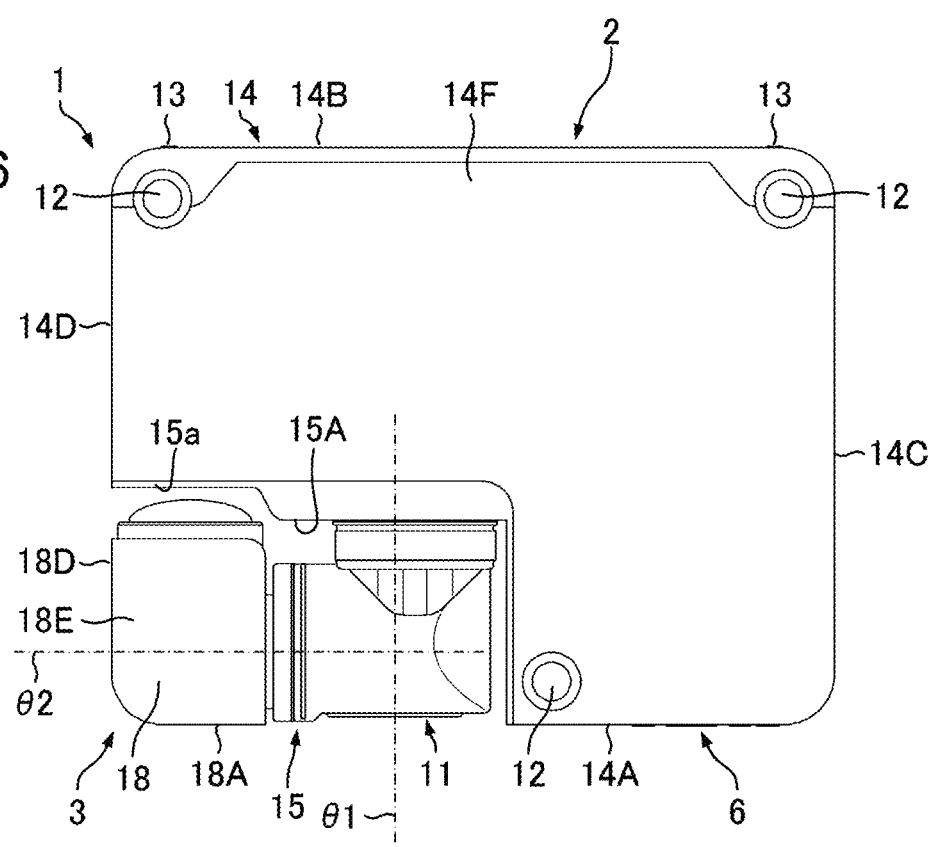
FIG. 6 is a bottom view (lower surface view) of the projection apparatus.

FIG. 1 is a front view of a projection apparatus 1. FIG. 2 is a rear view of the projection apparatus 1s. FIG. 3 is a left side view of the projection apparatus 1. FIG. 4 is a right side view of the projection apparatus 1. FIG. 5 is a plan view (top view) of the projection apparatus 1. FIG. 6 is a bottom view (lower surface view) of the projection apparatus 1.

As illustrated in FIGS. 1 to 6, a projection apparatus 1 of the present embodiment includes a projection apparatus main body 2 and a projection lens 3. The projection lens 3 is configured to be rotatable around a first rotation axis θ1 and a second rotation axis θ2, and is configured to be foldable. FIG. 5 illustrates a state (housed state) in which the projection lens 3 is folded and an emission lens portion of the projection lens 3 faces a housing 14. The projection apparatus 1 has a flat rectangular-parallelepiped shape as a whole in the housed state of the projection lens 3.

In FIG. 5, the projection apparatus main body 2 has the housing 14 and a recessed portion 15. The housing 14 has a shape obtained by cutting out one corner portion (right front corner portion) of a rectangular parallelepiped into a rectangular box shape, and has an L shape as a whole. The cut out portion of the projection apparatus main body 2 constitutes, as the recessed portion 15, a housing portion for the projection lens 3. The projection lens 3 is disposed in the recessed portion 15, and when being folded, the entire projection lens 3 is housed in the recessed portion 15. In a folded state (housed state), the projection lens 3 is disposed such that the distal end of the projection lens 3 faces an inner wall surface 15A on the front side of the recessed portion 15. The inner wall surface 15A on the front side of the recessed portion 15 includes a recess 15a. The emission lens portion protruding from the distal end of the projection lens 3 is housed in the recess 15a.

The projection lens 3 rotates around two axes (first rotation axis θ1 and second rotation axis θ2) orthogonal to each other to switch the projection direction. Thus, projection can be performed in various directions without moving the projection apparatus main body 2.

The projection lens 3 has a lens cover 18 at a distal end portion thereof. When the projection lens 3 is folded, the lens cover 18 complements the cut out corner portion of the projection apparatus main body 2. That is, a lens cover front portion 18A, a lens cover right side portion 18D, a lens cover top portion 18E, and a lens cover bottom portion 18F are positioned substantially in the same planes as a housing front portion 14A, a housing right side portion 14D, a housing top portion 14E, and a housing bottom portion 14F of the projection apparatus main body 2, respectively, and form a flat rectangular-parallelepiped shape together with the projection apparatus main body 2.

The housing front portion 14A of the projection apparatus main body 2 includes a main body operating unit 6. The main body operating unit 6 includes various operation switches, such as a power supply switch 6A, a MENU key 6B, a cross key 6C, an ENTER key 6D, and a BACK key 6E.

The housing right side portion 14D of the projection apparatus main body 2 includes an air supply portion 7 constituted of multiple punched holes. A housing left side portion 14C of the projection apparatus main body 2 includes an exhaust portion 8 constituted of multiple punched holes. In the projection apparatus main body 2, air for cooling internal devices (light source and so forth) is taken in from the air supply portion 7, passes through the inside, and is exhausted from the exhaust portion 8.

The housing right side portion 14D of the projection apparatus main body 2 includes a power supply connector 9 and a video input terminal 10. The projection apparatus 1 is supplied with electric power from the outside via a power supply cable (not illustrated) connected to the power supply connector 9. The projection apparatus 1 is supplied with video signals from an external device (personal computer or the like) via a cable (not illustrated) connected to the video input terminal 10.

The projection lens 3 includes a locking mechanism 60 for independently locking the rotation around the first rotation axis θ1 and around the second rotation axis. Details of the locking mechanism 60 will be described later. The rotation of the projection lens 3 around the first rotation axis θ1 and around the second rotation axis is normally locked by the locking mechanism. The projection lens 3 includes an unlocking operating unit 11 that unlocks the rotation around the first rotation axis θ1 and around the second rotation axis.

The unlocking operating unit 11 includes a first unlocking switch 11A and a second unlocking switch 11B. The first unlocking switch 11A unlocks the rotation around the first rotation axis θ1. The first unlocking switch 11A is constituted of a push button having a circular outer shape, and a key top thereof includes a light emitting diode (LED). When the first unlocking switch 11A is pressed, the rotation of the projection lens 3 around the first rotation axis θ1 is unlocked for a certain period (for example, 10 seconds). Hence, during this period, the projection lens 3 is free to rotate around the first rotation axis θ1. The second unlocking switch 11B unlocks the rotation of the projection lens 3 around the second rotation axis θ2. The second unlocking switch 11B is constituted of a quadrangular push button, and a key top thereof includes an LED. When the second unlocking switch 11B is pressed, the rotation of the projection lens 3 around the second rotation axis θ2 is unlocked for a certain period (for example, 10 seconds). Hence, during this period, the projection lens 3 is free to rotate around the second rotation axis θ2.

The projection apparatus main body 2 of the projection apparatus 1 of the present embodiment can be horizontally placed and vertically placed. As illustrated in FIG. 6, the housing bottom portion 14F of the projection apparatus main body 2 includes three horizontal placement leg portions 12 serving as ground portions when the projection apparatus main body 2 is horizontally placed. A housing rear portion 14B of the projection apparatus main body 2 includes four vertical placement leg portions 13 serving as ground portions when the projection apparatus main body 2 is vertically placed.

FIGS. 7 to 18 are perspective views illustrating examples of use when the projection apparatus main body is horizontally placed and used. Note that the rotation direction of the first rotation axis θ1 is based on a case viewed from the housing front portion 14A side as illustrated in FIG. 1, and the rotation direction of the second rotation axis θ2 is based on a case viewed from the housing right side portion 14D as illustrated in FIG. 4. In addition, being "horizontally placed" refers to a case where the largest surface of the housing 14 (in the present embodiment, the housing bottom portion 14F or the housing top portion 14E) intersects with the gravity direction.

Figure 7:
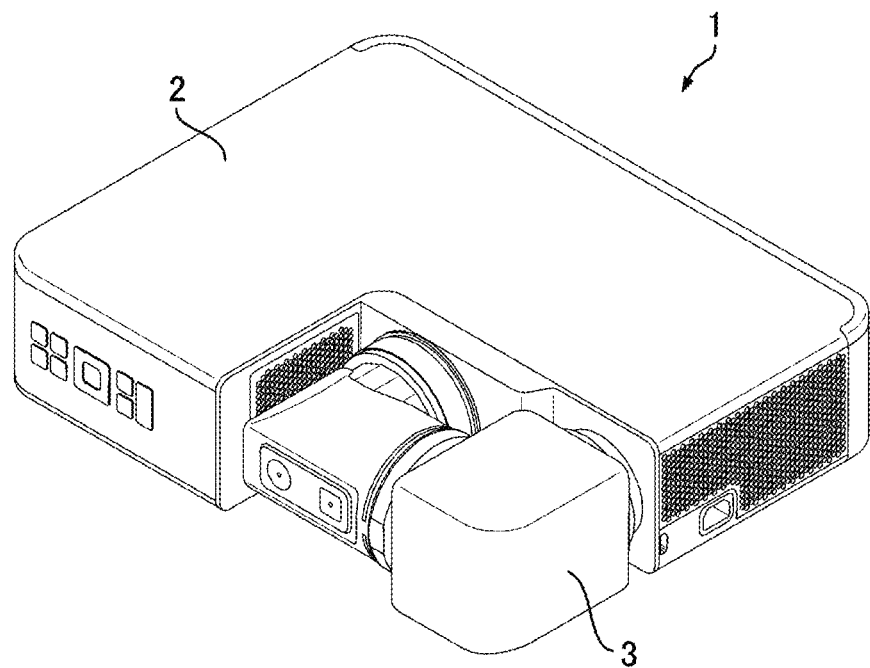
FIG. 7 is a perspective view illustrating an example of use when a projection apparatus main body is horizontally placed and used.

FIG. 7 illustrates a housed state when the projection apparatus main body 2 is horizontally placed. As illustrated in the drawing, in the housed state, the projection lens 3 is housed in the recessed portion 15 of the projection apparatus main body 2.

Figure 8:
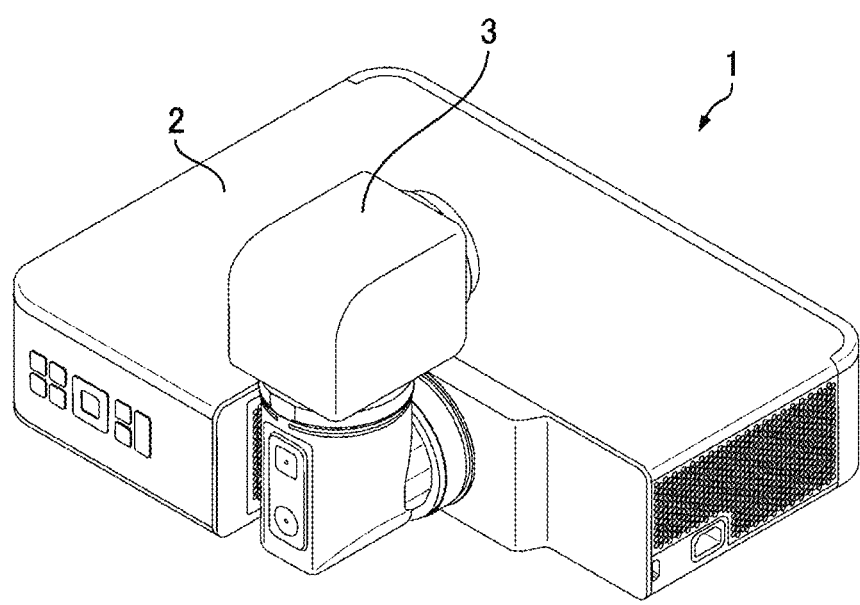
FIG. 8 is a perspective view illustrating an example of use when the projection apparatus main body is horizontally placed and used.

FIG. 8 illustrates a first mode of use in which the projection apparatus main body 2 is horizontally placed and performs projection rearward. This mode is provided by rotating the projection lens 3 counterclockwise by 90° around the first rotation axis θ1 from the housed state. In this mode, an image is projected rearward from the upper side of the projection apparatus main body 2.

Figure 9:
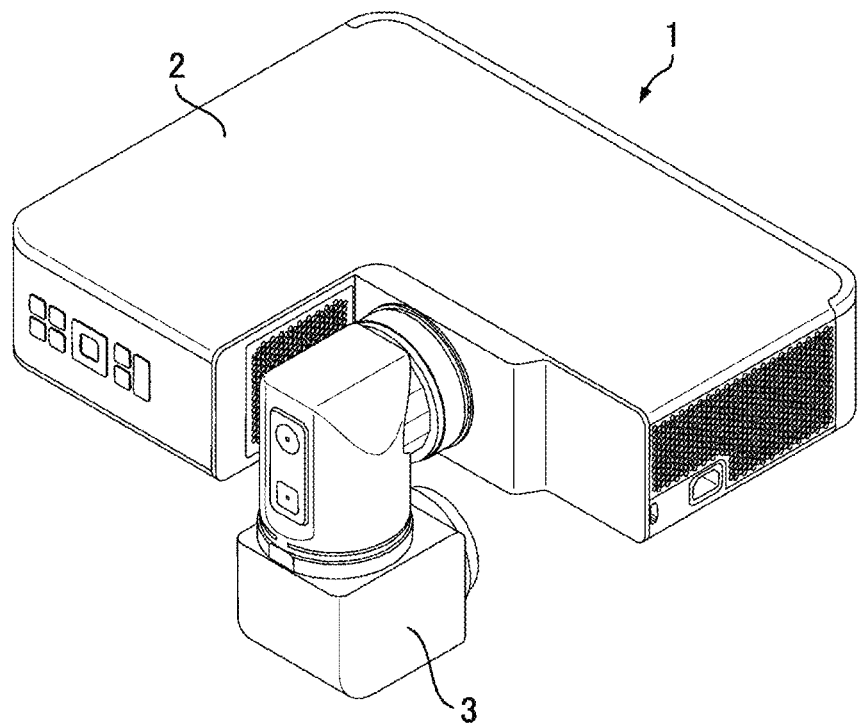
FIG. 9 is a perspective view illustrating an example of use when the projection apparatus main body is horizontally placed and used.

FIG. 9 illustrates a second mode of use in which the projection apparatus main body 2 is horizontally placed and performs projection rearward. This mode is provided by rotating the projection lens 3 clockwise by 90° around the first rotation axis θ1 from the housed state. In this mode, an image is projected rearward from the lower side of the projection apparatus main body 2.

Figure 10:
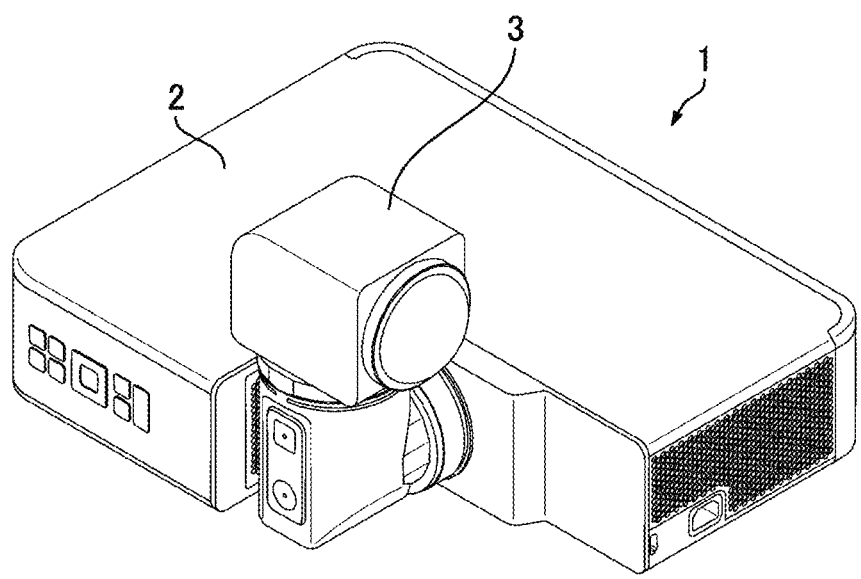
FIG. 10 is a perspective view illustrating an example of use when the projection apparatus main body is horizontally placed and used.

FIG. 10 illustrates a first mode of use in which the projection apparatus main body 2 is horizontally placed and performs projection rightward. This mode is provided by rotating the projection lens 3 counterclockwise by 90° around the first rotation axis θ1 and clockwise by 90° around the second rotation axis θ2 from the housed state. In this mode, an image is projected rightward from the upper side of the projection apparatus main body 2.

Figure 11:
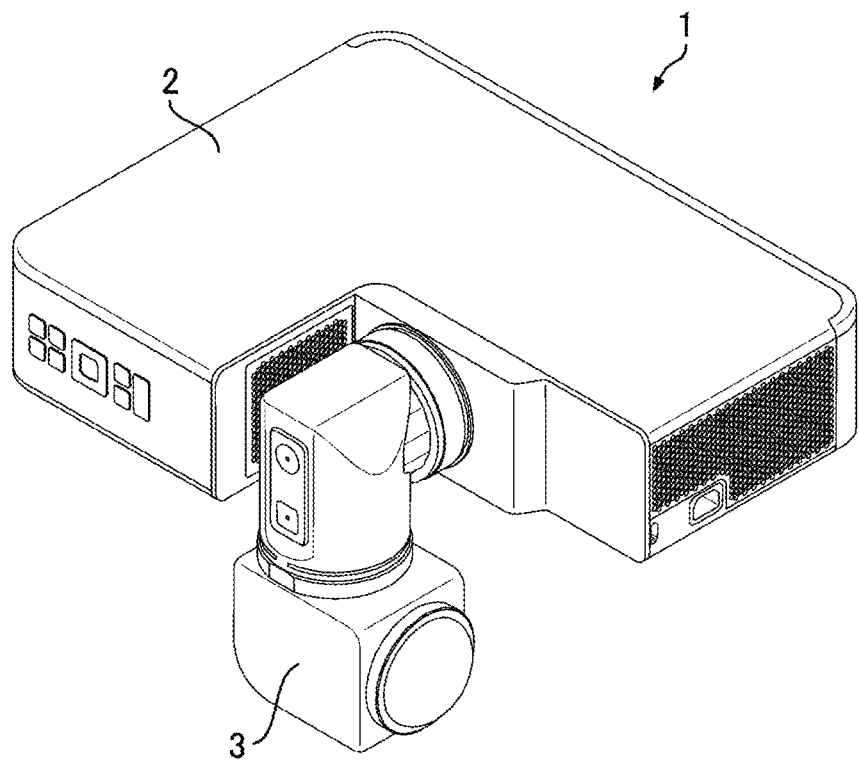
FIG. 11 is a perspective view illustrating an example of use when the projection apparatus main body is horizontally placed and used.

FIG. 11 illustrates a second mode of use in which the projection apparatus main body 2 is horizontally placed and performs projection rightward. This mode is provided by rotating the projection lens 3 clockwise by 90° around the first rotation axis θ1 and counterclockwise by 90° around the second rotation axis θ2 from the housed state. In this mode, an image is projected rightward from the lower side of the projection apparatus main body 2.

Figure 12:
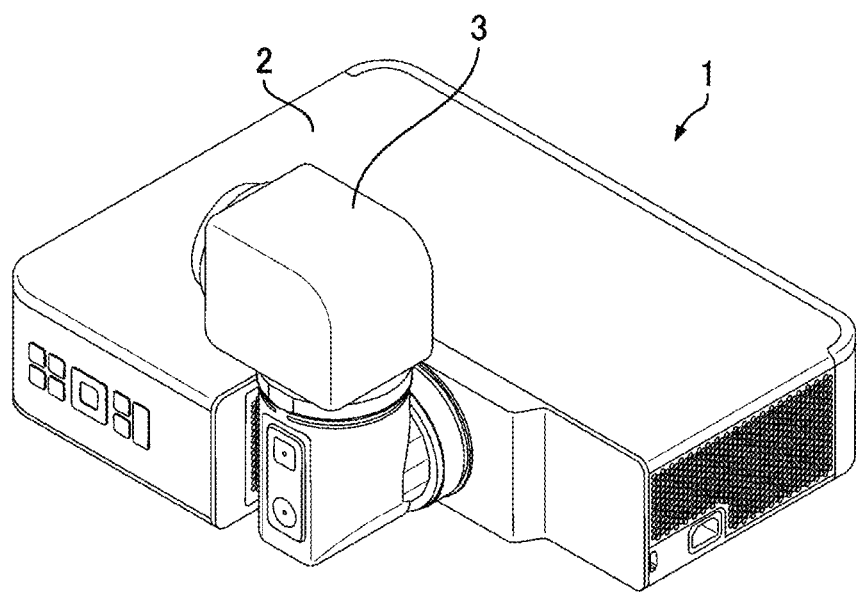
FIG. 12 is a perspective view illustrating an example of use when the projection apparatus main body is horizontally placed and used.

FIG. 12 illustrates a first mode of use in which the projection apparatus main body 2 is horizontally placed and performs projection leftward. This mode is provided by rotating the projection lens 3 counterclockwise by 90° around the first rotation axis θ1 and counterclockwise by 90° around the second rotation axis θ2 from the housed state. In this mode, an image is projected leftward from the upper side of the projection apparatus main body 2.

Figure 13:
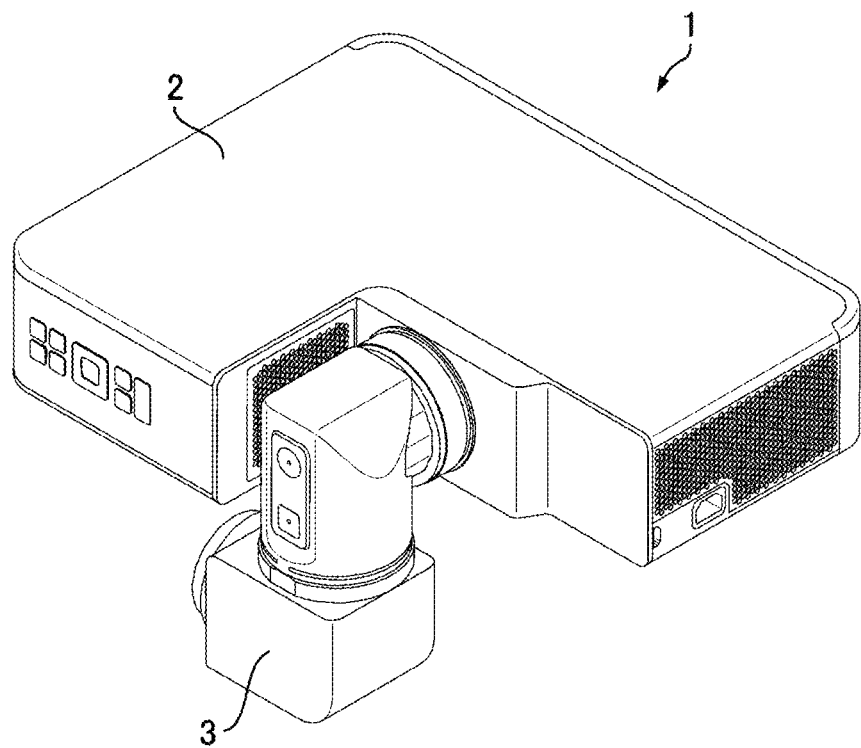
FIG. 13 is a perspective view illustrating an example of use when the projection apparatus main body is horizontally placed and used.

FIG. 13 illustrates a second mode of use in which the projection apparatus main body 2 is horizontally placed and performs projection leftward. This mode is provided by rotating the projection lens 3 clockwise by 90° around the first rotation axis θ1 and clockwise by 90° around the second rotation axis θ2 from the housed state. In this mode, an image is projected leftward from the lower side of the projection apparatus main body 2.

Figure 14:
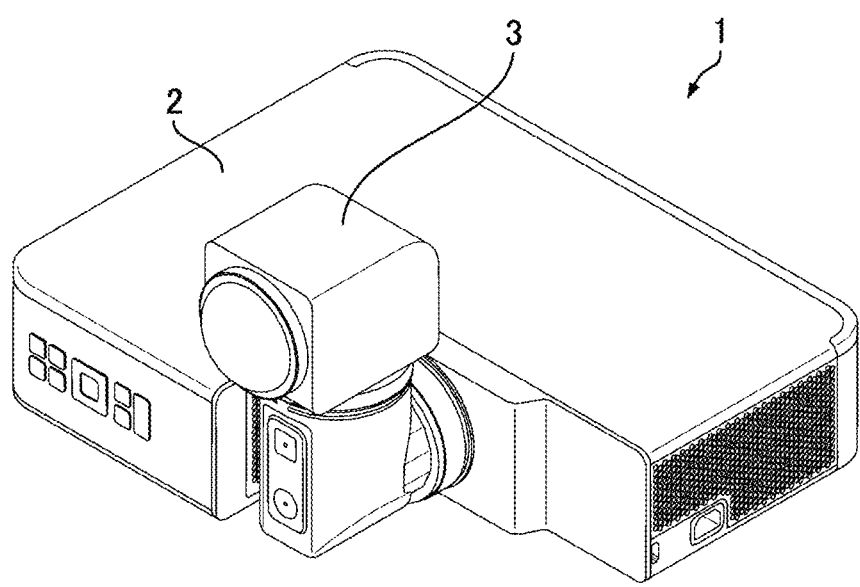
FIG. 14 is a perspective view illustrating an example of use when the projection apparatus main body is horizontally placed and used.

FIG. 14 illustrates a first mode of use in which the projection apparatus main body 2 is horizontally placed and performs projection forward. This mode is provided by rotating the projection lens 3 counterclockwise by 90° around the first rotation axis θ1 and clockwise or counterclockwise by 180° around the second rotation axis θ2 from the housed state. In this mode, an image is projected forward from the upper side of the projection apparatus main body 2.

Figure 15:
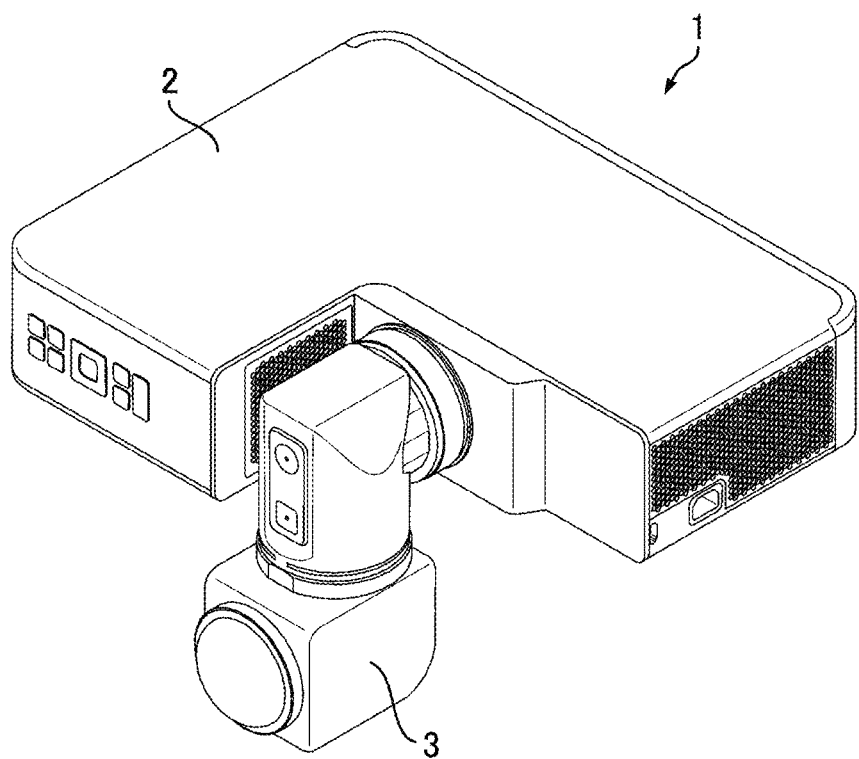
FIG. 15 is a perspective view illustrating an example of use when the projection apparatus main body is horizontally placed and used.

FIG. 15 illustrates a second mode of use in which the projection apparatus main body 2 is horizontally placed and performs projection forward. This mode is provided by rotating the projection lens 3 clockwise by 90° around the first rotation axis θ1 and clockwise or counterclockwise by 180° around the second rotation axis θ2 from the housed state. In this mode, an image is projected forward from the lower side of the projection apparatus main body 2.

Figure 16:
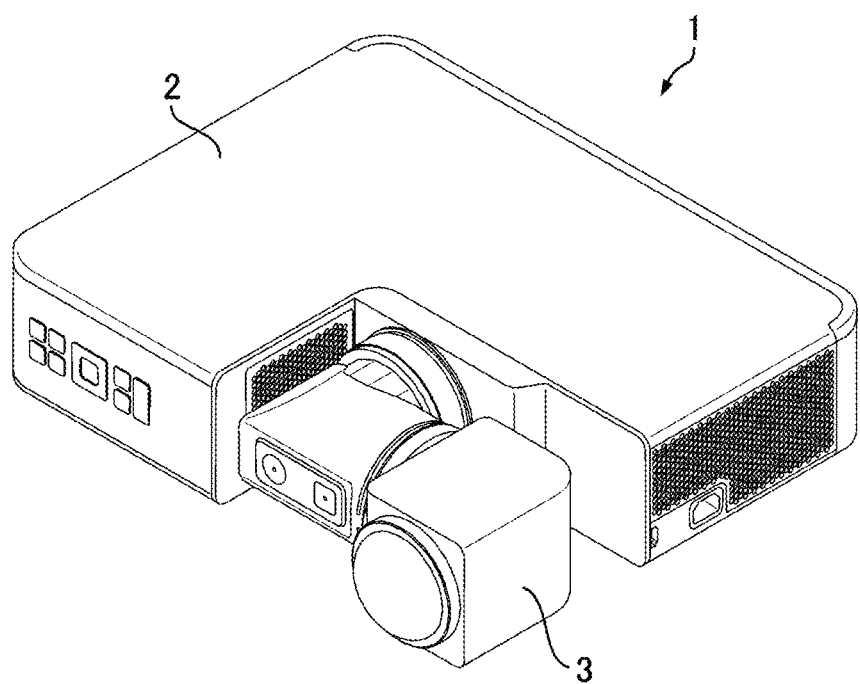
FIG. 16 is a perspective view illustrating an example of use when the projection apparatus main body is horizontally placed and used.

FIG. 16 illustrates a third mode of use in which the projection apparatus main body 2 is horizontally placed and performs projection forward. This mode is provided by rotating the projection lens 3 clockwise or counterclockwise by 180° around the second rotation axis θ2 from the housed state. In this mode, an image is projected forward from the housing front portion 14A of the projection apparatus main body 2.

Figure 17:
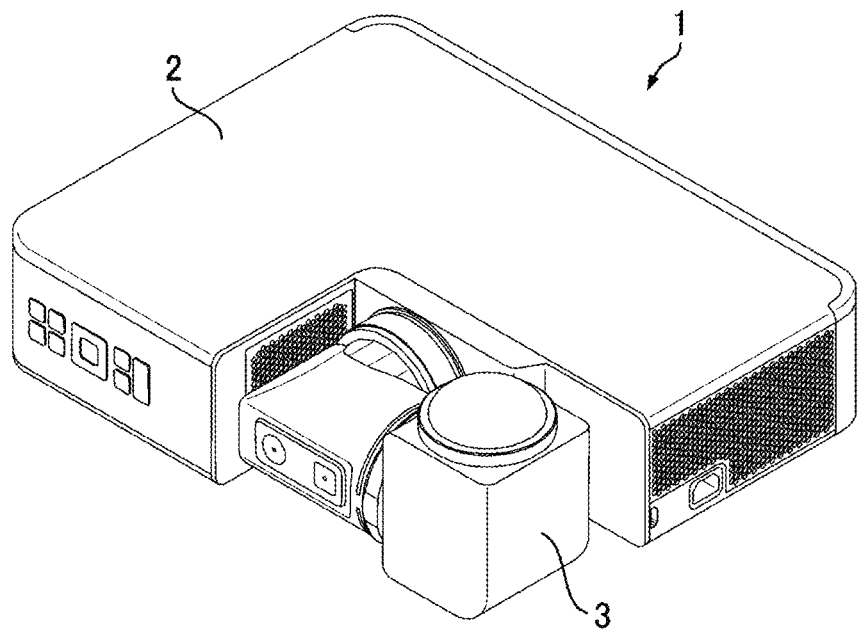
FIG. 17 is a perspective view illustrating an example of use when the projection apparatus main body is horizontally placed and used.

FIG. 17 illustrates a mode of use in which the projection apparatus main body 2 is horizontally placed and performs projection upward. This mode is provided by rotating the projection lens 3 counterclockwise by 90° around the second rotation axis θ2 from the housed state. In this mode, an image is projected upward from the housing top portion 14E of the projection apparatus main body 2.

Figure 18:
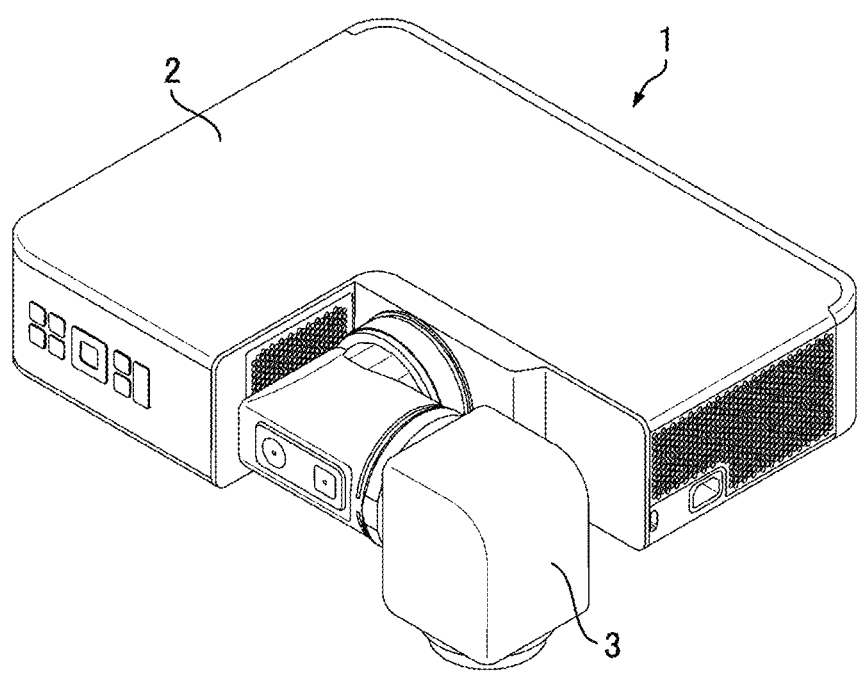
FIG. 18 is a perspective view illustrating an example of use when the projection apparatus main body is horizontally placed and used.

FIG. 18 illustrates a mode of use in which the projection apparatus main body 2 is horizontally placed and performs projection downward. This mode is provided by rotating the projection lens 3 clockwise by 90° around the second rotation axis θ2 from the housed state. In this mode, an image is projected downward from the housing bottom portion 14F of the projection apparatus main body 2.

FIGS. 19 to 30 are perspective views illustrating examples of use when the projection apparatus main body is vertically placed and used. Note that, being "vertically placed" refers to a case where the largest surface of the housing 14 (in the present embodiment, the housing bottom portion 14F or the housing top portion 14E) is substantially parallel to the gravity direction.

When being vertically placed, the projection apparatus main body 2 is placed with the housing rear portion 14B of the projector main body 2 facing below. Further, the projection apparatus main body 2 is placed with the housing right side portion 14D facing forward.

Figure 19:
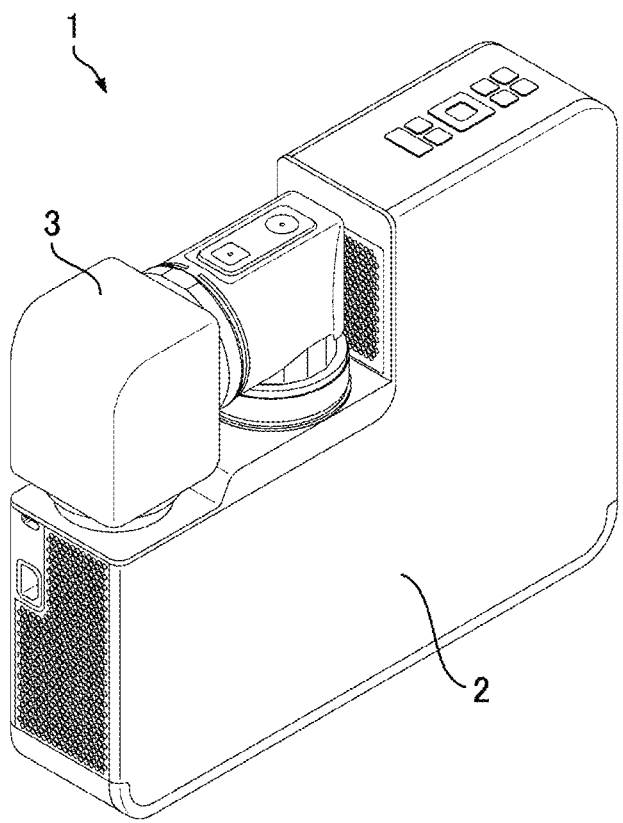
FIG. 19 is a perspective view illustrating an example of use when the projection apparatus main body is vertically placed and used.

FIG. 19 illustrates a housed state when the projection apparatus main body 2 is vertically placed. As illustrated in the drawing, in the housed state, the projection lens 3 is housed in the recessed portion 15 of the projection apparatus main body 2.

Figure 20:
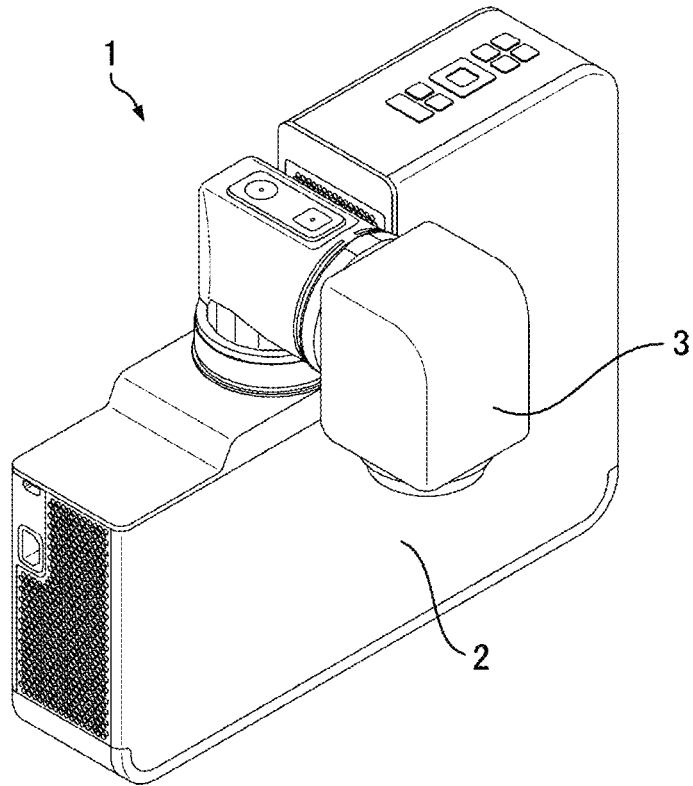
FIG. 20 is a perspective view illustrating an example of use when the projection apparatus main body is vertically placed and used.

FIG. 20 illustrates a first mode of use in which the projection apparatus main body 2 is vertically placed and performs projection downward. This mode is provided by rotating the projection lens 3 counterclockwise by 90° around the first rotation axis θ1 from the housed state. In this mode, an image is projected downward from the right side of the projection apparatus main body 2.

Figure 21:
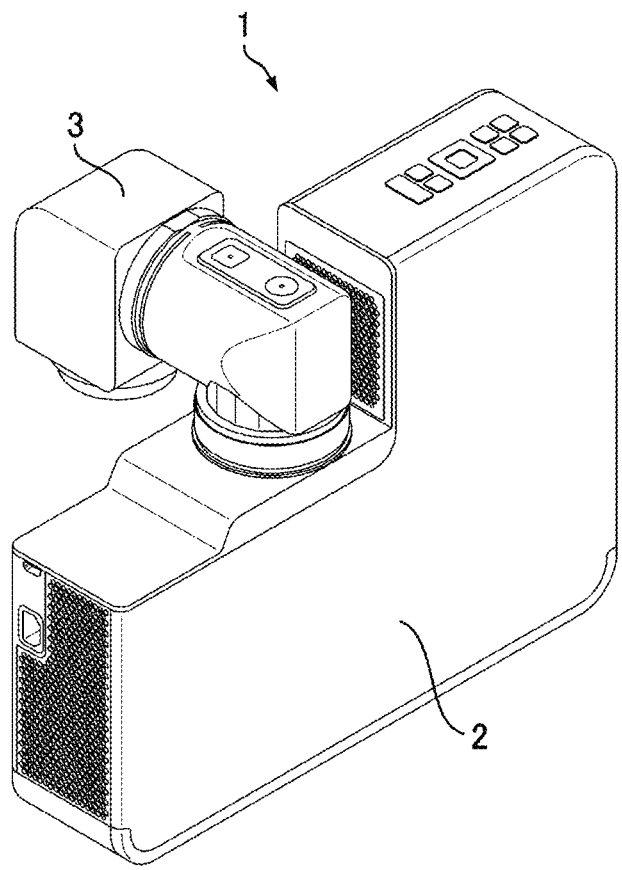
FIG. 21 is a perspective view illustrating an example of use when the projection apparatus main body is vertically placed and used.

FIG. 21 illustrates a second mode of use in which the projection apparatus main body 2 is vertically placed and performs projection downward. This mode is provided by rotating the projection lens 3 clockwise by 90° around the first rotation axis θ1 from the housed state. In this mode, an image is projected downward from the left side of the projection apparatus main body 2.

Figure 22:
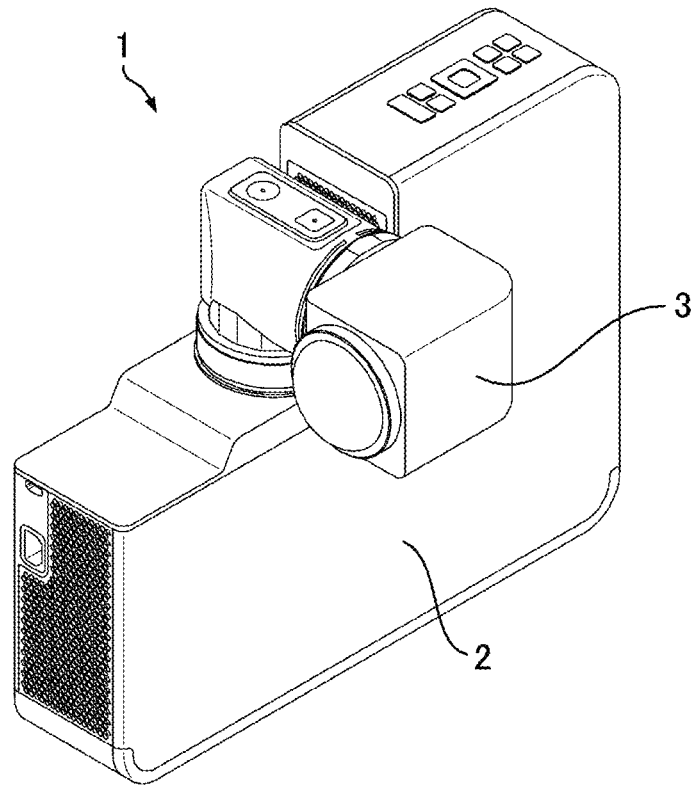
FIG. 22 is a perspective view illustrating an example of use when the projection apparatus main body is vertically placed and used.

FIG. 22 illustrates a first mode of use in which the projection apparatus main body 2 is vertically placed and performs projection forward. This mode is provided by rotating the projection lens 3 counterclockwise by 90° around the first rotation axis θ1 and clockwise by 90° around the second rotation axis θ2 from the housed state. In this mode, an image is projected forward from the right side of the projection apparatus main body 2.

Figure 23:
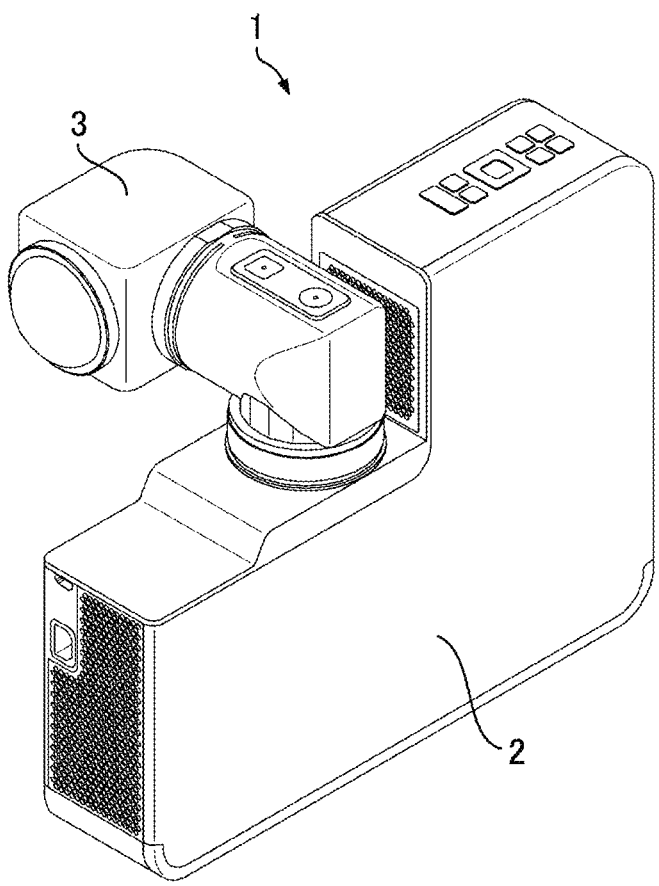
FIG. 23 is a perspective view illustrating an example of use when the projection apparatus main body is vertically placed and used.

FIG. 23 illustrates a second mode of use in which the projection apparatus main body 2 is vertically placed and performs projection forward. This mode is provided by rotating the projection lens 3 clockwise by 90° around the first rotation axis θ1 and counterclockwise by 90° around the second rotation axis θ2 from the housed state. In this mode, an image is projected forward from the left side of the projection apparatus main body 2.

Figure 24:
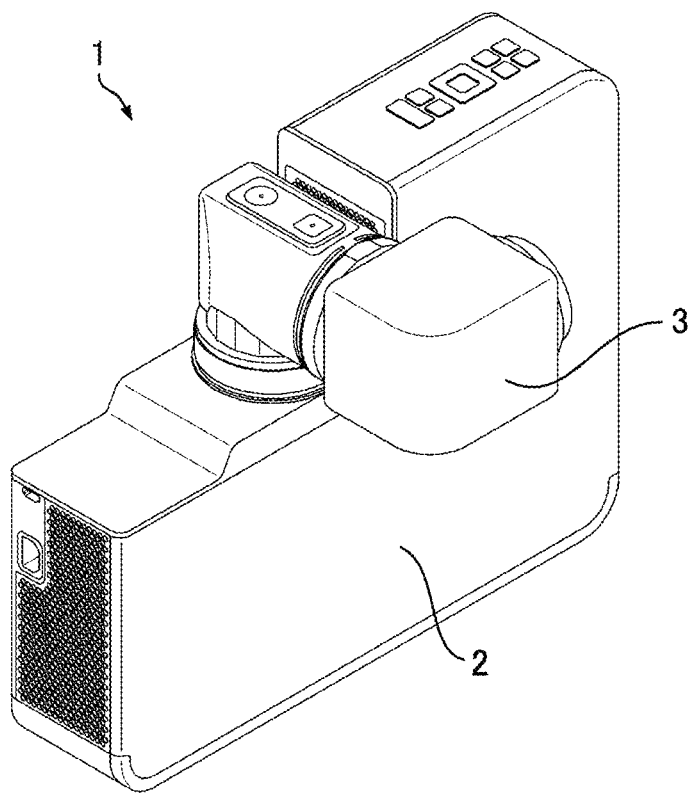
FIG. 24 is a perspective view illustrating an example of use when the projection apparatus main body is vertically placed and used.

FIG. 24 illustrates a first mode of use in which the projection apparatus main body 2 is vertically placed and performs projection rearward. This mode is provided by rotating the projection lens 3 counterclockwise by 90° around the first rotation axis θ1 and counterclockwise by 90° around the second rotation axis θ2 from the housed state. In this mode, an image is projected rearward from the right side of the projection apparatus main body 2.

Figure 25:
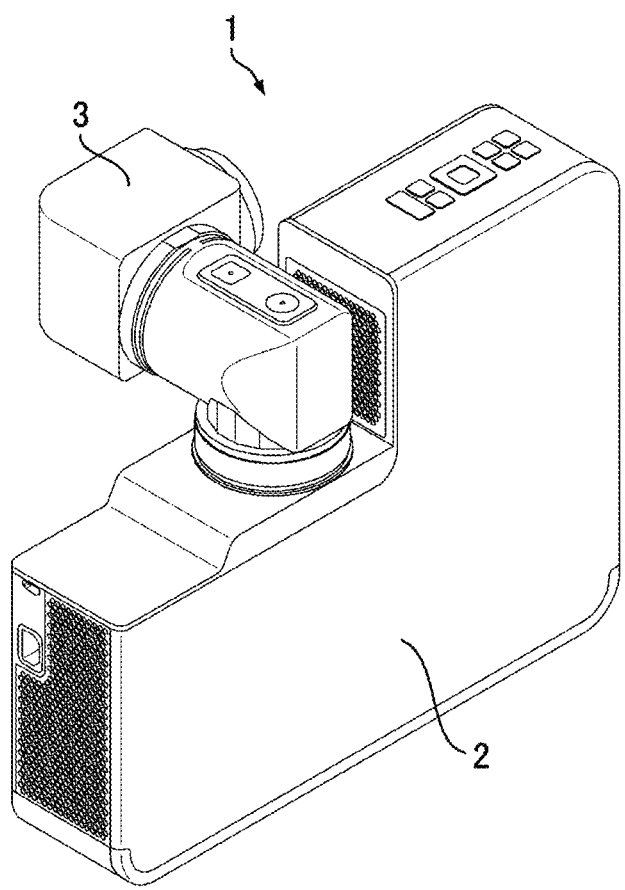
FIG. 25 is a perspective view illustrating an example of use when the projection apparatus main body is vertically placed and used.

FIG. 25 illustrates a second mode of use in which the projection apparatus main body 2 is vertically placed and performs projection rearward. This mode is provided by rotating the projection lens 3 clockwise by 90° around the first rotation axis θ1 and clockwise by 90° around the second rotation axis θ2 from the housed state. In this mode, an image is projected rearward from the left side of the projection apparatus main body 2.

Figure 26:
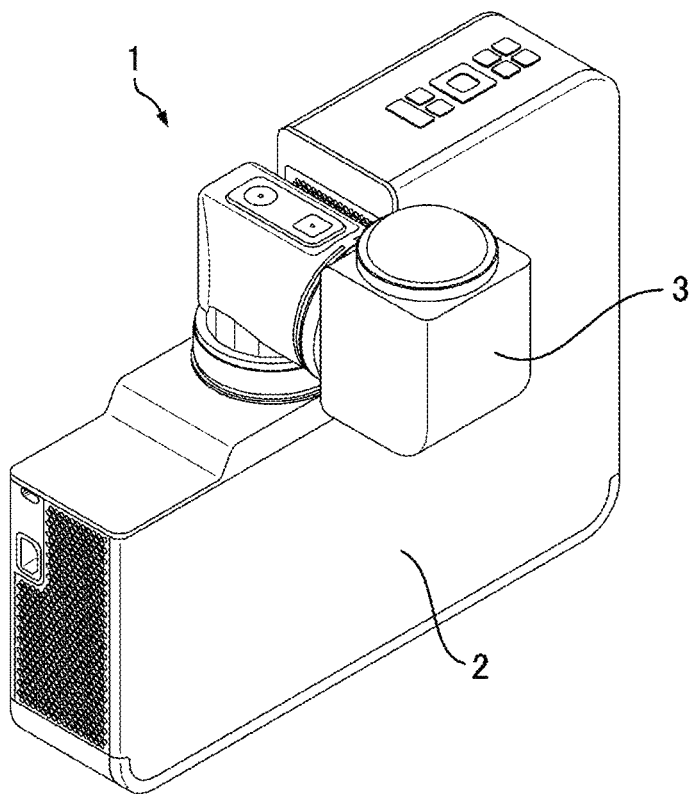
FIG. 26 is a perspective view illustrating an example of use when the projection apparatus main body is vertically placed and used.

FIG. 26 illustrates a first mode of use in which the projection apparatus main body 2 is vertically placed and performs projection upward. This mode is provided by rotating the projection lens 3 counterclockwise by 90° around the first rotation axis θ1 and clockwise or counterclockwise by 180° around the second rotation axis θ2 from the housed state. In this mode, an image is projected upward from the right side of the projection apparatus main body 2.

Figure 27:
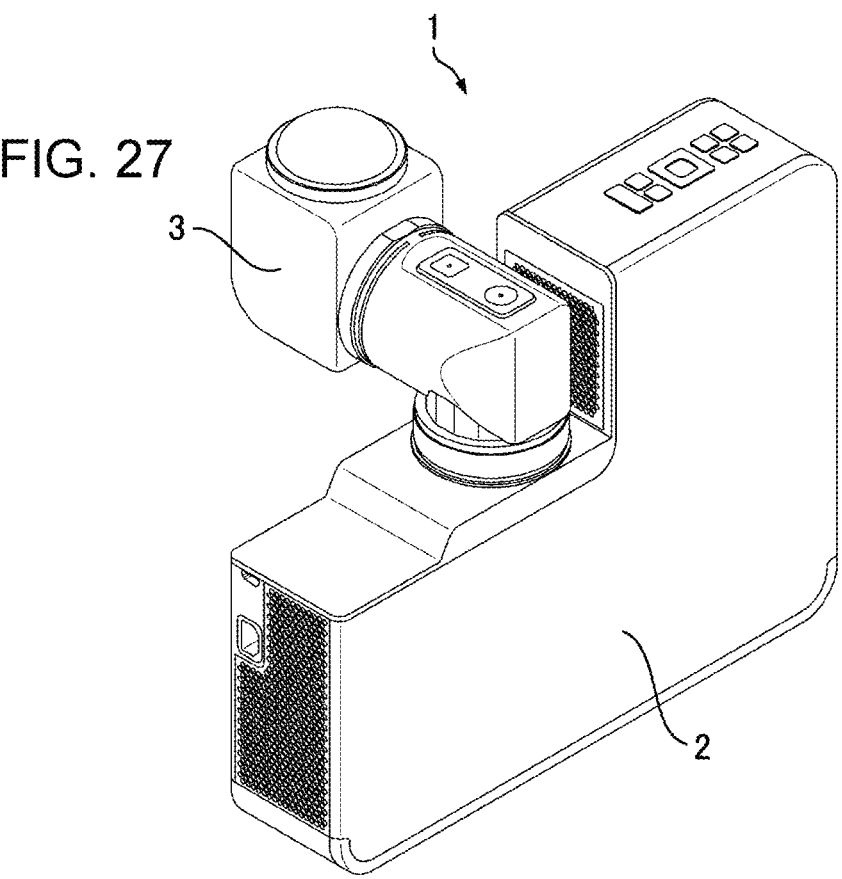
FIG. 27 is a perspective view illustrating an example of use when the projection apparatus main body is vertically placed and used.

FIG. 27 illustrates a second mode of use in which the projection apparatus main body 2 is vertically placed and performs projection upward. This mode is provided by rotating the projection lens 3 clockwise by 90° around the first rotation axis θ1 and clockwise or counterclockwise by 180° around the second rotation axis θ2 from the housed state. In this mode, an image is projected upward from the left side of the projection apparatus main body 2.

Figure 28:
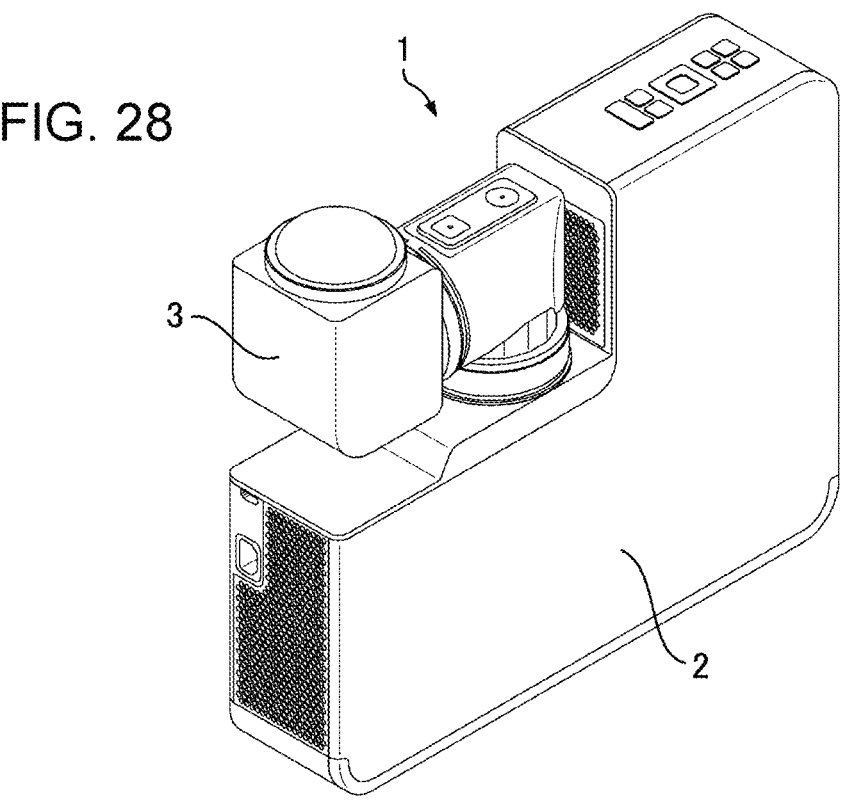
FIG. 28 is a perspective view illustrating an example of use when the projection apparatus main body is vertically placed and used.

FIG. 28 illustrates a third mode of use in which the projection apparatus main body 2 is vertically placed and performs projection upward. This mode is provided by rotating the projection lens 3 clockwise or counterclockwise by 180° around the second rotation axis θ2 from the housed state. In this mode, an image is projected upward from the housing front portion 14A of the projection apparatus main body 2 directed upward.

Figure 29:
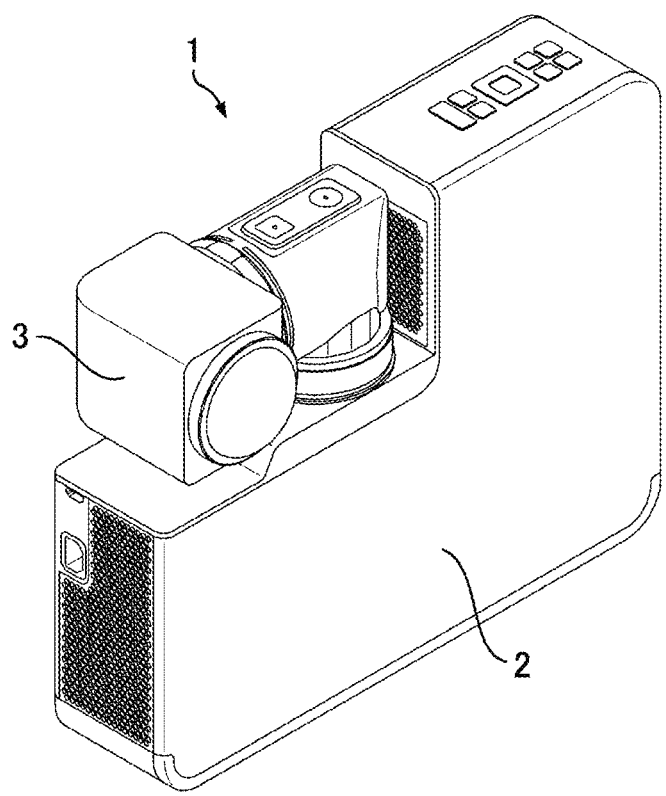
FIG. 29 is a perspective view illustrating an example of use when the projection apparatus main body is vertically placed and used.

FIG. 29 illustrates a mode of use in which the projection apparatus main body 2 is vertically placed and performs projection rightward. This mode is provided by rotating the projection lens 3 counterclockwise by 90° around the second rotation axis θ2 from the housed state. In this mode, an image is projected rightward from the housing top portion 14E of the projection apparatus main body 2 directed rightward.

Figure 30:
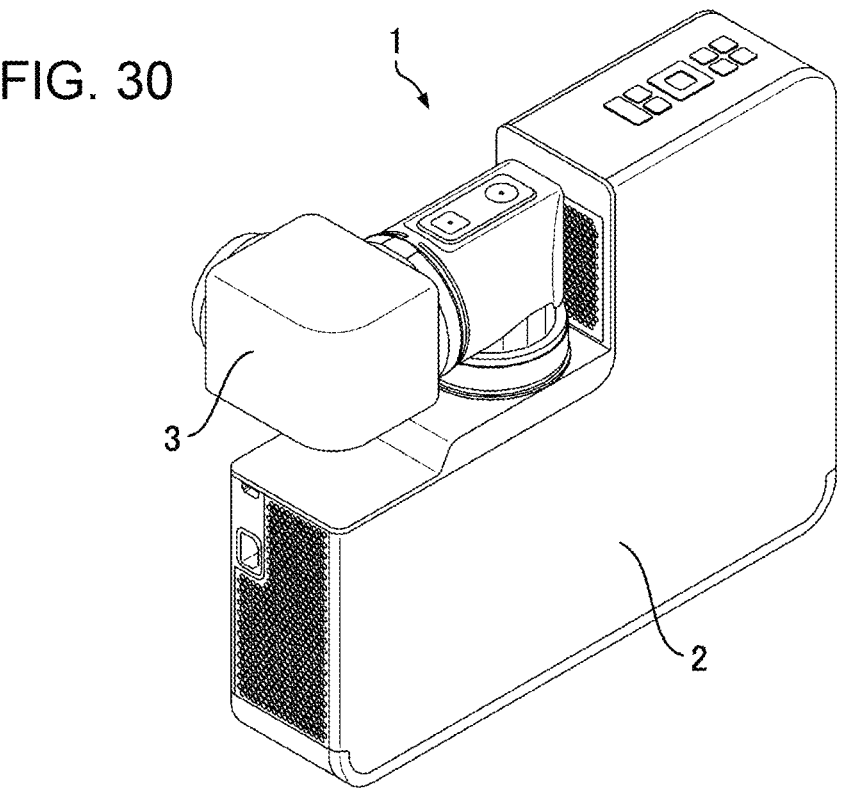
FIG. 30 is a perspective view illustrating an example of use when the projection apparatus main body is vertically placed and used.

FIG. 30 illustrates a mode of use in which the projection apparatus main body 2 is vertically placed and performs projection leftward. This mode is provided by rotating the projection lens 3 clockwise by 90° around the second rotation axis θ2 from the housed state. In this mode, an image is projected leftward from the housing bottom portion 14F of the projection apparatus main body 2 directed leftward.

Internal Structure of Projection Apparatus Main Body

Figure 31:
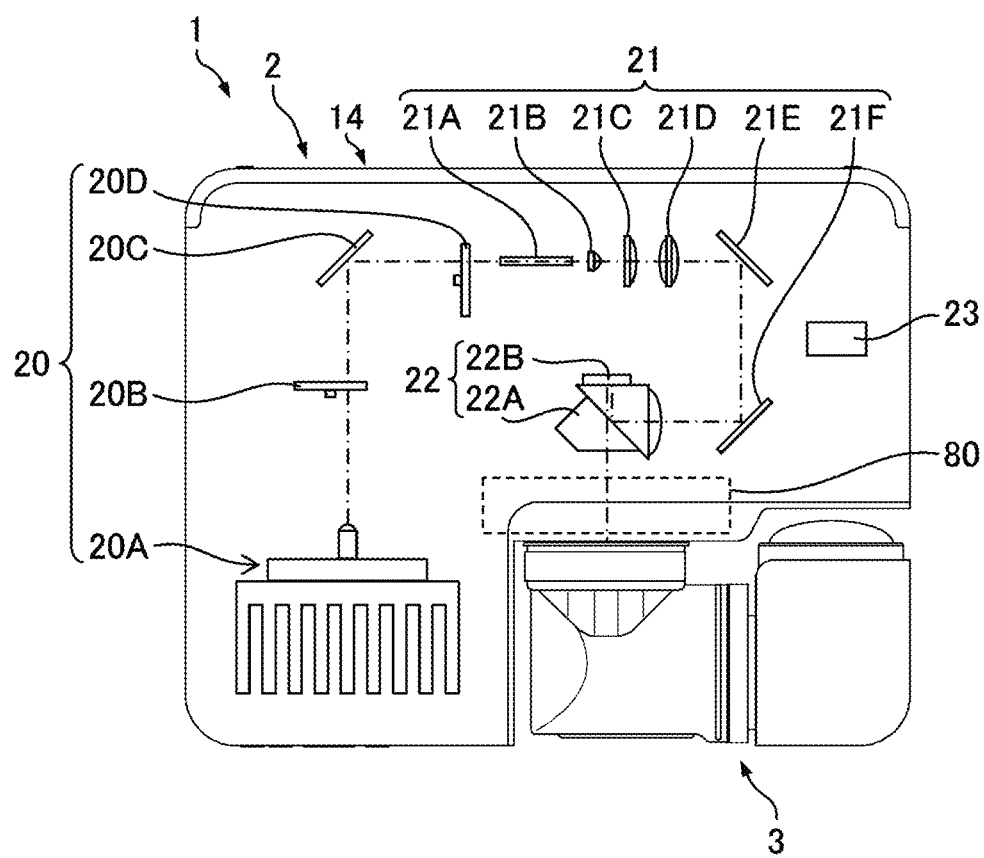
FIG. 31 is a plan view illustrating a general configuration of the inside of the projection apparatus main body.

FIG. 31 is a plan view illustrating a general configuration of the inside of the projection apparatus main body.

As illustrated in the drawing, the projection apparatus main body 2 includes a light source unit 20, an illumination unit 21, an image display unit 22, a main body posture detection unit 23, and a lens shift mechanism 80 therein.

The light source unit 20 includes a laser light source 20A, a fluorescent body wheel 20B, a mirror 20C, and a color wheel 20D. The laser light source 20A emits a blue laser beam. The light source unit 20 generates light of three colors of red, green, and blue (or light of four colors of red, green, blue, and yellow) from the blue laser beam emitted from the laser light source 20A using the fluorescent body wheel 20B and the color wheel 20D, and time-divisionally emits the light.

The illumination unit 21 includes a rod integrator 21A, a lens 21B, a lens 21C, a lens 21D, a mirror 21E, and a mirror 21F. The light emitted from the color wheel 20D of the light source unit 20 is incident on the rod integrator 21A. The rod integrator 21A makes the light emitted from the light source unit 20 uniform. The light emitted from the rod integrator 21A is relayed by the lens 21B, the lens 21C, and the lens 21D, and enters the image display unit 22 via the mirror 21E and the mirror 21F.

The image display unit 22 receives the light emitted from the illumination unit 21 and generates an image. The image display unit 22 includes a total reflection prism 22A and a Digital Micromirror Device (DMD, registered trademark) 22B. The total reflection prism 22A guides the light incident from the illumination unit 21 to the DMD 22B. The DMD 22B is a light modulation element that time-divisionally modulates light of the respective color components incident via the total reflection prism 22A. The DMD 22B has multiple micromirrors capable of switching the reflection direction, and modulates incident light by changing the angle of each micromirror in accordance with video signals. The light modulated by the DMD 22B passes through the total reflection prism 22A and is guided to the projection lens 3.

The main body posture detection unit 23 detects the posture (horizontal placement, vertical placement, or the like) of the projection apparatus main body 2. The main body posture detection unit 23 is constituted of, for example, an acceleration sensor that measures the tilt angle of the projection apparatus main body 2 with respect to the gravity direction. Alternatively, the main body posture detection unit 23 may be a sensor that detects two positions of the horizontal placement and the vertical placement of the projection apparatus main body 2.

The lens shift mechanism 80 shifts the optical axis of the projection lens 3 by moving the projection lens 3 with respect to the projection apparatus main body 2. The lens shift mechanism 80 is disposed inside of the inner wall surface 15A on the front side of the recessed portion 15 of the projection apparatus main body 2. Details of the lens shift mechanism 80 will be described later.

Configuration of Projection Lens

Lens Configuration of Projection Lens

Figure 32:
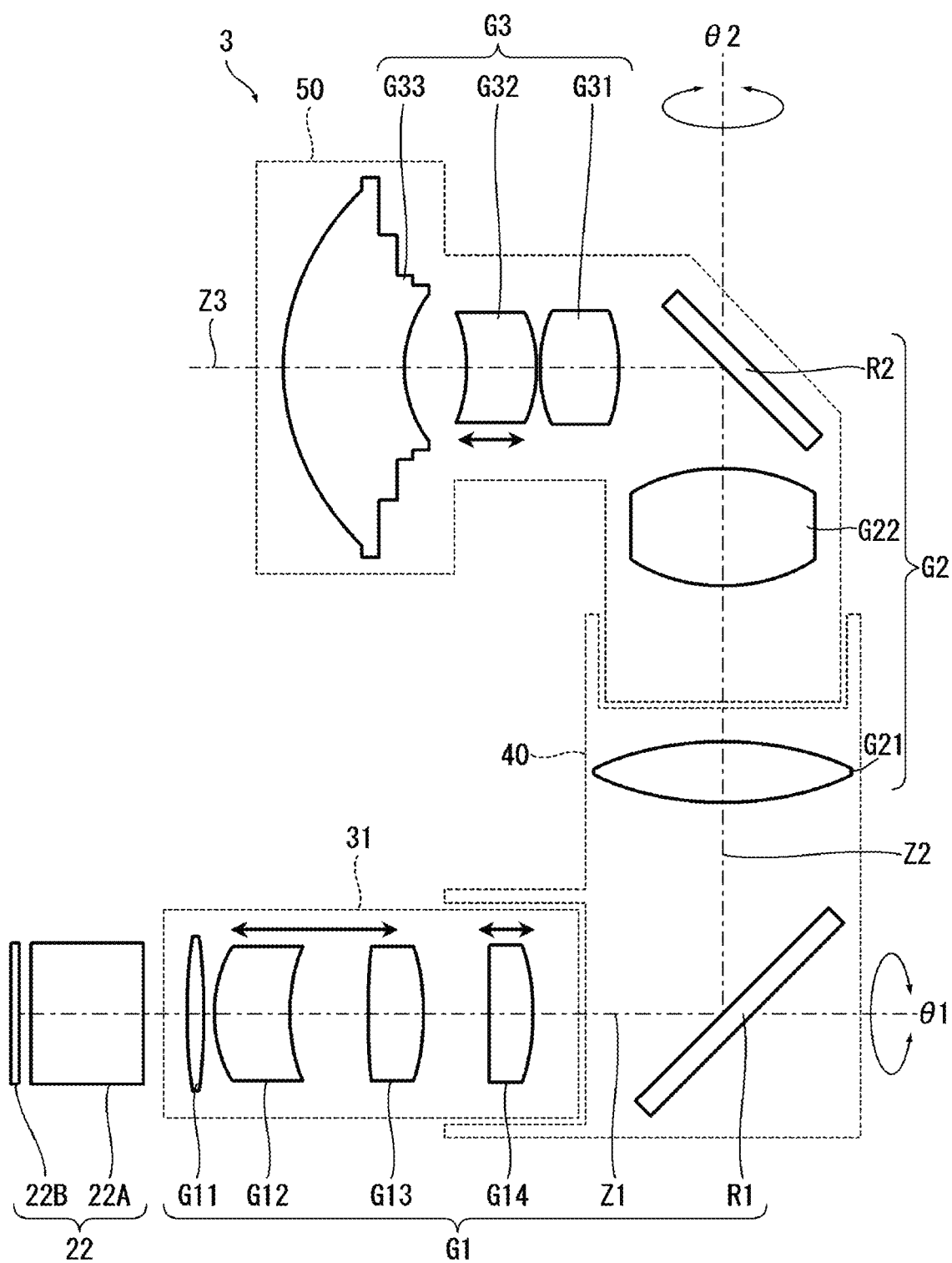
FIG. 32 is a diagram illustrating a lens configuration of a projection lens.

FIG. 32 is a diagram illustrating a lens configuration of the projection lens.

The projection lens 3 enlarges an image formed by the DMD 22B and projects the enlarged image on a projection target surface. The projection lens 3 is substantially constituted of a first optical system G1, a second optical system G2, and a third optical system G3. The projection lens 3 includes a zoom function and a focus function. Note that each optical system may include one lens or a plurality of lenses.

The first optical system G1 forms an image generated by the DMD 22B, as an intermediate image. The first optical system G1 is located between a main body section (housing) of the projection apparatus 1 and the second optical system G2 in an optical path. The first optical system G1 is substantially constituted of a first optical system first lens group G11, a first optical system second lens group G12, a first optical system third lens group G13, a first optical system fourth lens group G14, and a first mirror R1. The first optical system first lens group G11, the first optical system second lens group G12, the first optical system third lens group G13, and the first optical system fourth lens group G14 are disposed along a first optical axis Z1 perpendicular to a display surface of the DMD 22B. The first optical system first lens group G11 is a fixed lens group, and the first optical system second lens group G12, the first optical system third lens group G13, and the first optical system fourth lens group G14 are lens groups that move during zooming. The first optical system second lens group G12 and the first optical system third lens group G13 move together during zooming. Each lens group is constituted of at least one lens.

The first mirror R1 is disposed on the first optical axis Z1 and bends the optical path at a right angle. The optical axis of the bent optical path is referred to as a second optical axis Z2.

The second optical system G2 enlarges the intermediate image formed by the first optical system G1. The enlarged intermediate image is projected on a projection target surface (screen, wall, ceiling, floor, or the like). The second optical system G2 is substantially constituted of a second optical system first lens group G21, a second optical system second lens group G22, and a second mirror R2. The second optical system first lens group G21, the second optical system second lens group G22, and the second mirror R2 are disposed along the second optical axis Z2. The second mirror R2 bends the optical path of the second optical system G2 at a right angle. The optical axis of the bent optical path is referred to as a third optical axis Z3. The second optical system first lens group G21 and the second optical system second lens group G22 are fixed lens groups.

The third optical system G3 projects the image enlarged by the second optical system G2 on the projection target surface. The third optical system G3 is substantially constituted of a third optical system first lens group G31, a third optical system second lens group G32, and a third optical system third lens group G33. The third optical system first lens group G31, the third optical system second lens group G32, and the third optical system third lens group G33 are disposed along the third optical axis Z3. The third optical system first lens group G31 and the third optical system third lens group G33 are fixed lens groups, and the third optical system second lens group G32 is a lens group that moves during focusing. Each lens group is constituted of at least one lens.

In the projection lens 3, a part including the first mirror R1 and the second optical system G2 rotates while the first optical axis Z1 serves as the first rotation axis θ1. In addition, in the projection lens 3, a part including the second optical system second lens group G22 and the second mirror R2 of the second optical system G2, the third optical system first lens group G31, the third optical system second lens group G32, and the third optical system third lens group G33 rotates while the second optical axis Z2 serves as the second rotation axis θ2.

Lens Barrel of Projection Lens

Figure 33:
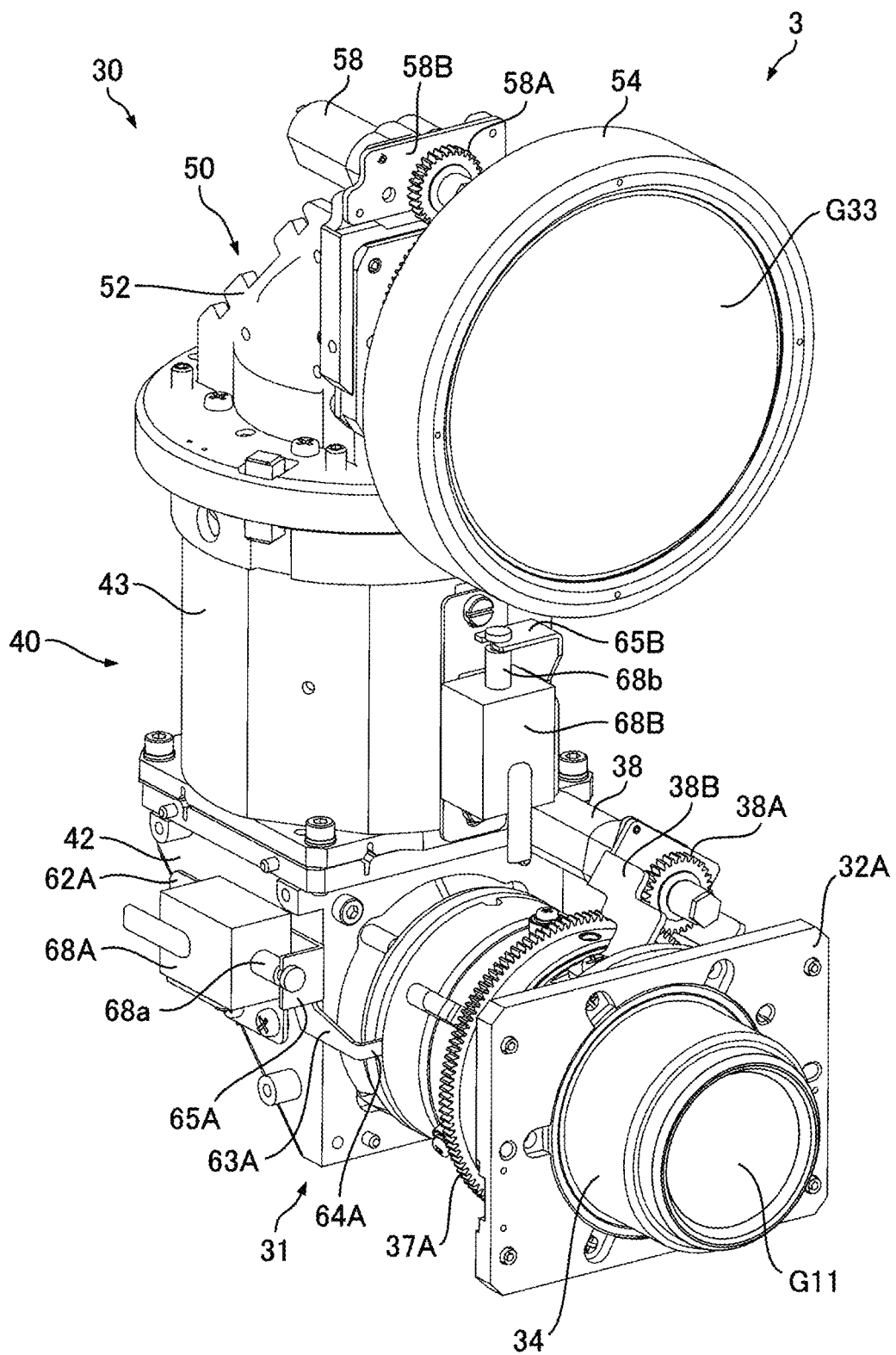
FIG. 33 is a perspective view illustrating an external structure of a lens barrel of the projection lens.
Figure 34:
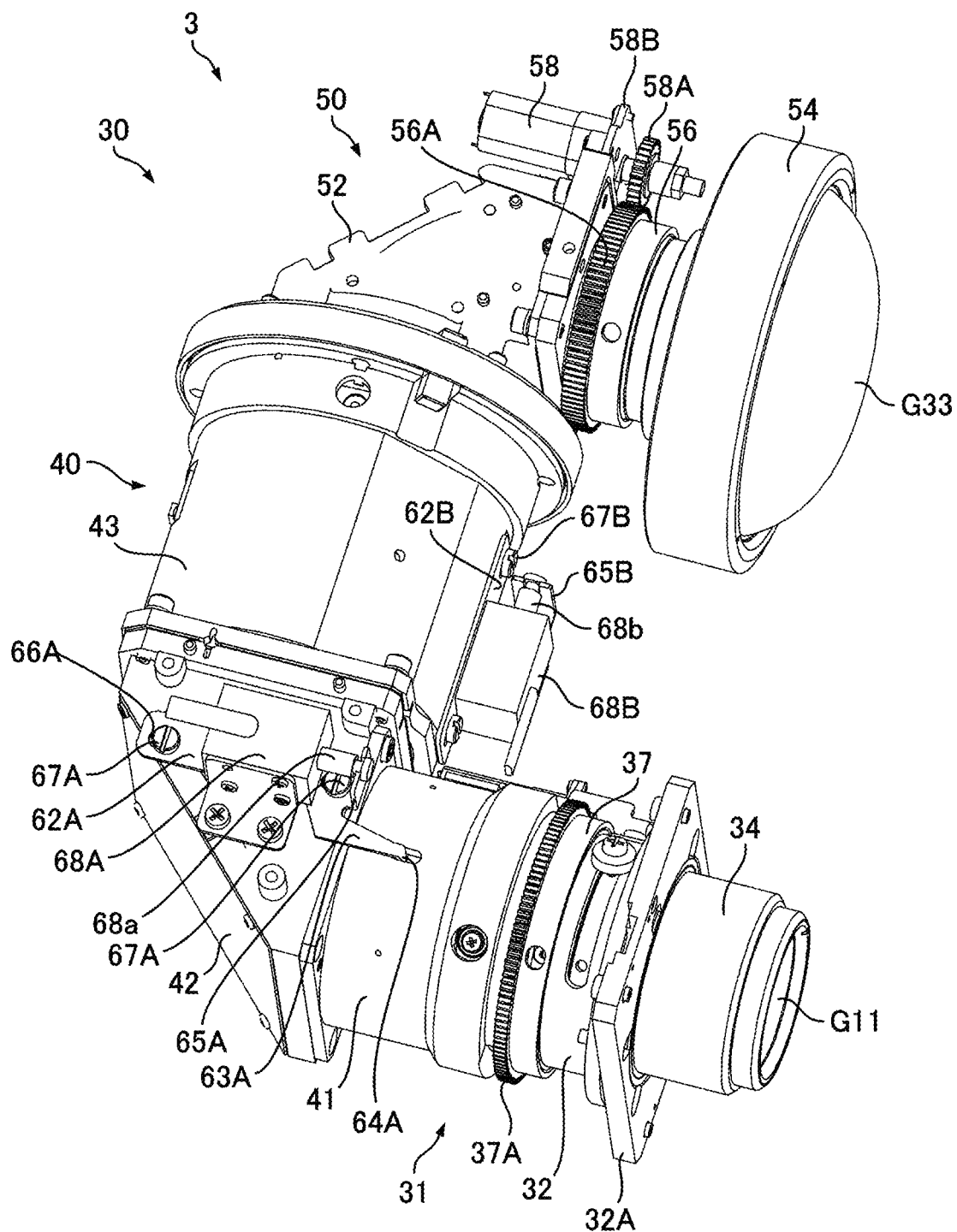
FIG. 34 is a perspective view illustrating the external structure of the lens barrel of the projection lens.
Figure 35:
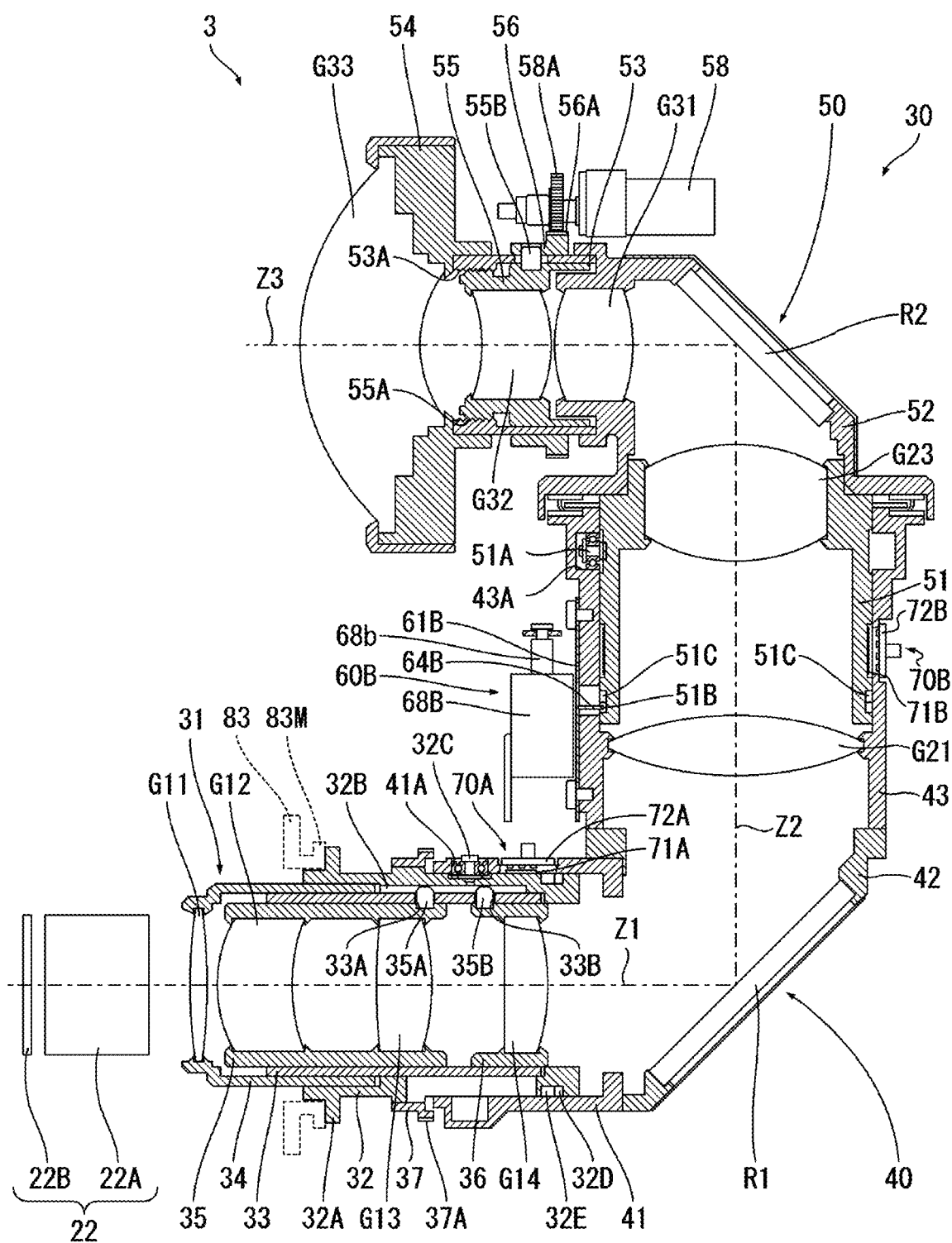
FIG. 35 is a sectional view illustrating a general configuration of the inside of the lens barrel of the projection lens.

FIGS. 33 and 34 are perspective views illustrating an external structure of a lens barrel of the projection lens. FIG. 35 is a sectional view illustrating a general configuration of the inside of the lens barrel of the projection lens.

In FIG. 33, a lens barrel 30 of the projection lens 3 has a first holder 31, a second holder 40, and a third holder 50. The first holder 31 houses the first optical system first lens group G11, the first optical system second lens group G12, the first optical system third lens group G13, and the first optical system fourth lens group G14. The second holder 40 houses the first mirror R1 and the second optical system first lens group G21. The third holder 50 houses the second optical system second lens group G22, the second mirror R2, the third optical system first lens group G31, the third optical system second lens group G32, and the third optical system third lens group G33. That is, the first to third holders 31, 40, and 50 hold various optical members.

In FIG. 35, the first holder 31 includes a fixed frame 32, a cam frame 33, a first lens holding frame 34, a second lens holding frame 35, a third lens holding frame 36, and a zoom gear frame 37.

In FIG. 34, the fixed frame 32 has a flange portion 32A on an outer periphery thereof. The flange portion 32A functions as a connecting portion (mount portion) to the projection apparatus main body 2. The projection lens 3 is mounted on the projection apparatus main body 2 via the flange portion 32A. At this time, the flange portion 32A of the projection lens 3 is connected to the lens shift mechanism 80 included in the projection apparatus main body 2. The fixed frame 32 includes a straight groove 32B along the first optical axis Z1. The straight groove 32B is provided at each of three positions in the circumferential direction at equal intervals.

The cam frame 33 is radially fitted to an inner peripheral portion of the fixed frame 32 and is rotatably held by the fixed frame 32. The cam frame 33 includes a first cam groove 33A and a second cam groove 33B. The first cam groove 33A and the second cam groove 33B each are provided at each of three positions in the circumferential direction at equal intervals.

The first lens holding frame 34 holds the first optical system first lens group G11. The first lens holding frame 34 is connected to a rear end portion of the fixed frame 32 and is integrally fixed to the fixed frame 32. Thus, the first optical system first lens group G11 is fixed and held at a predetermined position.

The second lens holding frame 35 holds the first optical system second lens group G12 and the first optical system third lens group G13. The second lens holding frame 35 is radially fitted to an inner peripheral portion of the cam frame 33, and is held so as to be movable forward and rearward along the first optical axis Z1 in the inner peripheral portion of the cam frame 33. The second lens holding frame 35 includes a first cam pin 35A on an outer peripheral portion thereof. The first cam pin 35A is provided at each of three positions in the circumferential direction at equal intervals. The first cam pin 35A is fitted to the corresponding first cam groove 33A provided in the cam frame 33 and the corresponding straight groove 32B provided in the fixed frame 32. Thus, when the cam frame 33 is rotated, the second lens holding frame 35 moves forward or rearward along the first optical axis Z1. Consequently, the first optical system second lens group G12 and the first optical system third lens group G13 move forward or rearward together along the first optical axis Z1. Thus, the angle of view (zoom magnification) of a projection image is adjusted.

The third lens holding frame 36 holds the first optical system fourth lens group G14. The third lens holding frame 36 is radially fitted to an inner peripheral portion of the cam frame 33, and is held so as to be movable forward and rearward along the first optical axis Z1 in the inner peripheral portion of the cam frame 33. The third lens holding frame 36 includes a second cam pin 35B on an outer peripheral portion thereof. The second cam pin 35B is provided at each of three positions in the circumferential direction at equal intervals. The second cam pin 35B is fitted to the corresponding second cam groove 33B provided in the cam frame 33 and the corresponding straight groove 32B provided in the fixed frame 32. Thus, when the cam frame 33 is rotated, the third lens holding frame 36 moves forward or rearward along the first optical axis Z1. Consequently, the first optical system fourth lens group G14 moves forward or rearward along the first optical axis Z1.

The zoom gear frame 37 is radially fitted to an outer peripheral portion of the fixed frame 32 and is rotatably held by the fixed frame 32. The zoom gear frame 37 has a gear portion 37A on the outer periphery thereof. The zoom gear frame 37 is connected to the cam frame 33. Thus, when the zoom gear frame 37 is rotated, the cam frame 33 rotates.

The gear portion 37A of the zoom gear frame 37 is engaged with a zoom driving gear 38A connected to a zoom motor 38. As illustrated in FIG. 33, the zoom motor 38 is attached to the fixed frame 32 via a bracket 38B.

In FIG. 34, when the zoom motor 38 is driven, the zoom gear frame 37 rotates. The cam frame 33 rotates in conjunction with the rotation of the zoom gear frame 37. As the cam frame 33 rotates, the second lens holding frame 35 and the third lens holding frame 36 move along the first optical axis Z1. Consequently, the first optical system second lens group G12, the first optical system third lens group G13, and the first optical system fourth lens group G14 move along the first optical axis Z1, and the angle of view (zoom magnification) of a projection image is adjusted.

The second holder 40 includes a first rotating frame 41, a first mirror holding frame 42, and a lens holding frame 43. The second holder 40 is held so as to be rotatable around the first optical axis Z1 (=the first rotation axis θ1) with respect to the first holder 31. Although the first holder 31 is fixed to the housing 14 in the present embodiment, the first holder 31 and the second holder 40 may be connected to each other and the first holder 31 may also be rotated with respect to the housing 14.

In FIG. 35, the first rotating frame 41 is radially fitted to the outer periphery of the fixed frame 32 of the first holder 31 and is rotatably held by the fixed frame 32. A first support roller 32C as a rotating portion is provided on an outer peripheral portion of the fixed frame 32. The first support roller 32C is provided at each of three positions in the circumferential direction at equal intervals. The first rotating frame 41 includes a first guide groove 41A to which the first support rollers 32C are fitted. The first guide groove 41A is disposed along the circumferential direction. The first rotating frame 41 is rotatably held with respect to the fixed frame 32 by the first support roller 32C moving along the first guide groove 41A.

The first mirror holding frame 42 holds the first mirror R1. The first mirror holding frame 42 has a structure bent at a right angle, is connected to the first rotating frame 41, and is integrally fixed to the first rotating frame 41.

The lens holding frame 43 holds the second optical system first lens group G21. The lens holding frame 43 is connected to the first mirror holding frame 42 and integrally fixed to the first mirror holding frame 42. The lens holding frame 43 fixed to the first mirror holding frame 42 is disposed perpendicularly to the first rotating frame 41.

The third holder 50 includes a second rotating frame 51, a second mirror holding frame 52, a helicoid frame 53, a final lens holding frame 54, a focus lens holding frame 55, and a focus gear frame 56. The third holder 50 is held so as to be rotatable around the second optical axis Z2 (=the second rotation axis θ2) with respect to the second holder 40.

The second rotating frame 51 holds the second optical system second lens group G22. The second rotating frame 51 is radially fitted to an inner peripheral portion of the lens holding frame 43 of the second holder 40, and is rotatably held by the lens holding frame 43. A second support roller MA as a rotating portion is provided on an outer peripheral portion of the second rotating frame 51. The second support roller MA is provided at each of three positions in the circumferential direction at equal intervals. The lens holding frame 43 includes a second guide groove 43A to which the second support roller 51A is fitted. The second guide groove 43A is disposed in the circumferential direction. The second rotating frame 51 is rotatably held with respect to the lens holding frame 43 by the second support roller 51A moving along the second guide groove 43A.

The second mirror holding frame 52 holds the second mirror R2 and the third optical system first lens group G31. The first mirror holding frame 42 has a structure bent at a right angle, is connected to the second rotating frame 51, and is integrally fixed to the second rotating frame 51.

The helicoid frame 53 is connected to the second mirror holding frame 52 and integrally fixed to the second mirror holding frame 52. The helicoid frame 53 fixed to the second mirror holding frame 52 is disposed perpendicularly to the second rotating frame 51. The helicoid frame 53 has a female helicoid portion 53A at an inner peripheral portion of the distal end thereof.

The final lens holding frame 54 holds the third optical system third lens group G33 that is the final lens. The final lens holding frame 54 is connected to the distal end of the helicoid frame 53 and is integrally fixed to the helicoid frame 53.

The focus lens holding frame 55 holds the third optical system second lens group G32. The focus lens holding frame 55 has a male helicoid portion 55A on an outer peripheral portion of the distal end thereof. The male helicoid portion 55A of the focus lens holding frame 55 is screw-connected to the female helicoid portion 53A of the helicoid frame 53, and the focus lens holding frame 55 is disposed on an inner peripheral portion of the helicoid frame 53. When the focus lens holding frame 55 rotates, the focus lens holding frame 55 moves forward or rearward while being rotating along the third optical axis Z3 by the action of the male helicoid portion 55A and the female helicoid portion 53A. Consequently, the third optical system second lens group G32 moves forward or rearward along the third optical axis Z3.

The focus gear frame 56 is radially fitted to the outer periphery of the helicoid frame 53 and is rotatably held by the helicoid frame 53. The focus gear frame 56 has a gear portion 56A on the outer periphery thereof. The focus gear frame 56 is connected to the focus lens holding frame 55 via a connecting pin 55B provided on an outer peripheral portion of the focus lens holding frame 55. Thus, when the focus gear frame 56 is rotated, the focus lens holding frame 55 rotates.

The gear portion 56A of the focus gear frame 56 is engaged with a focus driving gear 58A connected to a focus motor 58. As illustrated in FIG. 34, the focus motor 58 is attached to the second mirror holding frame 52 via a bracket 58B.

In FIG. 34, when the focus motor 58 is driven, the focus gear frame 56 rotates. The focus lens holding frame 55 rotates in conjunction with the rotation of the focus gear frame 56. Thus, the focus lens holding frame 55 moves while rotating along the third optical axis Z3. Consequently, the third optical system second lens group G32 moves along the third optical axis Z3 to adjust focus.

In the lens barrel 30 configured as described above, the second holder 40 rotates around the first optical axis Z1 (=the first rotation axis θ1) with respect to the first holder 31. The third holder 50 rotates around the second optical axis Z2 (=the second rotation axis θ2) with respect to the second holder 40.

Locking Mechanism of Projection Lens

As described above, the projection lens 3 includes the locking mechanism 60 for independently locking the rotation around the first rotation axis θ1 and around the second rotation axis. The locking mechanism 60 includes a first locking mechanism 60A (first locking mechanism) that locks rotation of the second holder 40 with respect to the first holder 31 to lock rotation of the projection lens 3 around the first rotation axis θ1. The locking mechanism 60 also includes a second locking mechanism 60B that locks rotation of the third holder 50 with respect to the second holder 40 to lock rotation of the projection lens 3 around the second rotation axis θ2.

First Locking Mechanism

The first locking mechanism 60A locks the rotation of the second holder 40 at three positions. The three positions are a position in the housed state (see FIGS. 7 and 19), a position rotated counterclockwise by 90° from the housed state (see FIGS. 8 and 20), and a position rotated clockwise by 90° from the housed state (see FIGS. 10 and 21).

Figure 36:
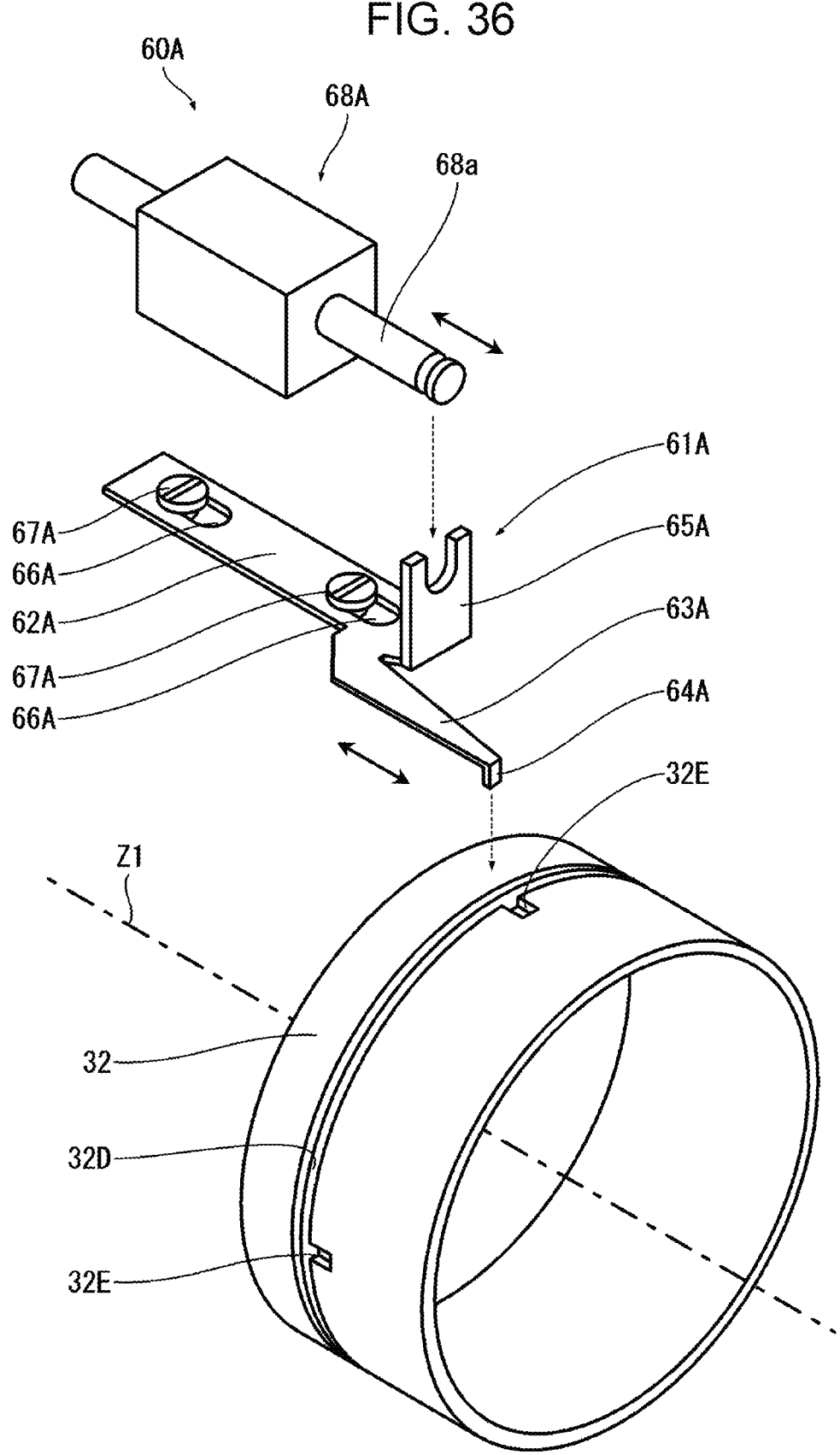
FIG. 36 is an exploded perspective view illustrating a general configuration of a first locking mechanism.

FIG. 36 is an exploded perspective view illustrating a general configuration of the first locking mechanism.

As illustrated in the drawing, a claw portion guide groove 32D is provided in the circumferential direction on the outer periphery of the fixed frame 32 of the first holder 31. The claw portion guide groove 32D includes a first locking groove portion 32E at each of three positions in the circumferential direction. The first locking groove portions 32E (grooves) are each constituted of a groove extending from the claw portion guide groove 32D along the first optical axis Z1 and are arranged at equal intervals (intervals of 90°).

A first locking claw 61A (movable moving portion) is constituted of an integrally formed part made of sheet metal, and has a first locking claw main body 62A having a rectangular flat plate shape, an arm portion 63A extending from the first locking claw main body 62A in the longitudinal direction, a hook-shaped claw portion 64A provided at the distal end of the arm portion 63A, and a connecting portion 65A with respect to a plunger 68a of a first solenoid 68A. The first locking claw main body 62A includes two long holes 66A for attachment to the lens barrel 30.

As illustrated in FIGS. 33 and 34, the first locking claw 61A is slidably attached to the first mirror holding frame 42 of the second holder 40 via two screws 67A. The first locking claw 61A attached to the first mirror holding frame 42 is slidably supported along the first optical axis Z1. The first locking claw 61A attached to the first mirror holding frame 42 has the claw portion 64A fitted to the claw portion guide groove 32D. The first locking claw 61A is slid at the position of the claw portion guide groove 32D, so that the claw portion 64A is fitted to the claw portion guide groove 32D to lock the second holder 40 (holder).

The first locking claw 61A is driven by the first solenoid 68A to slide. The first solenoid 68A is attached to the first mirror holding frame 42 of the second holder 40 via a bracket. The first solenoid 68A has the plunger 68a urged in the protruding direction. When the first solenoid 68A is energized (turned on), the first solenoid 68A retracts the plunger 68a against the urging force.

The first solenoid 68A is connected to the connecting portion 65A of the first locking claw 61A at a distal end portion of the plunger 68a (urging portion). The first locking claw 61A connected to the first solenoid 68A slides by turning on and off the first solenoid 68A. That is, by turning on (energizing) the first solenoid 68A, the plunger 68a retracts against the urging force. Consequently, the first locking claw 61A slides. The sliding direction in this case is a direction in which the claw portion 64A retracts from the first locking groove portion 32E. When the first solenoid 68A is turned on, the claw portion 64A retracts from the first locking groove portion 32E and moves to the claw portion guide groove 32D. Consequently, the second holder 40 is rotatable.

In contrast, when the first solenoid 68A is turned off, the plunger 68a protrudes by the urging force. Consequently, the first locking claw 61A slides. The sliding direction in this case is a direction toward the first locking groove portion 32E. Thus, when the first solenoid 68A is turned off at a position at which the position of the claw portion 64A and the position of the first locking groove portion 32E coincide with each other, the claw portion 64A is fitted to the first locking groove portion 32E, and the rotation of the second holder 40 is locked. That is, the rotation around the first rotation axis θ1 is locked.

When the first solenoid 68A is turned off at a position other than the position of the first locking groove portion 32E, the claw portion 64A is pressed against an inner wall surface of the claw portion guide groove 32D by the urging force of the plunger 68a. In this case, when the second holder 40 is rotated to a position at which the position of the claw portion 64A and the position of the first locking groove portion 32E coincide with each other, the claw portion 64A is fitted to the first locking groove portion 32E by the urging force of the plunger 68a, and the rotation of the second holder 40 is locked. That is, the rotation around the first rotation axis θ1 is locked.

As described above, the first locking mechanism 60A moves the claw portion 64A of the first locking claw 61A forward and backward by turning on and off the first solenoid 68A to lock and unlock the rotation of the second holder 40. That is, the rotation around the first rotation axis θ1 is locked and unlocked.

The first solenoid 68A is turned on and off by the first unlocking switch 11A. The first solenoid 68A is turned on for a predetermined period when the first unlocking switch 11A is pushed once. Thus, when the first unlocking switch 11A is pushed once, unlocking is attained for a certain period.

Second Locking Mechanism

The second locking mechanism 60B locks the rotation of the third holder 50 at four positions. The four positions are positions at intervals of 90° with reference to the position in the housed state.

Figure 37:
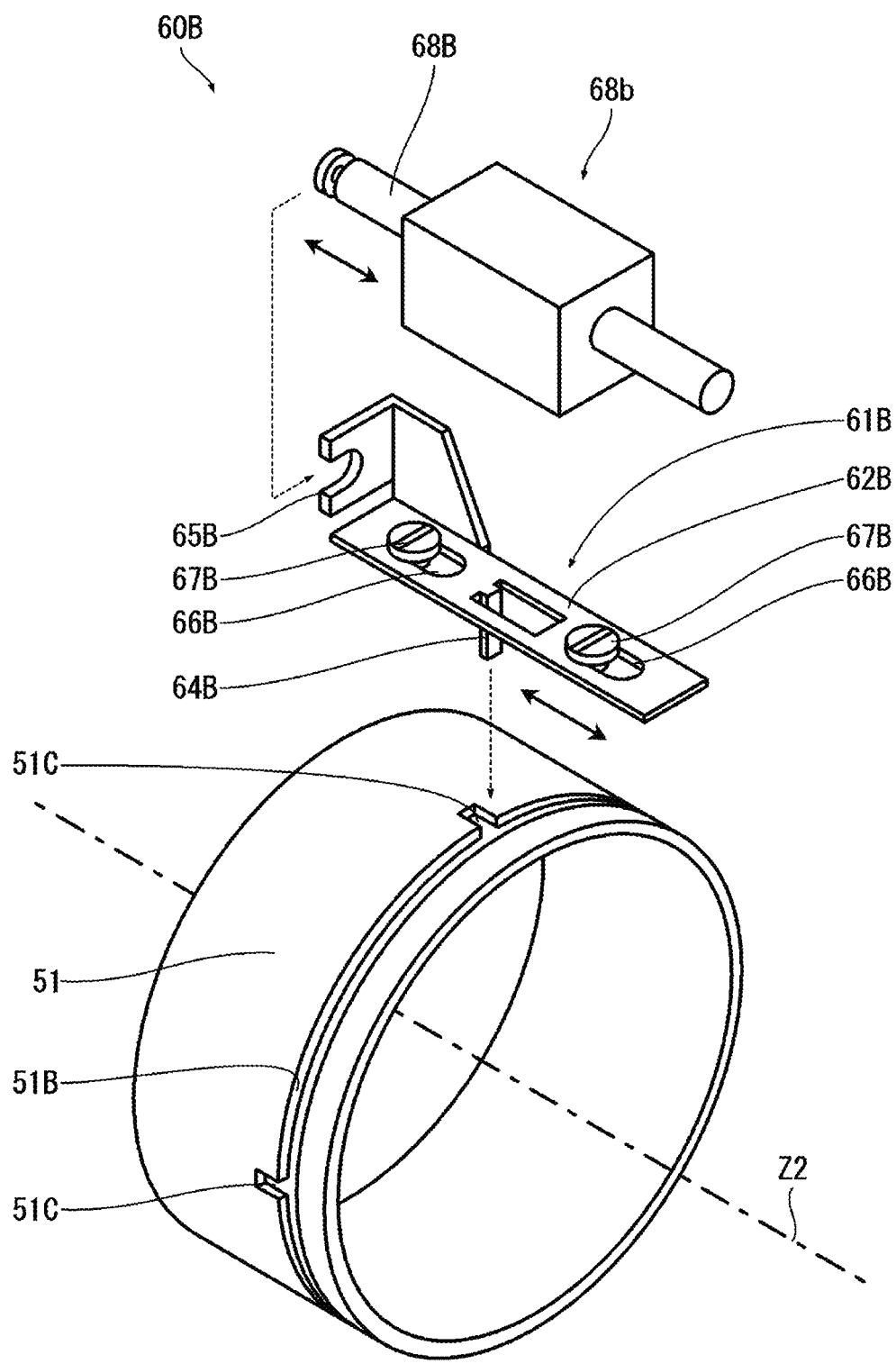
FIG. 37 is an exploded perspective view illustrating a general configuration of a second locking mechanism.

FIG. 37 is an exploded perspective view illustrating a general configuration of a second locking mechanism.

As illustrated in the drawing, the second rotating frame 51 of the third holder 50 includes a claw portion guide groove 51B on the outer circumference thereof in the circumferential direction. The claw portion guide groove 51B includes a second locking groove portion 51C at each of four positions in the circumferential direction. The second locking groove portions 51C are each constituted of a groove extending from the claw portion guide groove 51B along the second optical axis Z2, and are disposed at equal intervals (intervals of 90°).

A second locking claw 61B is constituted of an integrally formed part made of sheet metal, and has a second locking claw main body 62B having a rectangular flat plate shape, a hook-shaped claw portion 64B provided at the second locking claw main body 62B, and a connecting portion 65B with respect to a plunger 68b of a second solenoid 68B. The second locking claw main body 62B includes two long holes 66B for attachment to the lens barrel 30. As illustrated in FIGS. 33 and 34, the second locking claw 61B is slidably attached to the lens holding frame 43 of the second holder 40 via two screws 67B. Further, the claw portion 64B of the second locking claw 61B attached to the lens holding frame 43 is fitted to the claw portion guide groove 51B. The detailed locking and unlocking methods of the rotating shaft are substantially the same as those of the first locking mechanism.

Rotation Position Detection Unit

In FIG. 35, the projection lens 3 includes a first rotation position detection unit 70A that detects the rotation position of the second holder 40 with respect to the first holder 31, and a second rotation position detection unit 70B that detects the rotation position of the third holder 50 with respect to the second holder 40.

First Rotation Position Detection Unit

The first rotation position detection unit 70A detects seven rotation positions (including rotation ranges) of 0°, 0° to 45°, 45° to 90°, 90°, 90° to 135°, 135° to 180°, and 180° as rotation positions of the second holder 40. It is also possible to detect the rotation position in a further fine range. For example, 45° and 135° may be detected independently.

The first rotation position detection unit 70A is constituted of a so-called optical absolute encoder, and includes a first optical scale 71A to which a different code is assigned in accordance with the rotation position, and a first reading sensor 72A that reads the first optical scale 71A.

Figure 38:
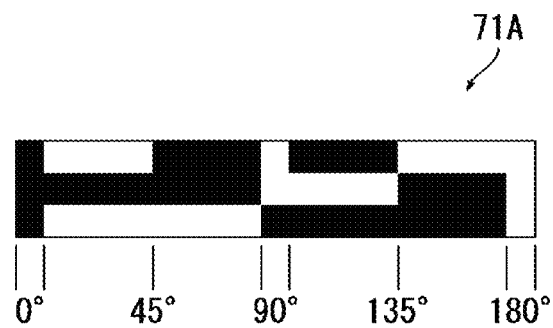
FIG. 38 is a developed plan view illustrating a general configuration of a first optical scale.
Figure 39:
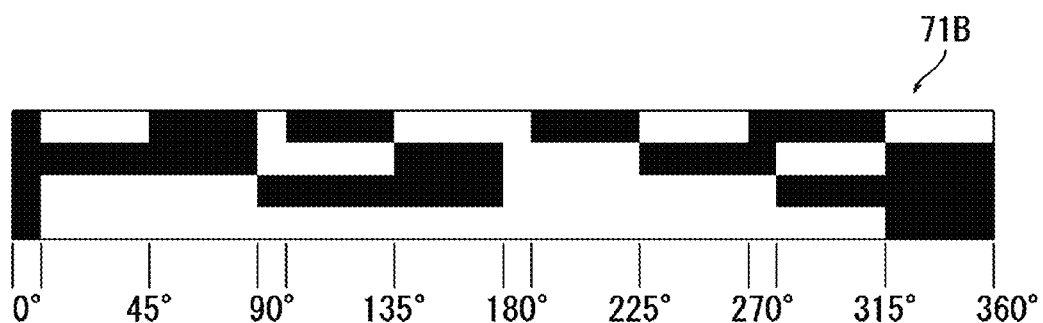
FIG. 39 is a developed plan view illustrating a general configuration of a second optical scale.

The first optical scale 71A is disposed in the circumferential direction on an outer peripheral portion of the fixed frame 32 of the first holder 31. FIG. 38 is a developed plan view illustrating a general configuration of the first optical scale. To the first optical scale 71A, a code corresponding to the rotation position is assigned using a combination of a reflective portion (white portion in FIG. 38) and a non-reflective portion (black portion in FIG. 38). In this example, a 3-bit code is assigned according to the rotation position by three tracks.

The first reading sensor 72A is provided on the first rotating frame 41 of the second holder 40 and is disposed to face the first optical scale 71A. The first reading sensor 72A has a structure in which a light source and an optical sensor are arranged in a line, and reads the first optical scale 71A by irradiating the first optical scale 71A with light from the light source and receiving the reflection light by the optical sensor. More specifically, on/off of light is detected, and a signal corresponding to the on/off is output. The output signal is a signal corresponding to the rotation position of the second holder 40.

The second holder 40 rotates within a range of 90° in the counterclockwise direction and 90° in the clockwise direction with reference to the housed state. The second holder 40 is locked at each position of a position in the housed state (see FIGS. 7 and 19), a position rotated counterclockwise by 90° from the housed state (see FIGS. 8 and 20), and a position rotated clockwise by 90° from the housed state (see FIGS. 9 and 21). The first rotation position detection unit 70A detects the rotation position of the second holder 40 by setting a position at which the second holder 40 is rotated counterclockwise by 90° from the housed state (see FIGS. 8 and 20) as 0° and a rotation direction in which the second holder 40 is rotated clockwise from the position of 0° as a positive rotation direction. Thus, the rotation position of the second holder 40 is detected as 90° at the position of the housed state (see FIGS. 7 and 19), and the rotation position of the second holder 40 is detected as 180° at the position rotated clockwise by 90° from the housed state (see FIGS. 9 and 21).

Second Rotation Position Detection Unit

The second rotation position detection unit 70B detects twelve rotation positions (including rotation ranges) of 0°, 0° to 45°, 45° to 90°, 90°, 90° to 135°, 135° to 180°, 180° to 225°, 225° to 270°, 270°, 270° to 315°, and 315° to 360° as rotation positions of the third holder 50. It is also possible to detect the rotation position in a further fine range. For example, 45°, 135°, 225°, and 315° may be detected independently.

The second rotation position detection unit 70B is constituted of an optical absolute encoder like the first rotation position detection unit 70A, and includes a second optical scale 71B to which a different code is assigned in accordance with the rotation position, and a second reading sensor 72B that reads the second optical scale 71B. The details of the detection method are substantially similar to those of the first rotation position detection unit 70A.

The first rotation position detection unit 70A and the second rotation position detection unit 70B are not limited to optical absolute encoders, and for example, potentiometers or the like that output a rotation angle, a movement amount, or the like as a voltage signal may be used.

Lens Shift Mechanism

The projection apparatus main body 2 includes the lens shift mechanism 80. The lens shift mechanism 80 moves the projection lens 3 with respect to the projection apparatus main body 2 to shift the optical axis of the projection lens 3. More specifically, the projection lens 3 is moved in a plane orthogonal to the first optical axis Z1 to shift the optical axis of the projection lens 3.

Configuration of Lens Shift Mechanism

Figure 40:
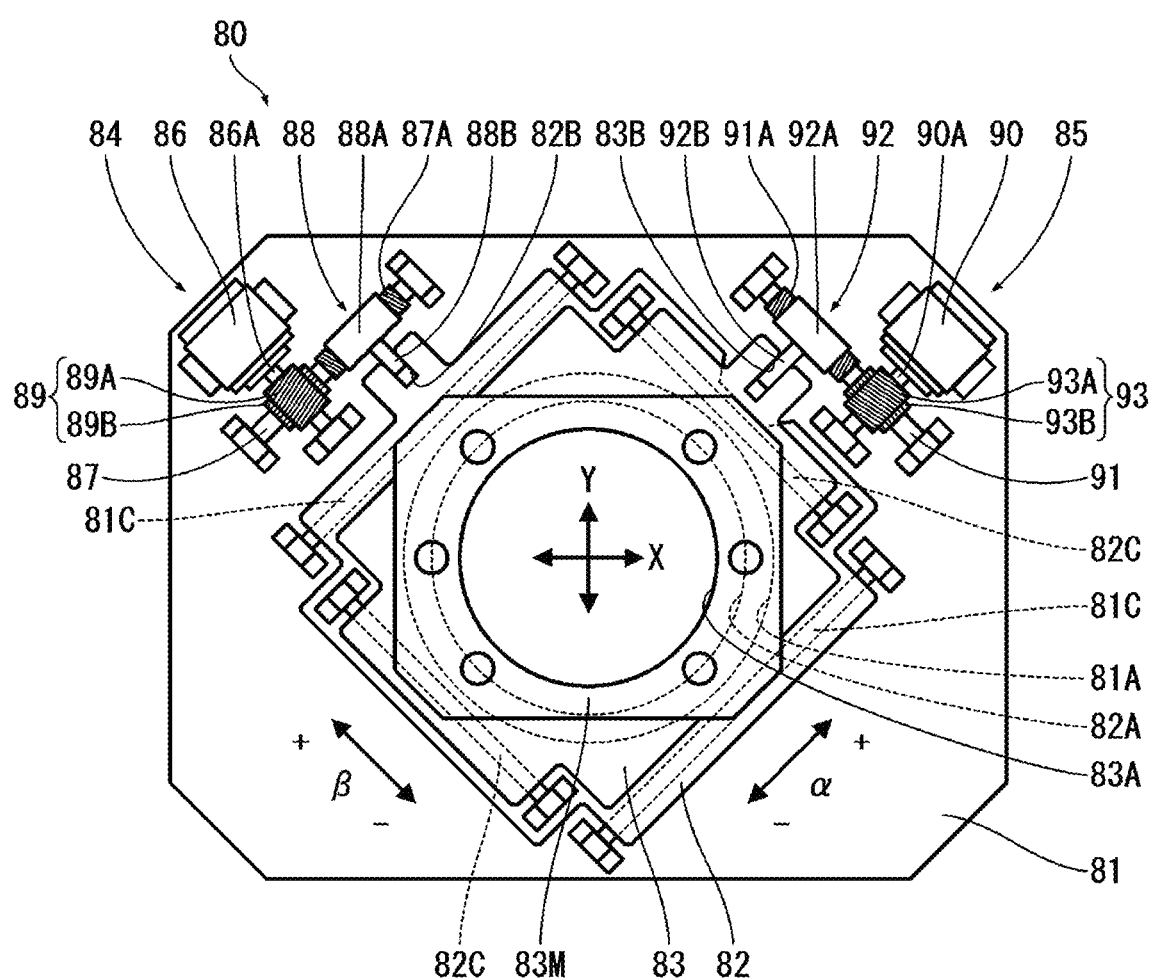
FIG. 40 is a front view illustrating a general configuration of a lens shift mechanism when the projection apparatus main body is horizontally placed.

FIG. 40 is a front view illustrating a general configuration of the lens shift mechanism when the projection apparatus main body is horizontally placed. In the drawing, a direction indicated by an arrow X is a left-right direction (synonymous with a lateral direction and a horizontal direction) when the projection apparatus main body 2 is horizontally placed, and a direction indicated by an arrow Y is an up-down direction (synonymous with a vertical direction and a perpendicular direction) when the projection apparatus main body 2 is horizontally placed.

The lens shift mechanism 80 includes a base plate 81, a first slide plate 82, a second slide plate 83 (see also FIG. 35), a first slide plate driving mechanism 84, and a second slide plate driving mechanism 85.

The base plate 81 is fixed to the projection apparatus main body 2. The first slide plate 82 is attached to the base plate 81, and the second slide plate 83 is attached to the first slide plate 82. The second slide plate 83 is integrally provided with a mount portion 83M. The mount portion 83M is an attachment portion for the projection lens 3. The projection lens 3 is attached to the lens shift mechanism 80 by fastening the flange portion 32A provided at the first holder 31 of the lens barrel 30 to the mount portion 83M with screws, and is connected to the projection apparatus main body 2. The projection lens 3 connected to the projection apparatus main body 2 is disposed such that the first optical axis Z1 thereof is orthogonal to the housing front portion 14A of the projection apparatus main body 2.

Figure 41:
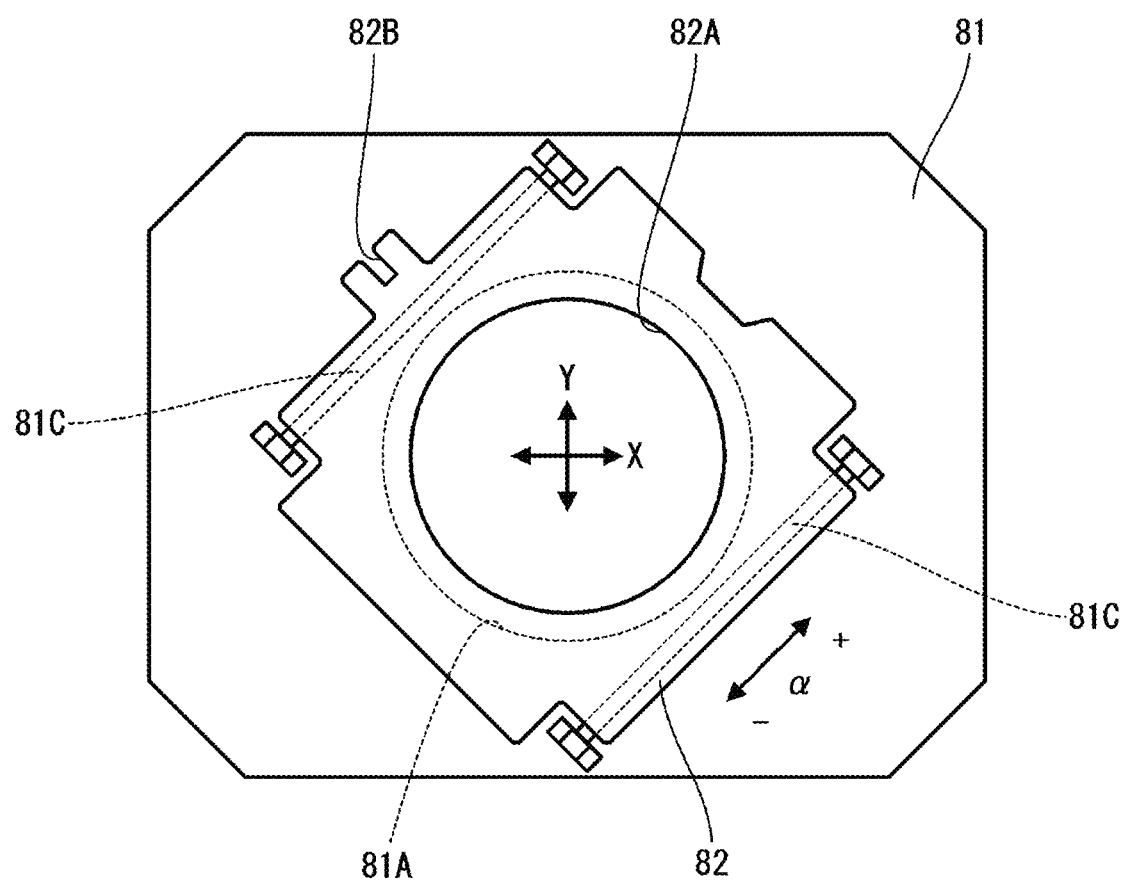
FIG. 41 is a front view illustrating a support structure of a first slide plate with respect to a base plate.

FIG. 41 is a front view illustrating a support structure of the first slide plate with respect to the base plate.

As illustrated in the drawing, the base plate 81 includes two parallel first slide rails 81C. The two first slide rails 81C are disposed in parallel to the base plate 81 and tilted at 45° with respect to the horizontal direction. The first slide plate 82 is slidably held along the first slide rails 81C (hereinafter, a moving direction of the first slide plate 82, that is, the longitudinal direction of the first slide rails 81C is referred to as a first direction α).

Figure 42:
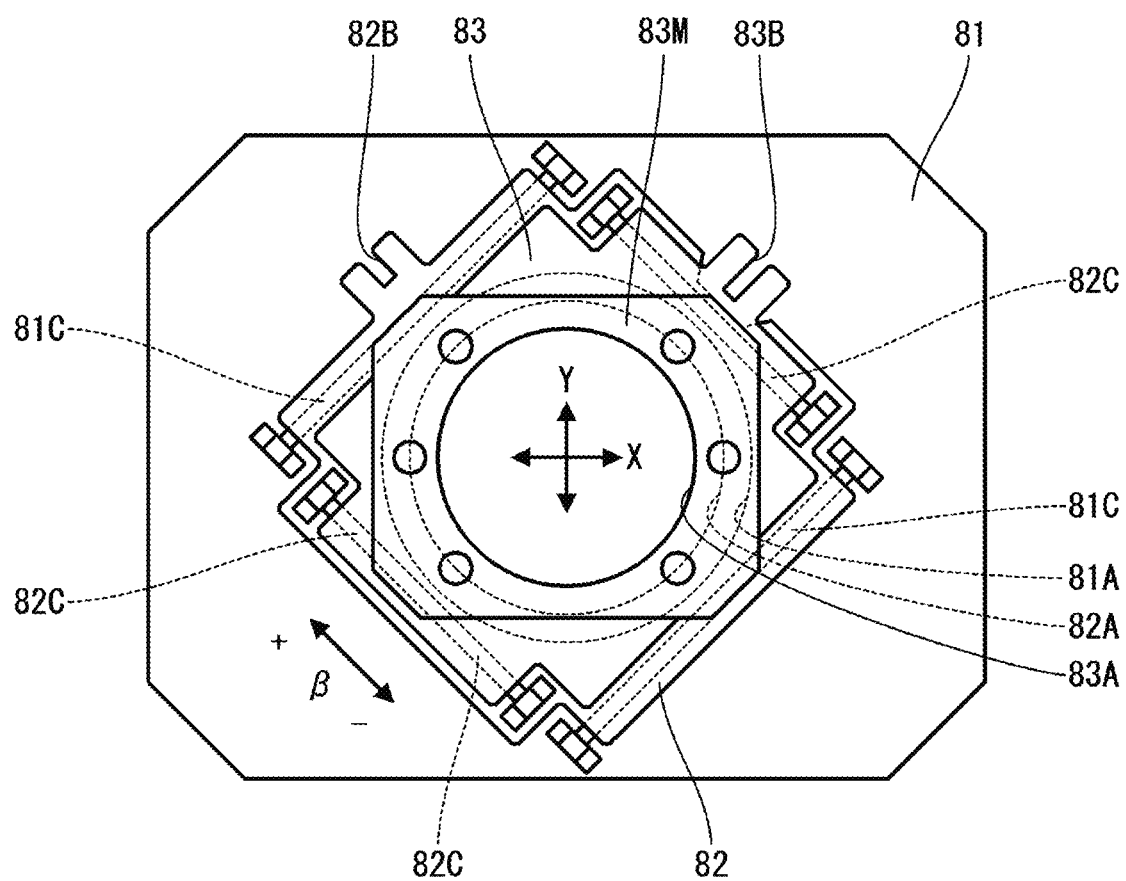
FIG. 42 is a front view illustrating a support structure of a second slide plate with respect to the first slide plate.

FIG. 42 is a front view illustrating a support structure of the second slide plate with respect to the first slide plate.

As illustrated in the figure, the first slide plate 82 includes two parallel second slide rails 82C. The two second slide rails 82C are disposed in parallel to the first slide plate 82 and orthogonally to the first direction α. The second slide plate 83 is slidably held along the second slide rails 82C (hereinafter, a moving direction of the second slide plate 83, that is, the longitudinal direction of the second slide rails 82C is referred to as a second direction β).

As illustrated in FIGS. 40, 41 and 42, the base plate 81, the first slide plate 82, and the second slide plate 83 respectively include a base opening 81A, a first opening 82A, and a second opening 83A. Each of the base opening 81A, the first opening 82A, and the second opening 83A is provided to open an optical path of image light to be projected. The positions, sizes, and shapes of the base opening 81A, the first opening 82A, and the second opening 83A are determined so as not to block the optical path of the image light even when the lens barrel 30 moves with the sliding of the first slide plate 82 and the second slide plate 83.

The first slide plate 82 includes a first groove portion 82B connected to the first slide plate driving mechanism 84, and the second slide plate 83 includes a second groove portion 83B connected to the second slide plate driving mechanism 85.

Figure 43:
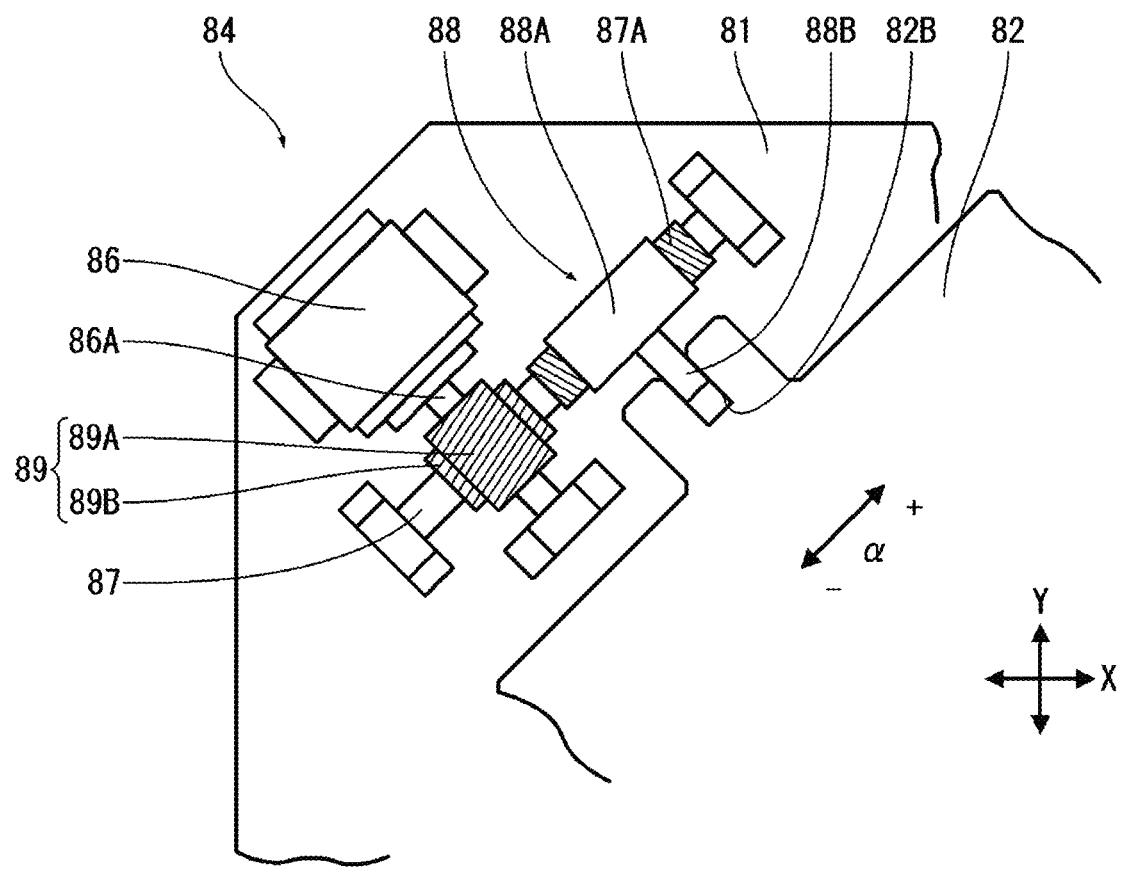
FIG. 43 is a front view illustrating a general configuration of a first slide plate driving mechanism.

FIG. 43 is a front view illustrating a general configuration of the first slide plate driving mechanism.

As illustrated in the drawing, the first slide plate driving mechanism 84 includes a first shift motor 86, a first rotating shaft 87, and a first moving piece 88. Each part of the first slide plate driving mechanism 84 is attached to the base plate 81.

The first shift motor 86 is constituted of, for example, a stepping motor. The first shift motor 86 has a first driving shaft 86A. The first driving shaft 86A is disposed orthogonally to the first direction α.

The first rotating shaft 87 is disposed orthogonally to the first driving shaft 86A of the first shift motor 86 and in parallel to the first direction α. The first rotating shaft 87 includes a first screw portion 87A constituted of a male screw.

The first rotating shaft 87 and the first driving shaft 86A are connected by a first worm gear 89 in a manner capable of transmitting rotation. The first worm gear 89 is constituted of a first worm 89A provided on the first driving shaft 86A and a first worm wheel 89B provided on the first rotating shaft 87. When the first shift motor 86 rotates, the rotation of the first driving shaft 86A is transmitted to the first rotating shaft 87 via the first worm gear 89, and the first rotating shaft 87 rotates.

The first moving piece 88 includes a first moving piece main body 88A and a first connecting portion 88B. The first moving piece main body 88A has a cylindrical shape and has a female screw portion in an inner peripheral portion. The first moving piece 88 is attached to the first rotating shaft 87 by screwing the female screw portion to the first screw portion 87A of the first rotating shaft 87. The first moving piece main body 88A of the first moving piece 88 attached to the first rotating shaft 87 slides over the first slide plate 82, and the rotation is regulated. The first connecting portion 88B is provided to protrude from the first moving piece main body 88A, as a protrusion capable of being fitted to the first groove portion 82B provided at the first slide plate 82. The first moving piece 88 is connected to the first slide plate 82 by fitting the first connecting portion 88B to the first groove portion 82B.

In the first slide plate driving mechanism 84 configured as described above, when the first shift motor 86 is driven to rotate the first rotating shaft 87, the first moving piece 88 moves along the first rotating shaft 87. When the first moving piece 88 moves along the first rotating shaft 87, the first slide plate 82 slides in the first direction α. When the first shift motor 86 is rotated forward, the first slide plate 82 slides in the + direction of the first direction α (upper right direction in FIG. 41), and when the first shift motor 86 is rotated backward, the first slide plate 82 slides in the − direction of the first direction α (lower left direction in FIG. 41).

Figure 44:
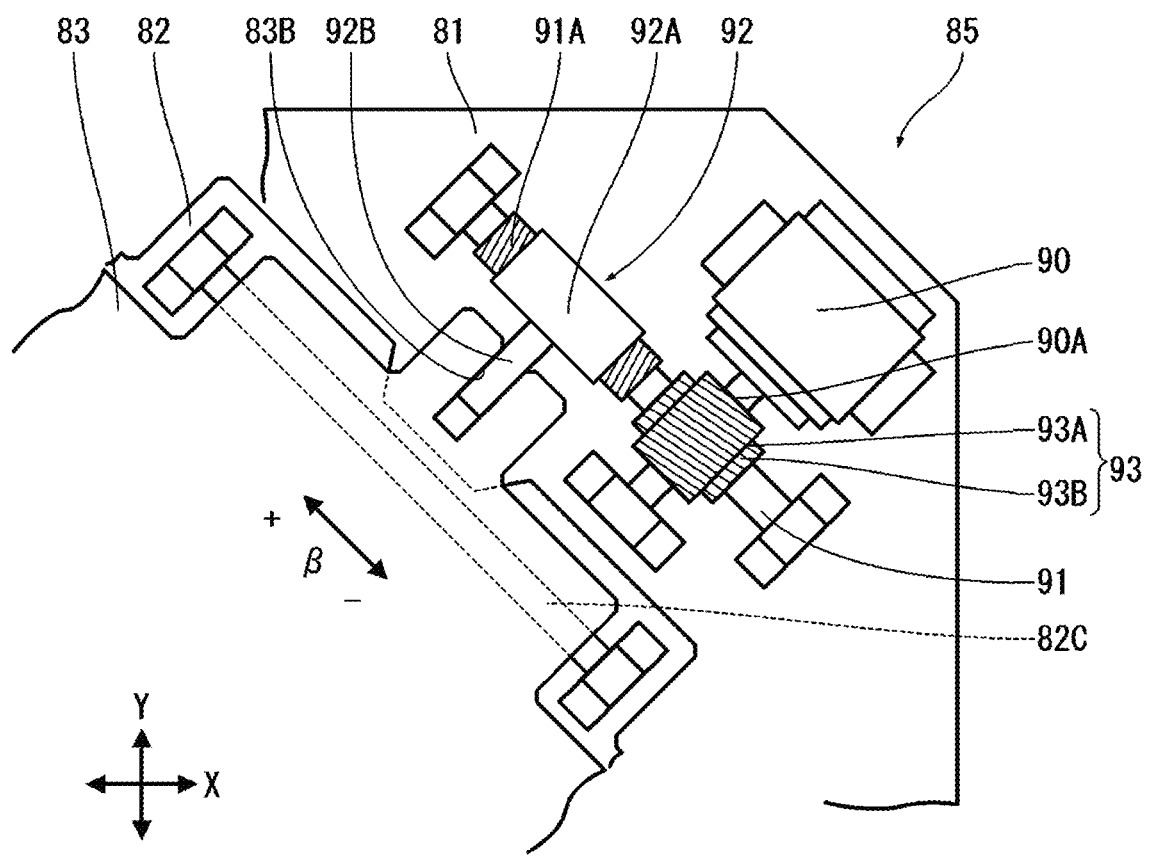
FIG. 44 is a front view illustrating a general configuration of a second slide plate driving mechanism.

FIG. 44 is a front view illustrating a general configuration of the second slide plate driving mechanism.

As illustrated in the drawing, the second slide plate driving mechanism 85 includes a second shift motor 90, a second rotating shaft 91, a second moving piece 92, the base plate 81, a second driving shaft 90A, a second screw portion 91A, a second worm gear 93, a second worm 93A, a second worm wheel 93B, a second moving piece main body 92A, and a second connecting portion 92B. The mechanism of the second slide plate driving mechanism 85 is substantially the same as the mechanism of the first slide plate driving mechanism 84. The details of each member of the second slide plate driving mechanism 85 are substantially the same as those of each corresponding member of the first slide plate driving mechanism 84.

Shift Operation of Lens Shift Mechanism

The lens shift mechanism 80 configured as described above controls driving of the first shift motor 86 and the second shift motor 90 to shift the projection lens 3 in a plane orthogonal to the first optical axis Z1.

For example, when the projection lens 3 is shifted in the upper direction, the first shift motor 86 and the second shift motor 90 are rotated forward by the same amount. Accordingly, the first slide plate 82 slides in the + direction of the first direction α (upper right direction in FIG. 40), and the second slide plate 83 slides in the + direction of the second direction β (upper left direction in FIG. 40), so that the projection lens 3 is shifted in the upper direction.

For example, when the projection lens 3 is shifted in the lower direction, the first shift motor 86 and the second shift motor 90 are rotated backward by the same amount. Accordingly, the first slide plate 82 slides in the − direction of the first direction α (lower left direction in FIG. 40), and the second slide plate 83 slides in the − direction of the second direction β (lower right direction in FIG. 40), so that the projection lens 3 is shifted in the lower direction.

For example, when the projection lens 3 is shifted in the right direction, the first shift motor 86 is rotated forward and the second shift motor 90 is rotated backward by the same amount. Accordingly, the first slide plate 82 slides in the + direction of the first direction α (upper right direction in FIG. 40), and the second slide plate 83 slides in the − direction of the second direction β (lower right direction in FIG. 40), so that the projection lens 3 is shifted in the right direction.

For example, when the projection lens 3 is shifted in the left direction, the first shift motor 86 is rotated backward and the second shift motor 90 is rotated forward by the same amount. Accordingly, the first slide plate 82 slides in the − direction of the first direction α (lower left direction in FIG. 40), and the second slide plate 83 slides in the + direction of the second direction β (upper left direction in FIG. 40), so that the projection lens 3 is shifted in the left direction.

Electrical Internal Configuration of Projection Apparatus

Figure 45:
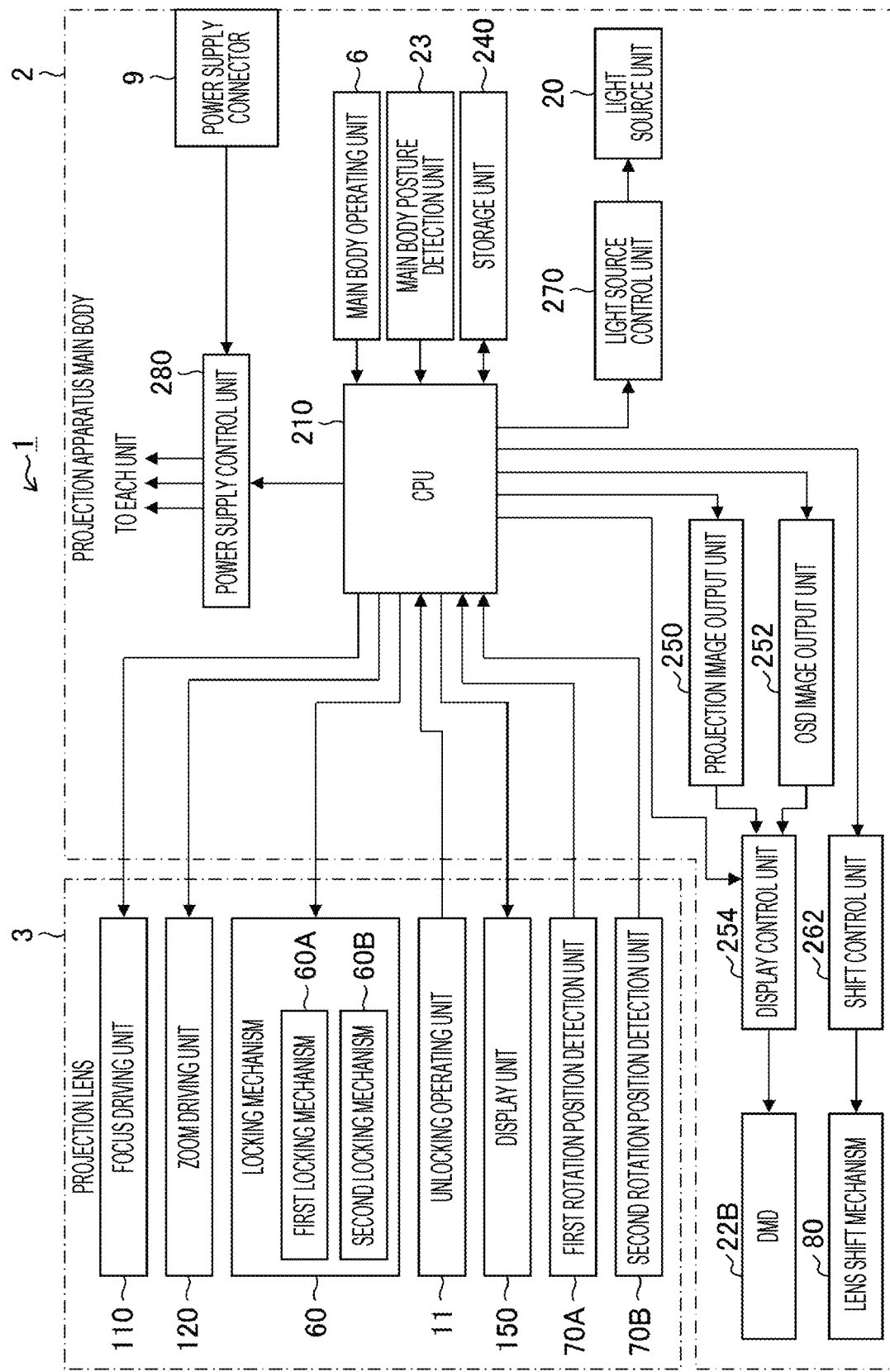
FIG. 45 is a block diagram illustrating an embodiment of an electrical internal configuration of the projection apparatus.

FIG. 45 is a block diagram illustrating an embodiment of an electrical internal configuration of the projection apparatus.

As illustrated in FIG. 45, the projection lens 3 of the projection apparatus 1 includes a focus driving unit 110, a zoom driving unit 120, the locking mechanism 60, the unlocking operating unit 11, a display unit 150, the first rotation position detection unit 70A, and the second rotation position detection unit 70B. The optical systems and the holders of the projection lens 3 are omitted.

The projection apparatus main body 2 of the projection apparatus 1 is provided with a central processing unit (CPU) 210, the main body posture detection unit 23, a storage unit 240, a projection image output unit 250, an on screen display (OSD) image output unit 252, a display control unit 254, the lens shift mechanism 80, a shift control unit 262, a light source control unit 270, a power supply control unit 280, and so forth in addition to the main body operating unit 6, the power supply connector 9, the light source unit 20, and the DMD 22B described above.

The focus driving unit 110 includes the focus motor 58 and a driving circuit thereof, and drives the focus motor 58 based on a focus command from the CPU 210 (see FIG. 33). As illustrated in FIG. 35, the focus driving unit 110 moves the third optical system second lens group G32 along the third optical axis Z3. Accordingly, the focus of a projection image projected from the projection lens 3 on a projection target surface (screen or the like) is adjusted.

The zoom driving unit 120 includes the zoom motor 38 and a driving circuit thereof, and drives the zoom motor 38 based on a zoom command from the CPU 210 (see FIG. 33). In FIG. 35, the zoom driving unit 120 moves the first optical system second lens group G12, the first optical system third lens group G13, and the first optical system fourth lens group G14 along the first optical axis Z1. Accordingly, the angle of view (zoom magnification) of a projection image projected from the projection lens 3 on the projection target surface is adjusted.

As described above, the locking mechanism 60 has the first locking mechanism 60A that locks the rotation of the second holder 40 to lock the rotation of the projection lens 3 around the first rotation axis θ1. The locking mechanism 60 also has the second locking mechanism 60B that locks the rotation of the third holder 50 to lock the rotation of the projection lens around the second rotation axis θ2. The first locking mechanism 60A drives the first solenoid 68A based on an unlocking command (first unlocking signal) from the CPU 210. The claw portion 64A of the first locking claw 61A is retracted from the first locking groove portion 32E by the first solenoid 68A to unlock the second holder 40. The second locking mechanism 60B drives the second solenoid 68B based on an unlocking command (second unlocking signal) from the CPU 210. The claw portion 64B of the second locking claw 61B is retracted from the second locking groove portion 51C by the second solenoid 68B to unlock the third holder 50.

The unlocking operating unit 11 has the first unlocking switch 11A for unlocking the second holder 40 locked by the first locking mechanism 60A and the second unlocking switch 11B for unlocking the third holder 50 locked by the second locking mechanism 60B.

In FIG. 1, when the first unlocking switch 11A is turned on (one push), a first unlocking command signal is output from the first unlocking switch 11A to the CPU 210. When the CPU 210 receives the first unlocking command signal from the first unlocking switch 11A, the CPU 210 outputs a first unlocking signal for unlocking the first locking mechanism 60A to the first locking mechanism 60A for a certain period (for example, 10 seconds). When the first locking mechanism 60A receives the first unlocking signal, the first locking mechanism 60A drives the first solenoid 68A to unlock the second holder 40.

Similarly, when the second unlocking switch 11B is turned on, a second unlocking command signal is output from the second unlocking switch 11B to the CPU 210. When the CPU 210 receives the second unlocking command signal from the second unlocking switch 11B, the CPU 210 outputs a second unlocking signal for unlocking the second locking mechanism 60B to the second locking mechanism 60B for a certain period (for example, 10 seconds). When the second locking mechanism 60B receives the second unlocking signal, the second locking mechanism 60B drives the second solenoid 68B to unlock the third holder 50.

The display unit 150 includes light emitting diodes (LEDs) provided on key tops of the unlocking operating unit 11 (first unlocking switch 11A and second unlocking switch 11B), and can emit white light and red light. The CPU 210 outputs a display control signal for turning on white light, blinking white light, turning on red light, and blinking red light to the display unit 150, and makes a notification of the locked states and the unlocked states of the second holder 40 and the third holder 50 of the projection lens 3, a warning, and so forth. Details of display control of the display unit 150 will be described later.

The first rotation position detection unit 70A detects the rotation position of the second holder 40. As described above, the first rotation position detection unit 70A detects the seven rotation positions (including rotation ranges) of 0°, 0° to 45°, 45° to 90°, 90°, 90° to 135°, 135° to 180°, and 180° as rotation positions of the second holder 40. The second holder 40 can rotate within a range of 0° to 180°, and as described above, the second holder 40 is in the locked state (the rotation state of the second holder 40 is a specific state) at the three positions of 0°, 90°, and 180°. The rotation position of the second holder 40 illustrated in FIG. 1 is 90°, and the rotation angle in which the second holder 40 rotates clockwise around the first rotation axis θ1 (FIG. 5) illustrated in FIG. 1 represents a positive angle.

The second rotation position detection unit 70B detects the rotation position of the third holder 50. As described above, the second rotation position detection unit 70B detects the twelve rotation positions (including rotation ranges) of 0°, 0° to 45°, 45° to 90°, 90°, 90° to 135°, 135° to 180°, 180°, 180° to 225°, 225° to 270°, 270°, 270° to 315°, and 315° to 360° as rotation positions of the third holder 50. The third holder 50 can be rotated endlessly and is brought into the locked state at the four positions of 0° (=360°), 90°, 180°, and 270° (the rotation state of the third holder 50 is a specific state) as described above. The rotation position of the third holder 50 illustrated in FIG. 1 is 0°, and the rotation angle in which the third holder 50 rotates clockwise around the second rotation axis θ2 as viewed from the right side in FIG. 1 represents a positive angle.

When the three specific states in which the second holder 40 is in the locked state and the four specific states in which the third holder 50 is in the locked state are combined, as illustrated in FIGS. 7 to 18, the projection lens 3 can take twelve locked states (specific states) with respect to the projection apparatus main body 2. In particular, the locked state (specific state) in which the rotation position of the second holder 40 is 90° and the rotation position of the third holder 50 is 0° is a housed state in which the projection lens 3 is housed in the recessed portion 15 of the projection apparatus main body 2 as illustrated in FIG. 7.

FIGS. 7 to 18 are perspective views illustrating the projection apparatus 1 in the twelve locked states of the projection lens 3, particularly illustrating the case where the projection apparatus main body 2 is horizontally placed, and FIGS. 19 to 30 illustrate the case where the projection apparatus main body 2 is vertically placed.

The projection lens 3 can take any posture with respect to the projection apparatus 1 depending on the rotation positions of the second holder 40 and the third holder 50. In contrast, the "specific posture" of the projection lens 3 includes twelve postures corresponding to the twelve locked states.

Referring back to FIG. 45, a first rotation position signal indicating the rotation position of the second holder 40 and a second rotation position signal indicating the rotation position of the third holder 50 detected by the first rotation position detection unit 70A and the second rotation position detection unit 70B, respectively, are output to the CPU 210.

The main body operating unit 6 provided on the projection apparatus main body 2 includes the power supply switch 6A, the MENU key 6B, the cross key 6C, the ENTER key 6D, the BACK key 6E, and so forth.

The MENU key 6B is an operation key for giving a command to display a menu on a projection image area that is projected on a screen. The cross key 6C is an operation key for inputting instructions in four directions of up, down, left, and right, and functions as a button (cursor movement operation means) for selecting an item from a menu window and instructing selection of various setting items from each menu. The cross key 6C functions as a multi-function key for inputting various instructions according to the content of the selected menu.

The main body posture detection unit 23 is a sensor that detects the posture (horizontal placement, vertical placement, or the like) of the projection apparatus main body 2, and can be constituted of, for example, an acceleration sensor that measures the tilt angle of the projection apparatus main body 2 with respect to the gravity direction. The main body posture detection unit 23 outputs an angle signal indicating the tilt angle of the projection apparatus main body 2 obtained by the measurement to the CPU 210. Alternatively, the main body posture detection unit 23 may be a sensor that detects two positions of the horizontal placement and the vertical placement of the projection apparatus main body 2.

In FIG. 45, the storage unit 240 includes a read only memory (ROM), a random access memory (RAM), a flash ROM, and so forth. The CPU 210 generally controls each unit of the projection apparatus 1 using the RAM as a work area based on a control program stored in the ROM of the storage unit 240 and tables and parameters stored in the ROM or the flash ROM.

In FIG. 31, light of three primary colors of red, green, and blue (or red, green, blue, and yellow) is time-divisionally incident on the DMD 22B constituting the image display unit 22 via a color wheel 24 of the light source unit 20. The DMD 22B performs optical modulation with video signals corresponding to each color time-divisionally switched and output from the display control unit 254, thereby emitting an image. By switching the image of each color at high speed, the image is recognized as a color image by human eyes due to an afterimage phenomenon. The DMD 22B has been exemplified as the electro-optical element; however, the DMD 22B is not limited to the electro-optical element, and an LED panel, an organic light emitting panel, or a liquid crystal panel may be used. In this case, a dichroic prism may be used instead of the total reflection prism 22A.

The video signals are input to the projection image output unit 250 from an external device such as a personal computer through the video input terminal 10 (see FIG. 4) such as a High-Definition Multimedia Interface (HDMI, registered trademark) terminal. The projection image output unit 250 outputs the video signals input from the video input terminal 10 as a projection image (first image) to the display control unit 254 under the control of the CPU 210.

The OSD image output unit 252 has an internal memory that stores text information, graphic information, icon images, and so forth displayed as an OSD image. In accordance with an instruction from the CPU 210, necessary information is read out from the internal memory and output to the display control unit 254 as an OSD image (second image).

The display control unit 254 receives the projection image (first image) from the projection image output unit 250 and receives the OSD image (second image) from the OSD image output unit 252. The display control unit 254 individually outputs the projection image and the OSD image to the DMD 22B based on a display control command from the CPU 210, or outputs a composite image obtained by combining the projection image and the OSD image to the DMD 22B. Moreover, the display control unit 254 appropriately rotates the projection image and the OSD image and outputs the projection image and the OSD image to the DMD 22B. Details of rotation control on the projection image and the OSD image will be described later.

The shift control unit 262 receives, from the CPU 210, the first rotation position signal indicating the rotation position of the second holder 40, the second rotation position signal indicating the rotation position of the third holder 50, and the angle signal indicating the tilt angle of the projection apparatus main body 2. Based on these input signals, the direction in which the projection image is moved (in this example, any one of the four directions of up, down, left, and right) is determined. Thereafter, a movement command is output to the lens shift mechanism 80 (see FIG. 40) to move the projection image in the determined direction.

Here, the direction in which the projection image is moved is determined to be, for example, a direction in which interference ("vignetting" of the projection image) between the projection image and the projection apparatus main body 2 itself or a table or the like on which the projection apparatus main body 2 is disposed is reduced. In addition, the movement direction of the projection lens 3 and the movement direction of the projection image do not correspond to each other on a one-to-one basis, and change in accordance with the rotation positions of the second holder 40 and the third holder 50. Thus, the direction in which the projection lens 3 is moved needs to be determined in consideration of the rotation positions of the second holder 40 and the third holder 50 and whether the projection apparatus main body 2 is placed horizontally or vertically. Details of control on the lens shift mechanism 80 will be described later.

In this example, the light source unit 20 has the laser light source 20A that emits a laser beam. However, the light source unit 20 may use a light emitting diode that emits white light or three light emitting diodes that respectively emit monochromatic light of red, green, and blue. When the three light emitting diodes are used, the color wheel 24 can be omitted.

The light source control unit 270 receives, from the CPU 210, the first rotation position signal indicating the rotation position of the second holder 40, the second rotation position signal indicating the rotation position of the third holder 50, the angle signal indicating the tilt angle of the projection apparatus main body 2, and mode information indicating a projection mode (first mode or second mode) selected by the main body operating unit 6. The light source control unit 270 determines light emission or light non-emission of the laser light source 20A of the light source unit 20 based on these input signals, and controls light emission or light non-emission of the laser light source 20A. Details of the control of the light source control unit 270 will be described later.

Power (commercial power) is supplied from the power supply connector 9 to the power supply control unit 280. When the power supply switch 6A is turned on, the power supply control unit 280 generates various voltages to be supplied from the power supplied from the power supply connector 9 to the CPU 210, the projection lens 3, the various motors in the lens shift mechanism 80, the solenoids of the locking mechanism 60 (see FIG. 36), the laser light source 20A of the light source unit 20, and so forth, and supplies power to each unit of the projection apparatus main body 2.

Moreover, the power supply control unit 280 includes an automatic power-off function of stopping the supply of power to each unit of the projection apparatus main body 2 (turning off the power supply) when the power supply switch 6A is turned off, but automatically turning off the power supply under certain conditions regardless of the operation of the power supply switch 6A. Details of the control of the power supply control unit 280 will be described later.

Configuration Relating to Rotation of Projection Lens

An outline of a configuration relating to the rotation of the projection lens 3 will be described. As described above with reference to FIGS. 32 to 35, the projection lens 3 includes the first holder 31, the second holder 40, and the third holder 50. The first holder 31 is connected to the projection apparatus main body 2 (housing), allows light of the first optical axis Z1 (first optical axis) to pass therethrough, and holds the first optical system G1 (optical system). The second holder 40 allows light of the second optical axis Z2 (second optical axis) obtained by bending the light of the first optical axis Z1 to pass therethrough, and holds the second optical system G2 (optical system). The third holder 50 allows light of the third optical axis Z3 (third optical axis) obtained by bending the light of the second optical axis Z2 to pass therethrough, and holds the third optical system G3. The second holder 40 rotates with respect to the first holder 31, and the third holder 50 rotates with respect to the second holder 40.

The projection lens 3 has the first rotation position detection unit 70A (first detection unit) that detects the rotation state of the second holder 40 and the second rotation position detection unit 70B (second detection unit) that detects the rotation state of the third holder 50, and the first rotation position detection unit 70A and the second rotation position detection unit 70B constitute a detection unit. The projection lens 3 has the first locking mechanism 60A for bringing the rotation of the second holder 40 into the locked state or the unlocked state, and the second locking mechanism 60B for bringing the rotation of the third holder 50 into the locked state or the unlocked state. The first locking mechanism 60A and the second locking mechanism 60B constitute the locking mechanism 60 (locking mechanism unit). Details of the configurations relating to the rotations are as described above with reference to FIGS. 32 to 35.

Figure 46:
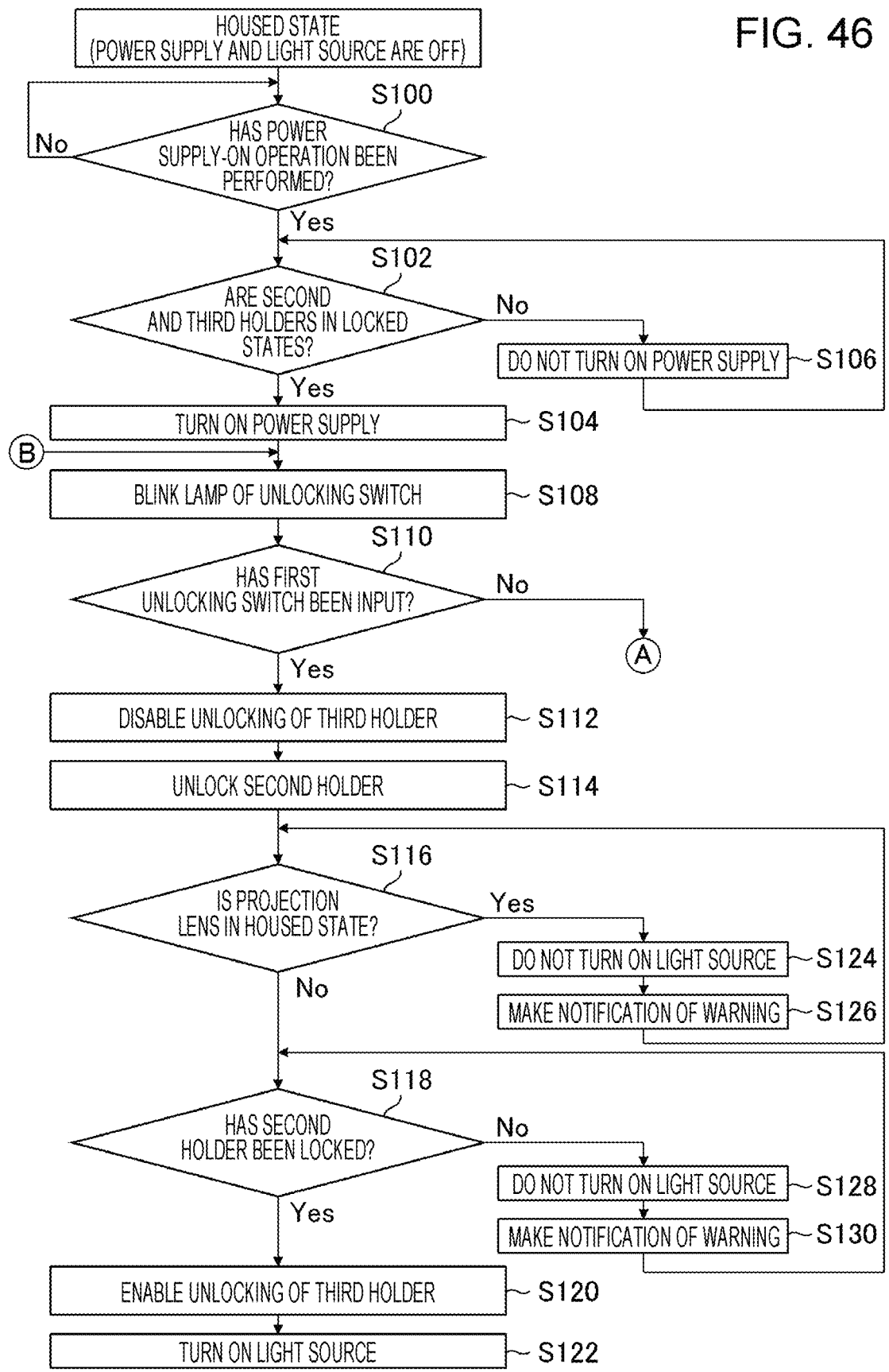
FIG. 46 is a flowchart for locked states of holders, and control of turning on a power supply and turning on a light source relating to the locked states.
Figure 47:
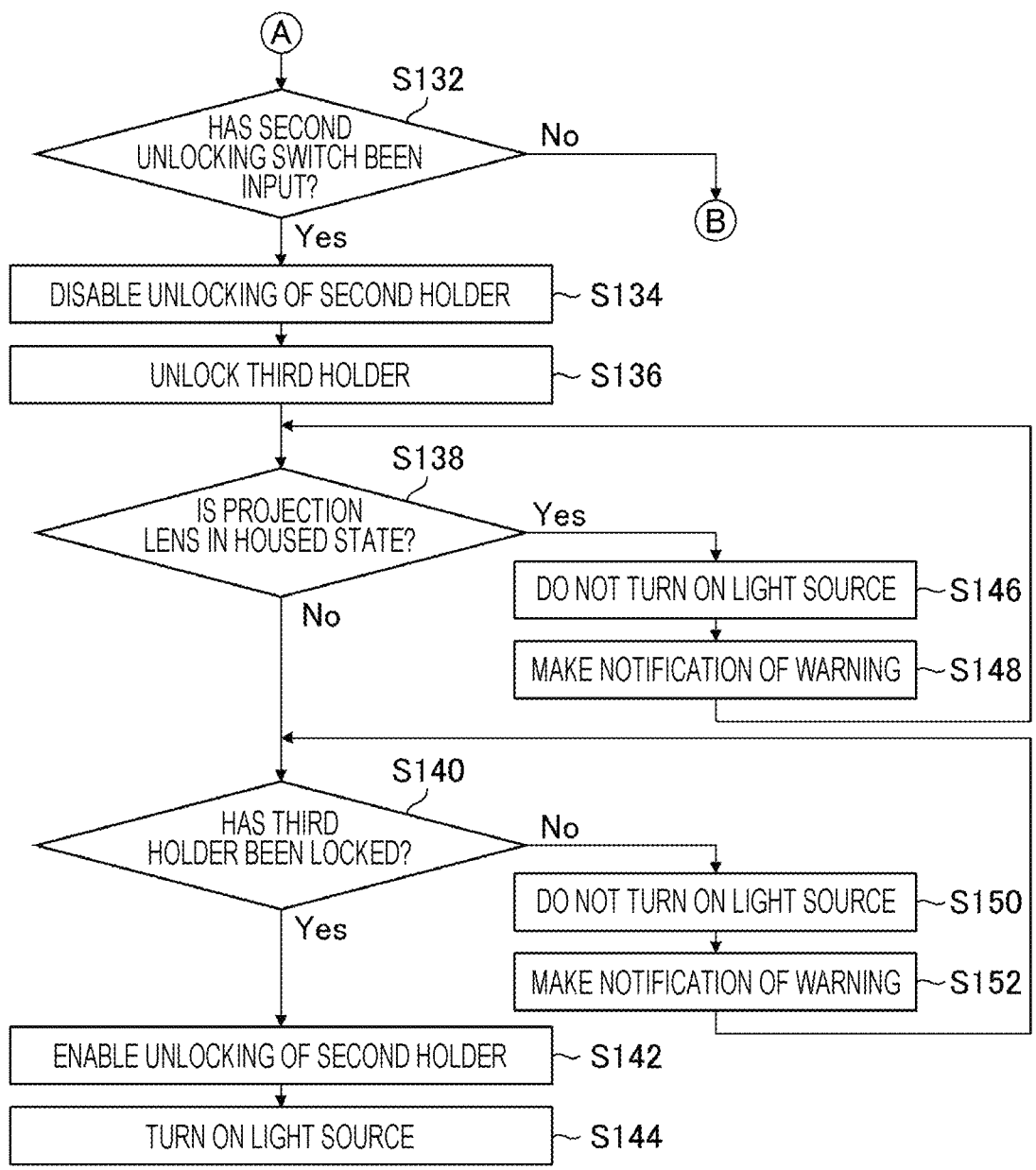
FIG. 47 is a flowchart (following FIG. 46) for the locked states of the holders, and the control of turning on the power supply and turning on the light source relating to the locked states.

Locking of Holders and Control on Power Supply and Light Source Relating to Locking Locking and unlocking of the rotations of the holders and the control on the power supply and the light source relating thereto will be described. FIGS. 46 and 47 are flowcharts illustrating a control procedure relating to locking and unlocking, turning on of the power supply, and turning on of the light source. Referring to FIGS. 46 and 47, a case is described where processing is started from a state in which the power supply and the light source are off in a state where the projection lens 3 (projection lens) is housed. The "housed state" is a state (first position) in which the projection lens 3 is housed in the recess 15a provided at the inner wall surface 15A of the recessed portion 15 of the projection apparatus main body 2 (housing), and the third optical system third lens group G33, which is the final lens group of the projection lens 3, is housed to face the recess 15a (housing) (see FIGS. 1 to 7). In this housed state, the lens cover front portion 18A (side surface), the lens cover right side portion 18D (side surface), the lens cover top portion 18E (side surface), and the lens cover bottom portion 18F (side surface) of the lens cover 18 (cover member) are in substantially the same planes as those of the housing front portion 14A (side surface), the housing right side portion 14D (side surface), the housing top portion 14E (side surface), and the housing bottom portion 14F (side surface) of the projection apparatus main body 2 (housing 14), respectively. These portions constitute a flat rectangular-parallelepiped shape (rectangular parallelepiped) together with the projection apparatus main body 2 (housing 14) (see FIGS. 1 to 7).

When the processing starts, the power supply control unit 280 determines whether or not a power supply-on operation (an operation of turning on the power supply switch 6A) has been performed (step S100). When the determination of step S100 is positive, the processing proceeds to step S102, and the locking mechanism 60 (locking mechanism unit) determines whether or not the second holder 40 and the third holder 50 are in the locked states. The power supply control unit 280 turns on the power supply (step S104) when the second holder 40 and the third holder 50 are in the locked states (YES in step S102), and does not turn on the power supply (step S106) and returns to step S102 when the second holder 40 and the third holder 50 are not in the locked states (NO in step S102).

When the power supply is turned on in step S104, the locking mechanism 60 causes the LED (display unit 150; lamp) provided at each of the first unlocking switch 11A (unlocking switch) and the second unlocking switch 11B (unlocking switch) to blink with, for example, white light (step S108). Thus, the user can easily recognize that the user needs to operate the unlocking switch. In other words, the locking mechanism 60 maintains the locked state of the rotation of each holder even when the power supply of the projection apparatus 1 is turned on.

When the first unlocking switch 11A has been input (operated) (YES in step S110), the second locking mechanism 60B (second locking mechanism unit) disables unlocking of the third holder 50 (step S112), and the first locking mechanism 60A (first locking mechanism unit) unlocks the second holder 40 (un unlocked state is attained for a certain period; step S114). When being unlocked, the LED of the first unlocking switch 11A stops blinking and continues lighting with white light. In contrast, the light of the second unlocking switch 11B of the third holder 50 in the locked state is turned off. Accordingly, the user can easily recognize the unlocked state of the second holder 40. Since the second holder 40 is in the unlocked state for the certain period, the user can perform the rotation operation of the second holder 40 during this period. Note that the locking mechanism 60 does not simultaneously unlock both the second holder 40 and the third holder 50 (when one is in the unlocked state, the other is in the locked state). Thus, it is possible to prevent the two shafts from being simultaneously rotatable and from being unintentionally rotated.

The first rotation position detection unit 70A and the second rotation position detection unit 70B detect the rotation states of the second holder 40 and the third holder 50, respectively, and determine whether or not the projection lens 3 is in the housed state (first position) (step S116). When the projection lens 3 has not been rotated and remains in the housed state (YES in step S116), the light source control unit 270 does not turn on the laser light source 20A (light source) (step S124) and notifies the user of a warning (step S126). The warning in step S126 can be performed by, for example, the locking mechanism 60 (first locking mechanism 60A and second locking mechanism 60B) causing the LEDs of the first unlocking switch 11A and the second unlocking switch 11B to blink with white light. In contrast, in the warning of step S126, the projection apparatus 1 may cause the display unit 150 to generate a warning sound such as a beep sound by a device such as an electronic circuit (not illustrated) instead of or in addition to blinking. This warning state continues while the determination of step S116 is YES (while the projection lens 3 is in the housed state).

When the rotation state of the projection lens 3 is changed to a state other than the housed state (the projection lens 3 is displaceable to a first position that represents the housed state and a second position other than the first position), the determination of step S116 is negative, and when the second holder 40 is locked in a specific state (described later), the determination of step S118 is positive. In this state, the locking mechanism 60 enables unlocking of the third holder 50 (step S120), and the light source control unit 270 turns on the laser light source 20A (light source) (step S122). In contrast, when the second holder 40 is not locked (for example, when the rotation state is not in the specific state in which locking is enabled; NO in step S118), the light source control unit 270 does not turn on the laser light source 20A (step S128), makes a notification of a warning by, for example, blinking with red light of the LED or a beep sound (step S130), and the processing returns to step S118. Note that "enables unlocking" is a state in which unlocking is attained when the user inputs (operates) the unlocking switch (first unlocking switch 11A or second unlocking switch 11B), and "disables unlocking" is a state in which unlocking is not attained even when the unlocking switch is input.

In FIG. 47, when the first unlocking switch 11A has not been input (operated) in step S110 and the second unlocking switch 11B has been input (YES in step S132), the first locking mechanism 60A disables unlocking of the second holder 40 (step S134), and the second locking mechanism 60B unlocks the third holder 50 (unlocked state; step S136). When unlocking is attained, the blinking of the LED ends, and the second unlocking switch 11B of the third holder 50 that has been unlocked, for example, continues turning on white light. In contrast, the first unlocking switch 11A of the second holder 40 in the locked state is turned off. Thus, the user can easily recognize the unlocked state of the third holder 50. Since the third holder 50 is in the unlocked state for a certain period, the user can perform the rotation operation of the third holder 50 during this period. When the second unlocking switch 11B has not been input (NO in step S132), the processing returns to step S108.

After the third holder 50 is unlocked, the first rotation position detection unit 70A (detection unit) and the second rotation position detection unit 70B (detection unit) detect the rotation states of the second holder 40 and the third holder 50, respectively, and determine whether or not the projection lens 3 is in the housed state (step S138). When the determination is positive (in the housed state), the light source control unit 270 does not turn on the laser light source 20A (light source) (step S146), and notifies the user of a warning by, for example, blinking with white light of the LED or a beep sound (step S148), and the processing returns to step S138. When the determination of step S138 is negative (not in the housed state), the third holder 50 is in a specific state (described later) and is locked (YES in step S140). Then, the locking mechanism 60 enables unlocking of the second holder 40 for a certain period (step S142), and the light source control unit 270 turns on the laser light source 20A (step S144). In contrast, when the third holder 50 is not locked (for example, when the rotation state is not in the specific state in which locking is possible; NO in step S140), the light source control unit 270 does not turn on the laser light source 20A (step S150), makes a notification of a warning by, for example, blinking with red light of the LED or a beep sound (step S152), and the processing returns to step S140.

Effect of Control Relating to Locking

As described above, since the power supply is not turned on when the projection lens 3 is in a rotatable state, each of the holders is not able to be rotated unless the user instructs unlocking. Thus, it is possible to prevent rotation of the projection lens 3, the rotation which is not intended by the user, and to appropriately restrict the rotation state of the projection lens 3. That is, it is possible to appropriately perform control relating to the rotation of the projection lens. In addition, as described in S218 of FIG. 51, the power supply of the projection apparatus is not able to be turned off when the holders are in states other than the specific states. Thus, when the power supply is turned on, the rotation of the projection lens 3 can be brought into the locked state.

When the light source is turned on in the state in which the projection lens 3 is in the housed state (first position), emitted light hits the recess 15a of the projection apparatus main body 2, the temperature increases, and there is a concern that the increase in temperature adversely affects the operation of the projection apparatus 1. However, by performing the control as described above, it is possible to prevent such an adverse effect. Since it is considered that the user is preparing to use the projection apparatus 1 such as changing the rotation state or setting the projection direction when the first unlocking switch 11A or the second unlocking switch 11B is input, the light source is turned on in accordance with the input of these unlocking switches.

Locking in Specific State

Figure 48:
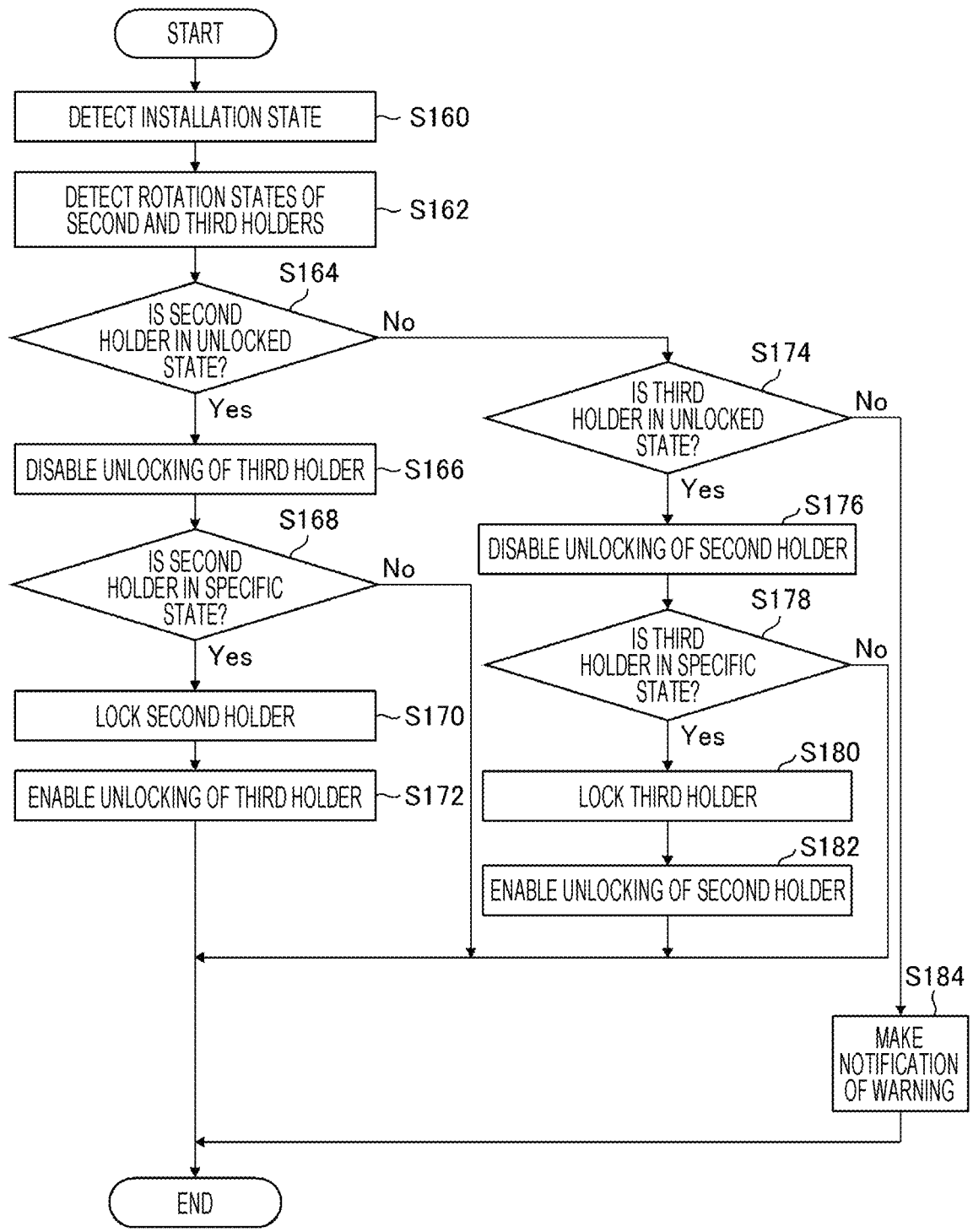
FIG. 48 is a flowchart for locking of the holders.

The second holder 40 and the third holder 50 are locked when the rotation states become the specific states. In other words, the second holder 40 and the third holder 50 are unlocked in states other than the specific states. Such locking control will be described. FIG. 48 is a flowchart illustrating processing relating to locking of the holders. The main body posture detection unit 23 (third detection unit) detects the direction (posture; horizontal placement, vertical placement, or other posture) of the projection apparatus 1 with respect to the gravity (step S160). The first rotation position detection unit 70A and the second rotation position detection unit 70B detect the rotation states of the second holder 40 and the third holder 50, respectively (step S162). FIGS. 7 to 18 illustrate the projection apparatus 1 in horizontally placed states, and FIGS. 19 to 30 illustrate the projection apparatus 1 in vertically placed states. The locking mechanism 60 (first locking mechanism 60A; locking mechanism unit) determines whether or not the second holder 40 is in the unlocked state (step S164). When the second holder 40 is in the unlocked state (YES in step S164), it is determined that unlocking of the third holder 50 is disabled (the third holder 50 is not unlocked even when the second unlocking switch 11B is input) (step S166).

The locking mechanism 60 of the first locking mechanism 60A (locking mechanism unit) determines whether or not the second holder 40 is in the specific state based on the rotation state of the second holder 40 detected in step S162 (step S168). The situation in which "the second holder 40 is in the specific state" means that the rotation position of the second holder 40 is any one of 0°, 90°, and 180°. When the second holder 40 is in the "specific state" (YES in step S168), the first locking mechanism 60A can lock the second holder 40 (step S170) as described above with reference to FIG. 36. The second locking mechanism 60B enables unlocking of the third holder 50 (a state in which the third holder 50 can be unlocked by inputting the second unlocking switch 11B) (step S172). When the second holder 40 is not in the "specific state" (NO in step S168), the first locking mechanism 60A cannot lock the second holder 40. In addition to the situation in which "the second holder 40 is in the specific state", the second holder 40 may be locked when the direction of the projection apparatus 1 with respect to the gravity is in a specific state (vertical placement or horizontal placement).

In contrast, when the determination of step S164 is NO (when the second holder 40 is not in the unlocked state, that is, in the locked state), the locking mechanism 60 (second locking mechanism 60B; locking mechanism unit) determines whether or not the third holder 50 is in the unlocked state (step S174). When the determination is NO, since both the second holder 40 and the third holder 50 are in the locked states, a notification of a warning is made (step S184). As described above with respect to step S102 in FIG. 46, the content of the warning prompts the user to input the first unlocking switch 11A or the second unlocking switch 11B.

When the third holder 50 is in the unlocked state (YES in step S174), the first locking mechanism 60A (locking mechanism unit) disables unlocking of the second holder 40 (step S176). The locking mechanism 60 of the second locking mechanism 60B (locking mechanism unit) determines whether or not the third holder 50 is in the specific state based on the rotation state of the third holder 50 detected in step S162 (step S178). The situation in which "the third holder 50 is in the specific state" means that the rotation position of the third holder 50 is any one of 0°, 90°, 180°, and 270°. When the third holder 50 is in the "specific state" (YES in step S178), the second locking mechanism 60B locks the third holder 50 (step S180). The first locking mechanism 60A enables unlocking of the second holder 40 (a state in which the second holder 40 can be unlocked by inputting the first unlocking switch 11A) (step S182). When the third holder 50 is not in the specific state, the second locking mechanism 60B does not lock the third holder 50. In addition to the situation in which "the third holder 50 is in the specific state", the third holder 50 may be locked when the direction of the projection apparatus 1 with respect to the gravity is in a specific state (vertical placement or horizontal placement).

Effect of Locking in Specific State

As described above, since the second holder 40 and the third holder 50 are locked when being in the specific states, and these holders are not simultaneously unlocked (when one is in the unlocked state, the other is in the locked state), it is possible to appropriately restrict the rotation state and prevent an adverse effect due to unexpected rotation or the like. That is, it is possible to appropriately perform control relating to the rotation of the projection lens. In addition to "the second holder 40 and the third holder 50 are in the specific states", the second holder 40 and/or the third holder 50 may be locked when the direction of the projection apparatus 1 with respect to the gravity is in a specific state (vertical placement or horizontal placement).

Restriction of Unlocking in Unsafe State

Figure 49:
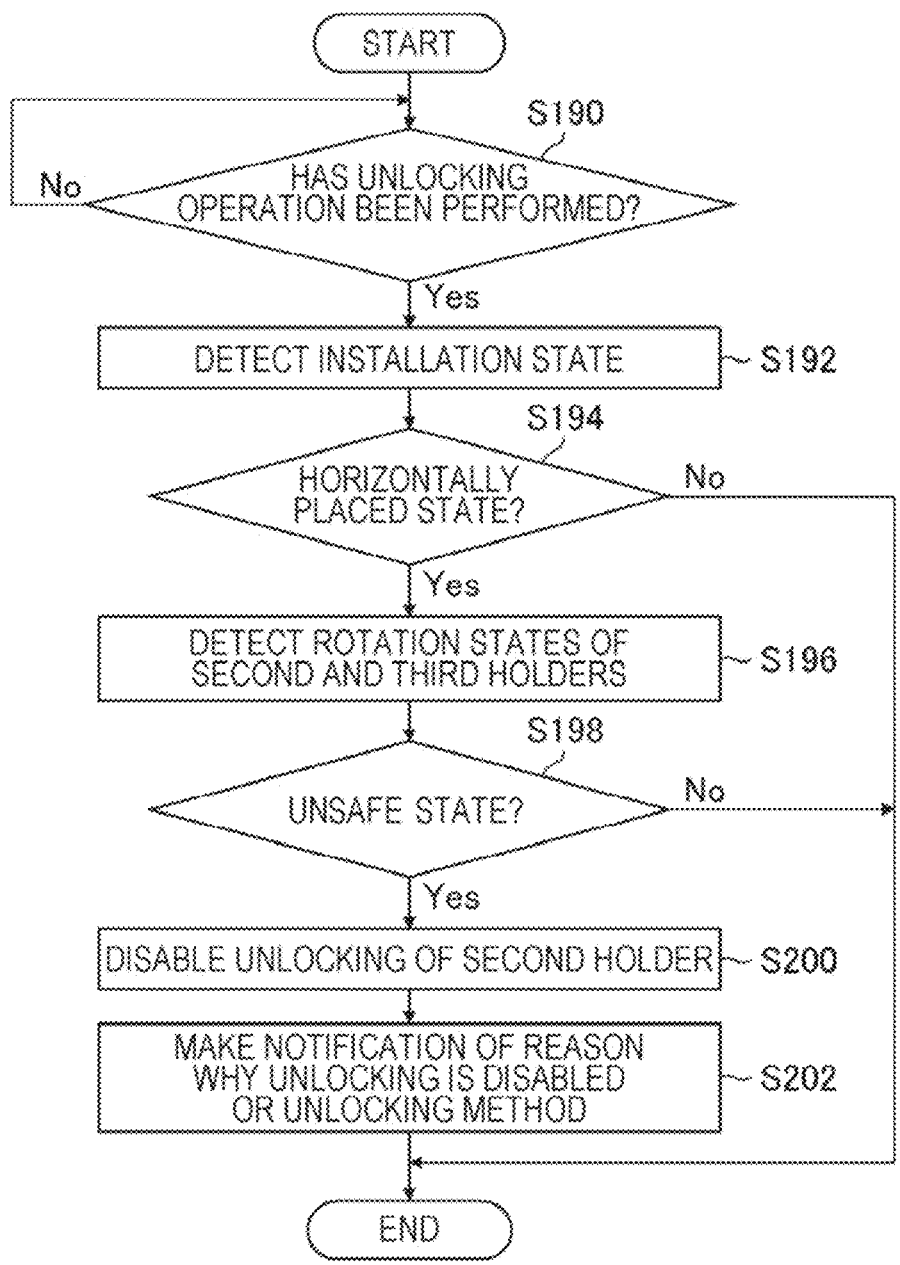
FIG. 49 is a flowchart when unlocking of the holders is disabled.

Restriction of unlocking in an unsafe state will be described. FIG. 49 is a flowchart of processing of restricting unlocking. The locking mechanism 60 determines whether or not the unlocking operation (input of the first unlocking switch 11A or the second unlocking switch 11B) has been performed (step S190). The main body posture detection unit 23 (third detection unit) detects the direction (installation state) of the projection apparatus 1 with respect to the gravity (step S192), and determines whether the projection apparatus 1 is placed horizontally or vertically (step S194). FIGS. 7 to 18 illustrate the projection apparatus 1 in horizontally placed states, and FIGS. 19 to 30 illustrate the projection apparatus 1 in vertically placed states.

In the case of vertical placement (NO in step S194), there is no state in which unlocking is disabled, and thus the processing ends. In the case of horizontal placement (YES in step S194), the first rotation position detection unit 70A and the second rotation position detection unit 70B detect the rotation states of the second holder 40 and the third holder 50, respectively (step S196). Then, the locking mechanism 60 (first locking mechanism 60A, second locking mechanism 60B: locking mechanism unit) determines whether or not the second holder 40 and the third holder 50 are each in an unsafe state (step S198). The "unsafe state" in step S198 is, for example, a state in which the rotation position of the second holder 40 is 0° and the rotation position of the third holder 50 is 90° (see FIG. 10). When this determination is positive, the locking mechanism 60 disables unlocking of the second holder 40 (step S200). By disabling unlocking of the second holder 40 in this state, it is possible to prevent the third optical system third lens group G33 (emission optical system), which is the final lens, from colliding with the installation surface or the like due to the rotation of the second holder 40. Note that the situation in which "disabling unlocking of the second holder 40" is a state in which unlocking is not attained even when the first unlocking switch 11A is input.

When unlocking of the second holder 40 is disabled in step S200, the locking mechanism 60, the OSD image output unit 252, and the display control unit 254 make a notification of the reason why unlocking is disabled or an unlocking method (step S202). Specifically, the notification can be made using an OSD image, for example. FIG. 50 is a view illustrating an example of a notification using the OSD image. Part (a) of the drawing illustrates an example of displaying the reason why unlocking is disabled using an OSD image 99A combined with a projection image 98 ("lens cannot be rotated around axis 1 at this position"). Part (b) of the drawing illustrates an example of displaying an unlocking method using an OSD image 99B (when the third holder 50 is rotated to another angle from the state illustrated in FIG. 10, there is no risk of collision, and hence the second holder 40 can be unlocked). Alternatively, both the reason why the unlocking is disabled and the unlocking method may be displayed. With such a display, the user can easily recognize the reason why the unlocking is disabled and the unlocking method. Note that the control can be similarly performed when the unlocking of the second holder 40 is disabled in another "unsafe state" other than the above-described state (the state in which the rotation position of the second holder 40 is 0° and the rotation position of the third holder 50 is 90°), and when the unlocking of the third holder 50 is disabled in yet another "unsafe state".

As described above, according to the projection apparatus 1 (projection apparatus) and the projection lens 3 (projection lens), it is possible to appropriately perform control relating to the rotation of the projection lens (control of the rotation state of the projection lens, the power supply and the light source relating to the rotation state, and the locked states of the holders).

Shape and so Forth of Projection Apparatus in Housed State

In the projection apparatus 1 in the housed state, the lens cover front portion 18A (side surface), the lens cover right side portion 18D (side surface), the lens cover top portion 18E (side surface), and the lens cover bottom portion 18F (side surface) of the lens cover 18 (cover member) are in substantially the same planes as those of the housing front portion 14A (side surface), the housing right side portion 14D (side surface), the housing top portion 14E (side surface), and the housing bottom portion 14F (side surface) of the projection apparatus main body 2 (housing), respectively. These portions constitute a flat rectangular-parallelepiped shape (rectangular parallelepiped) together with the projection apparatus main body 2 (see FIGS. 1 to 7). Accordingly, the projection apparatus 1 can be installed and housed in a stable state, and it is possible to prevent one surface from protruding and colliding, being damaged, or the like. Moreover, since the rectangular-parallelepiped shape is provided, installation, housing, and so forth are easily performed. Note that the "rectangular-parallelepiped shape" is not limited to a geometrically perfect rectangular parallelepiped, and a gap may be provided between the projection lens 3 and the projection apparatus main body 2 (housing), or the projection lens 3 or the projection apparatus main body 2 may have protrusions such as the horizontal placement leg portions 12, the vertical placement leg portions 13, and the main body operating unit 6, and a recess such as the power supply connector 9. Also, for example, a portion of the projection lens 3 and/or the projection apparatus main body 2 may be chamfered. Also, being "in the same plane" is not limited to the geometrically perfect same plane, and each surface of the lens cover 18 and a corresponding surface of the projection apparatus main body 2 described above may be shifted from each other within a range in which installation or housing of the projection apparatus 1 is not hindered.

Locking in Specific State and Projection of Light Relating to Rotation State

Figure 51:
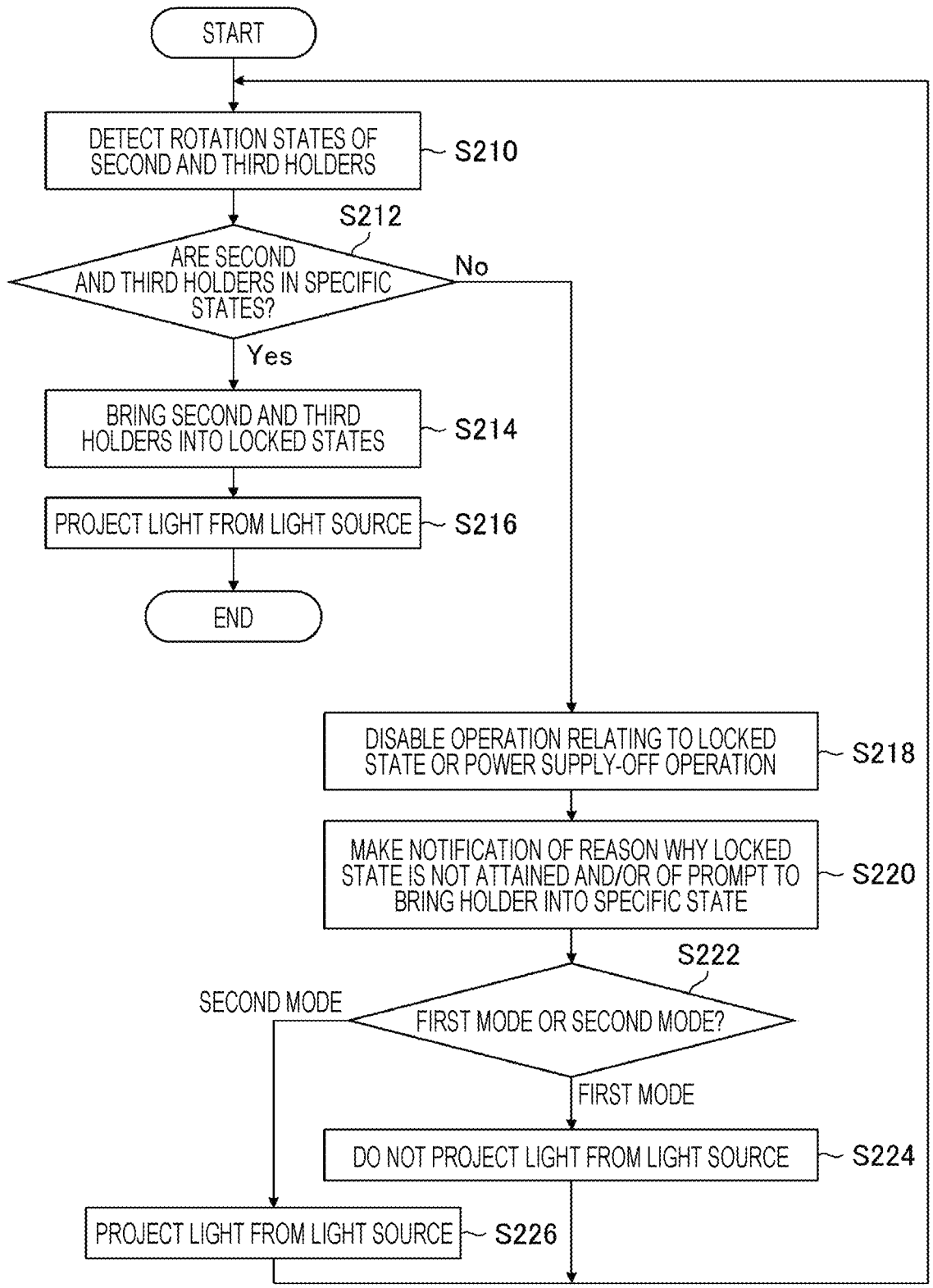
FIG. 51 is a flowchart illustrating a procedure of control relating to locking of the holders and projection of light.

Locking when the rotation states of the holders are the specific states and projection of light from the light source relating to the rotation states will be described. FIG. 51 is a flowchart illustrating a procedure of control relating to locking of the holders and projection of light. The first rotation position detection unit 70A and the second rotation position detection unit 70B detect the rotation states of the second holder 40 and the third holder 50, respectively (step S210), and determine whether or not the second holder 40 and the third holder 50 are in the specific states (step S212). The situation in which "the second holder 40 is in the specific state" is a case where the rotation position of the second holder 40 is any one of 0°, 90°, and 180°, and the situation in which "the third holder 50 is in the specific state" is a case where the rotation position of the third holder 50 is any one of 0° (360°), 90°, 180°, and 270°. When both the second holder 40 and the third holder 50 are in the specific states (YES in step S212), the first locking mechanism 60A (locking mechanism unit) brings the second holder 40 into the locked state, and the second locking mechanism 60B (locking mechanism unit) brings the third holder 50 into the locked state (step S214). When the second holder 40 and the third holder 50 are brought into the locked states, the light source control unit 270 projects light from the laser light source 20A (light source) (step S216).

In contrast, when the second holder 40 and/or the third holder 50 is in a state other than the specific state (NO in step S212), the locking mechanism 60 (first locking mechanism 60A, second locking mechanism 60B) cannot bring the holder (second holder 40, third holder 50) into the locked state. This is because the claw portion (claw portion 64A, claw portion 64B) of the locking mechanism 60 is not fitted to the locking groove portion (first locking groove portion 32E, second locking groove portion 51C) at an angle other than the rotation angle at which the specific state is set. In this case, the unlocking operating unit 11 (first unlocking switch 11A, second unlocking switch 11B) (control unit) disables the operation relating to the locked state (step S218). Alternatively, the power supply control unit 280 (control unit) disables the operation of turning off the power supply (step S218). The "operation relating to the locked state" is, for example, an operation of locking (an operation of setting the locked state) or an operation of unlocking the locked holder.

Figure 52:
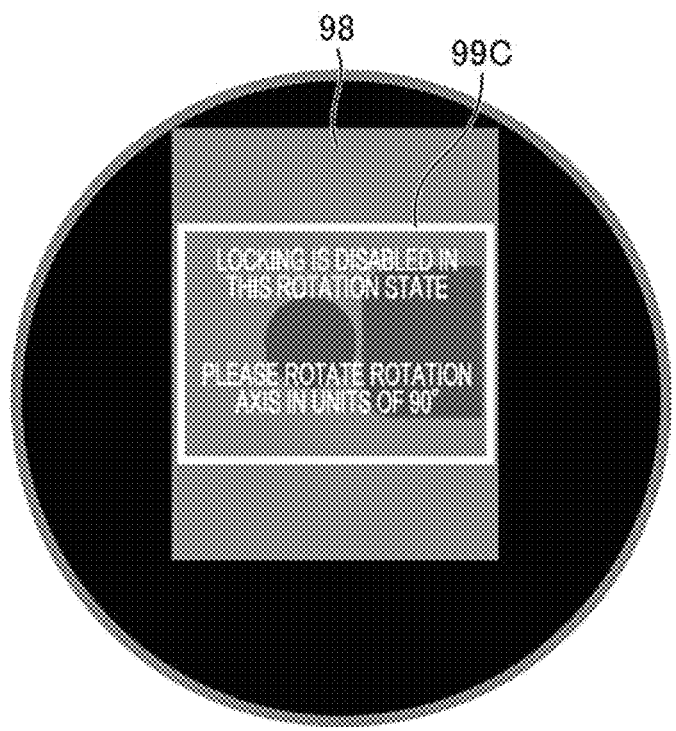
FIG. 52 illustrates an example of a notification of the reason why the locked state is disabled and/or a prompt to set the holder to a specific state.

The locking mechanism 60 (control unit), the OSD image output unit 252 (control unit), and the display control unit 254 (control unit) notifies the user of the reason why the holder (second holder 40 and/or third holder 50) cannot be brought into the locked state and/or notifies the user of a prompt to bring the holder into the specific state (step S220). FIG. 52 illustrates a notification example of a prompt using an OSD image 99C combined with the projection image 98, in which the message that "Locking is disabled in this rotation state" represents a notification example of the reason why the locked state is disabled, and the message that "Please rotate rotation axis in units of 90°" represents a notification example of a prompt to bring the holder into the specific state. Although the user is notified of the reason and the prompt in the example of FIG. 52, the user may be notified of one of the reason and the prompt. By following such a notification, the user can quickly bring the holder into the locked state. The notification in step S220 may be performed through blinking of the LED or a beep sound. In the case where the operation of turning off the power supply is disabled, the notification of the reason for the disabling and the notification of the prompt to attain the specific state are similar to the above-described notification in the case where the locked state is disabled.

After the notification in step S220, the light source control unit 270 (control unit) determines whether a first mode or a second mode is set (step S222). The "first mode" is a mode in which light from the laser light source 20A (light source) is not projected in a state other than the specific state, and the "second mode" is a mode in which light from the laser light source 20A is projected in a state other than the specific state. In the first mode, the projection lens 3 (projection lens) does not project light from the laser light source 20A (light source) under the control of the light source control unit 270 (control unit) (step S224), and in the second mode, the projection lens 3 (projection lens) projects light from the laser light source 20A under the control of the light source control unit 270 (control unit) (step S226). The user can set the first mode or the second mode by operating the main body operating unit 6, and can thereby desirably set whether or not to perform projection during the rotation operation. In particular, in the projection apparatus 1 of the present embodiment, when each holder of the projection lens is rotated, the projection image is also rotated. In this case, it is also assumed that the user does not want to visually recognize the projection image in the state during rotation. Thus, in the present embodiment, the user can switch between two modes.

As described above, when the second holder 40 and the third holder 50 are not in the specific states, the power supply-off operation is disabled (step S218). However, the power may be forcibly turned off due to, for example, the power supply cable (not illustrated) connected to the power supply connector 9 being pulled out. However, as illustrated in FIGS. 36 and 37, by rotating the second holder 40 or the third holder 50 to the specific state, the claw portion (claw portion 64A, claw portion 64B) is automatically fitted to the locking groove portion (first locking groove portion 32E, second locking groove portion 51C). That is, even when the power supply of the projection apparatus 1 is off, the locking mechanism 60 locks each holder in the specific state.

In the projection apparatus 1, since the control on the locked state and the projection of the light relating to the locked state are performed as described above, it is possible to appropriately perform control relating to the rotation of the projection lens.

Figure 53:
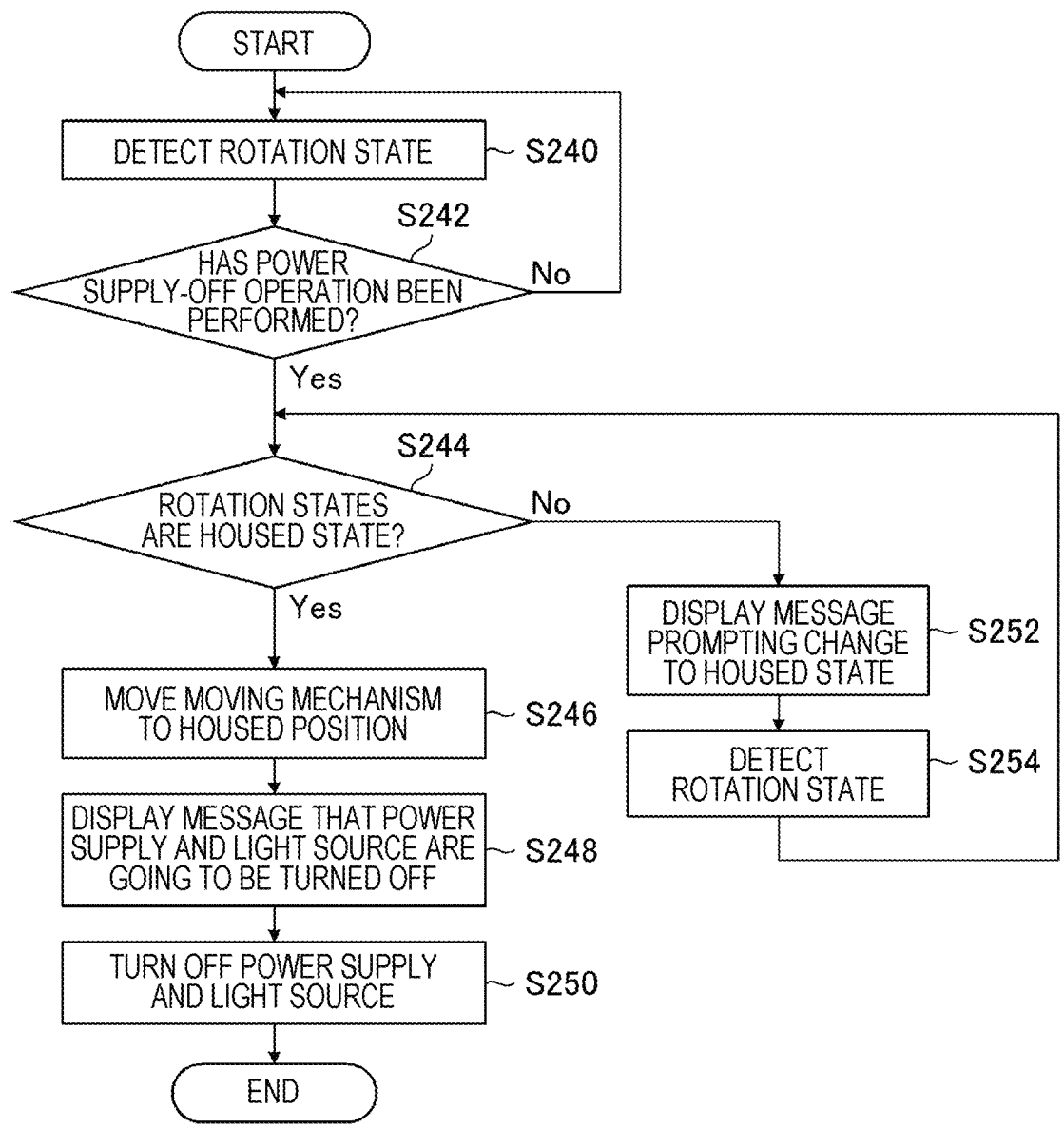
FIG. 53 is a flowchart relating to control of turning off the power supply and the light source in association with a rotation state and a movement state.

Rotation and Movement of Projection Lens, and Control on Power Supply and Light Source Relating Thereto FIG. 53 is a flowchart illustrating a procedure of control of turning off the power supply and the light source in relation to the rotation state and the movement state. The first rotation position detection unit 70A (first detection unit) and the second rotation position detection unit 70B (second detection unit) detect the rotation states of the second holder 40 and the third holder 50, respectively (step S240). The power supply control unit 280 determines whether or not the operation of turning off the power supply (for example, an operation to the power supply switch 6A) has been input (step S242), and when the operation has been input (YES in step S242), the first rotation position detection unit 70A and the second rotation position detection unit 70B determine whether or not the rotation states are a housed state (step S244).

When the rotation states are the housed state (YES in step S244), the shift control unit 262 (control unit) moves the lens shift mechanism 80 (moving mechanism) to the housed position (step S246). Accordingly, the projection lens 3 moves with respect to the projection apparatus main body 2 (housing), and the projection lens 3 is brought into the "housed state". The "housed position" of the lens shift mechanism 80 is in a case where the side surfaces of the lens cover 18 are present in the same planes as those of the side surfaces of the housing 14. Further, the "reference state" of the projection lens 3 is in a case where the rotation state of each holder is the "housed state" and the lens shift mechanism 80 (moving mechanism) is at the "housed position".

Note that a position at which the movement amount of the lens shift mechanism 80 is 0 in a direction indicated by arrow X in FIGS. 40 to 44 (the left-right direction when the projection apparatus main body 2 is horizontally placed) and a direction indicated by arrow Y (the up-down direction when the projection apparatus main body 2 is horizontally placed) can be set as the "housed position" of the lens shift mechanism 80.

Figure 54:
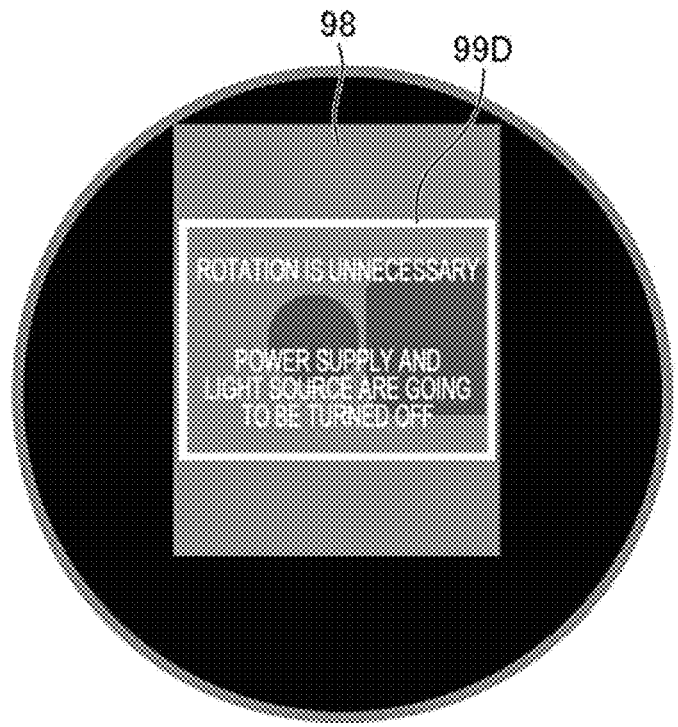
FIG. 54 illustrates a display example of a message when a change in the rotation state is unnecessary.

After movement to the housed position, the display control unit 254 and the OSD image output unit 252 (control unit) notify the user of a message that "Power supply and light source are going to be turned off" before turning off the power supply and the light source (step S248), and the power supply control unit 280 and the light source control unit 270 (control unit) in FIG. 45 turn off the power supply and the light source (laser light source 20A), respectively (step S250). FIG. 54 is a view illustrating a notification example of a message when the power supply and the light source are turned off. Since the rotation state is the reference state, "Rotation is unnecessary. Power supply and light source are going to be turned off" is displayed using an OSD image 99D combined with the projection image 98. This message is an example of information relating to a change of the rotation state of the projection lens 3, and an example of information relating to a change of the rotation state to the housed state (an example of a case where a change is unnecessary).

Figure 55:
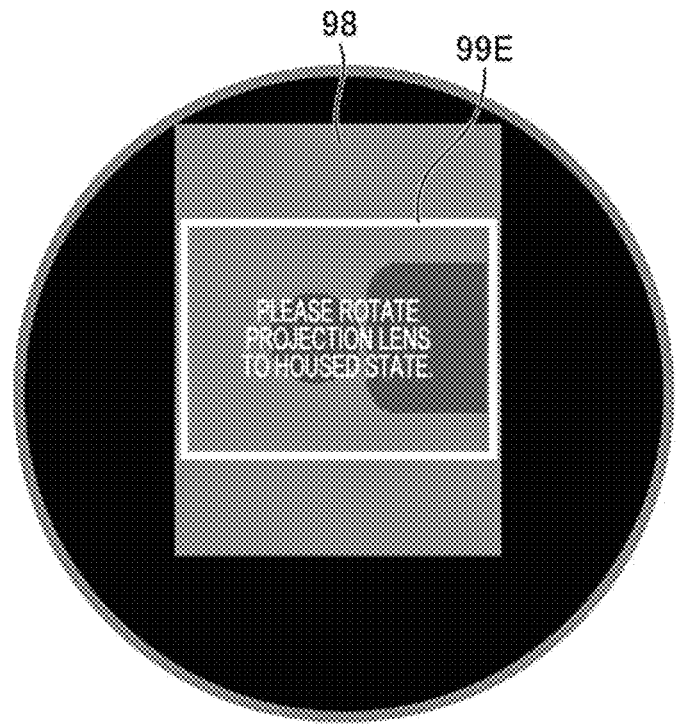
FIG. 55 is a display example of a message for a prompt to make rotation to a reference state.

The shift control unit 262 does not cause the lens shift mechanism 80 to move when the power supply is turned off and when the rotation state of the holder (second holder 40, third holder 50) is other than the reference state. Hence, when the rotation state is not the housed state (NO in step S244), the shift control unit 262 does not cause the lens shift mechanism 80 to move, and the display control unit 254 and the OSD image output unit 252 (control unit) notify the user of a message prompting the change to the housed state (step S252). FIG. 55 is a view illustrating a notification example of a message prompting the change, and a message that "Please rotate projection lens to housed state" is displayed using an OSD image 99E combined with the projection image 98. This message is another example of information relating to a change of the rotation state of the projection lens 3, and another example of information relating to a change of the rotation state to the housed state (an example of a case where a change is necessary).

FIG. 53 illustrates a case where the power supply is turned off after the lens shift mechanism 80 (moving mechanism) is moved to the housed position (steps S246 to S250). However, the power supply may be turned off without moving the lens shift mechanism 80 to the housed position after the notification of changing the rotation state of the projection lens 3 to the housed state is issued. The content of the flow including the "operation of turning off the power supply" (step S242) and later may be changed between the case where an image is not projected and the case where an image is projected. For example, the content of the flow may be that "the power supply is turned off when the power supply switch 6A is pressed once in the case where an image is not projected", and "the power supply is turned off when the power supply switch 6A is pressed twice in the case where an image is projected". In addition, it is preferable to automatically turn off the power supply when the rotating portion (second holder 40, third holder 50) is in the locked state while the rotation state is the housed state.

FIG. 56 is a display example of an OSD image 99F in the case where the power supply-off operation is performed in step S242, and illustrates the operation in the case where the power supply is turned off while the rotation state of the projection lens is maintained, and the operation in the case where the power supply is turned off while the projection lens is in the housed state (reference state). Part (a) of the drawing is an example of display when there is no input of a projection image, and part (b) illustrates an example of display when the projection image 98 is input. With such a display, the user can easily recognize the operation method.

Control Relating to Movement of Projection Lens

Figure 57:
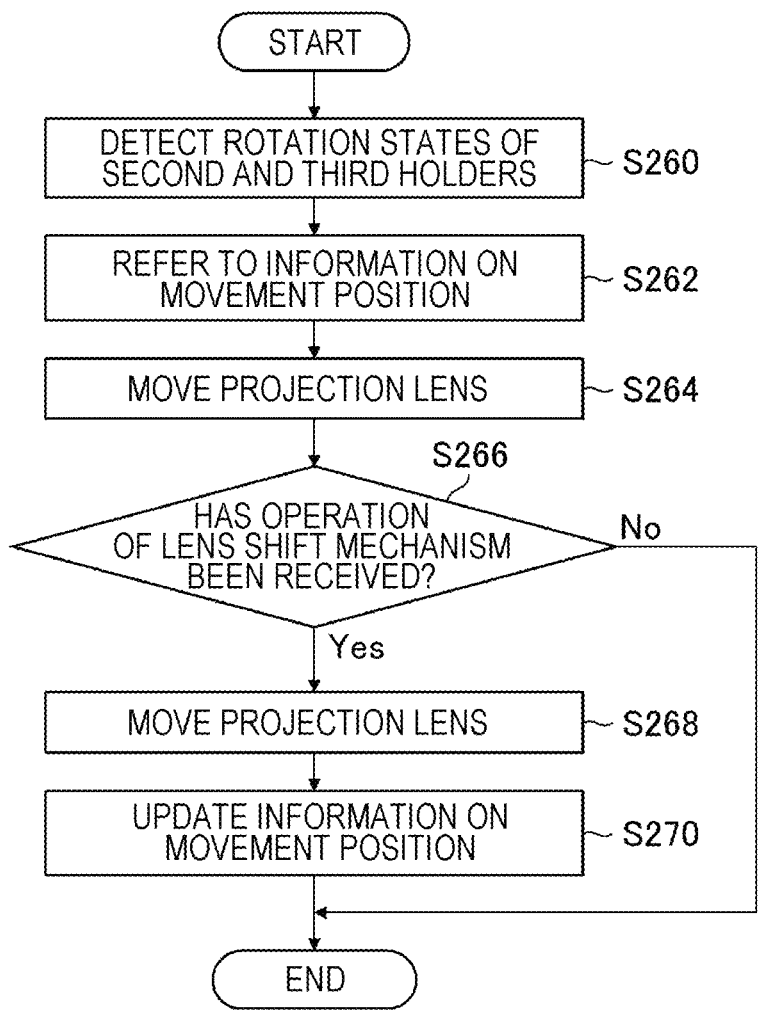
FIG. 57 is a flowchart relating to control of updating information on movement and a movement position of the projection lens.

FIG. 57 is a flowchart illustrating a procedure of control relating to movement (shift) of the projection lens 3. The first rotation position detection unit 70A (detection unit) and the second rotation position detection unit 70B (detection unit) detect the rotation states of the second holder 40 and the third holder 50, respectively (step S260). In this case, in each rotation state of the holders, the projection lens 3 and the DMD 22B (see FIG. 35) that is the electro-optical element relatively move. In the present embodiment, the shift control unit 262 (control unit) causes the lens shift mechanism 80 (moving mechanism) to move the projection lens 3 with respect to the rotation state of each of the holders (second holder 40 and third holder 50). The shift control unit 262 causes the storage unit 240 to store information on the movement position of the projection lens 3. After the detection units detect the rotation states, the shift control unit 262 refers to the information on the movement position stored in the storage unit 240 for the detected rotation states (step S262). Then, the projection lens 3 is moved to the stored movement position by the lens shift mechanism 80 (step S264). Since the projection lens 3 is moved to the movement position corresponding to the rotation states, the projection lens 3 can be quickly moved to the movement position corresponding to the rotation states by performing appropriate control in consideration of the relation between both.

When the main body operating unit 6 (reception unit) has received the operation of the lens shift mechanism 80 (moving mechanism) by the user (YES in step S266), the shift control unit 262 (control unit) causes the lens shift mechanism 80 to move the projection lens 3 according to the content (movement direction and amount) of the received operation (step S268). In this case (when the movement position is changed by the operation of the user), the shift control unit 262 (control unit) updates the information on the movement position stored in the storage unit 240 in accordance with the content of the received operation and causes the storage unit 240 to store the updated information (step S270). With the update of the information on the movement position, the user can move the projection lens to a desired movement position. After the information is updated, the shift control unit 262 can cause the projection lens 3 to move to the updated and stored movement position, and the user does not need to repeat a similar movement operation each time the user uses the projection lens 3.

The above-described embodiment is one example in which the relative positional relationship between the projection lens 3 and the electro-optical element is changed. For example, the shift control unit 262 may cause only the second holder 40 and the third holder 50 of the projection lens 3 (a portion of the projection lens 3) to move instead of the entire projection lens 3. Further, for example, the shift control unit 262 may cause the DMD 22B which is the electro-optical element to move.

Embodiment of Rotation Correction of Image

Next, rotation correction of a projection image and an OSD image will be described.

Figure 58:
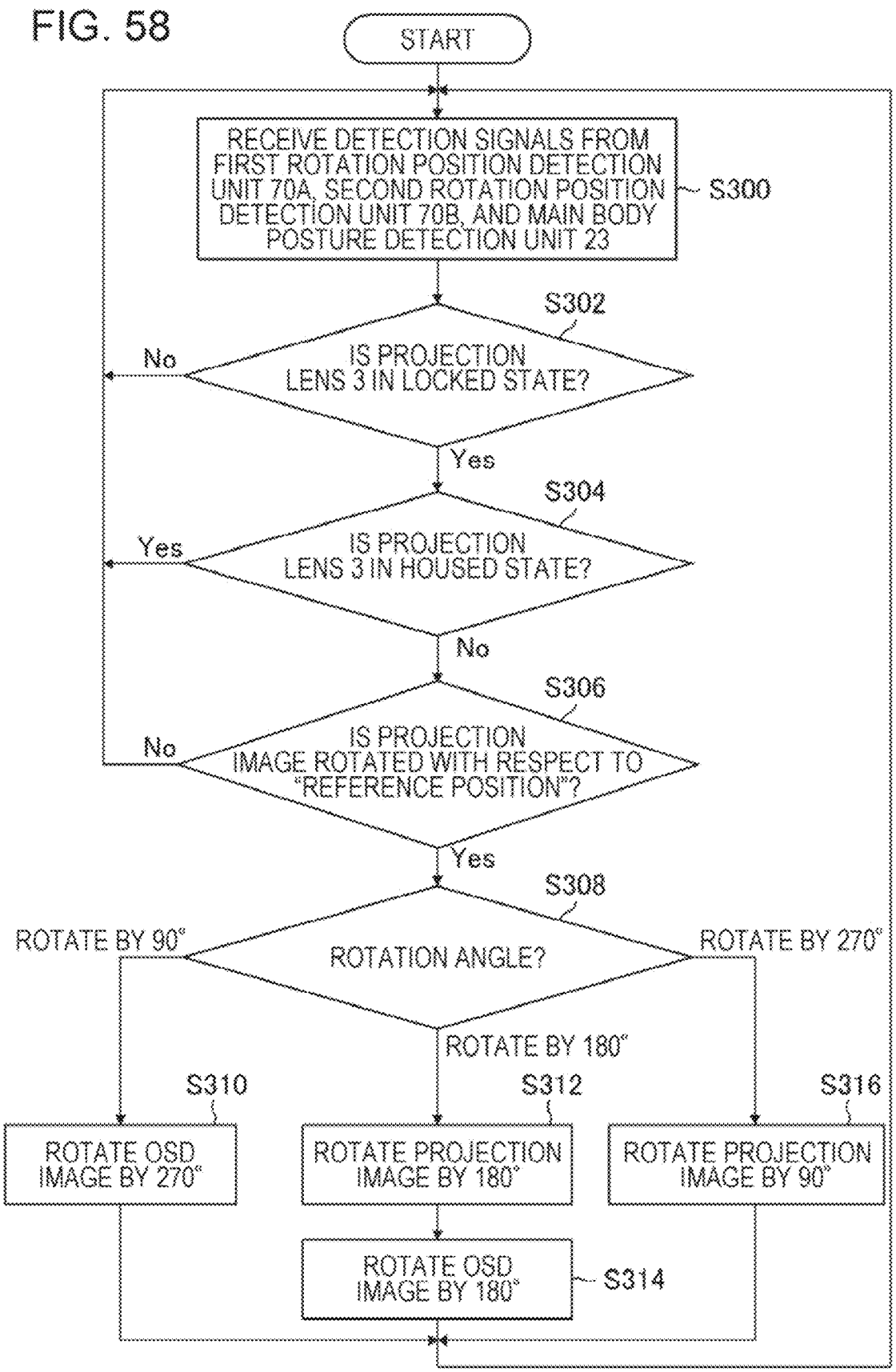
FIG. 58 is a flowchart illustrating an embodiment of rotation correction of an image by a CPU and a display control unit.

FIG. 58 is a flowchart illustrating an embodiment of rotation correction of an image by the CPU 210 and the display control unit 254.

In FIG. 58, the CPU 210 functioning as a control unit that performs rotation correction of an image receives detection signals indicating the rotation positions of the second holder 40 and the third holder 50 from the first rotation position detection unit (first detection unit) 70A and the second rotation position detection unit (second detection unit) 70B, respectively. Moreover, the CPU 210 receives a detection signal indicating the posture of the projection apparatus main body 2 that is a main body section of the projection apparatus 1, from the main body posture detection unit (third detection unit) 23 (step S300).

The first rotation position detection unit 70A and the second rotation position detection unit 70B each function as a posture information acquisition unit that acquires posture information indicating a posture of the projection lens 3 (hereinafter referred to as "lens posture"), and the main body posture detection unit 23 functions as a posture information acquisition unit that acquires posture information indicating a posture of the projection apparatus main body 2 (hereinafter referred to as "main body posture").

The CPU 210 first determines whether or not the projection lens 3 is in the locked state based on the detection signals input from the first rotation position detection unit 70A and the second rotation position detection unit 70B (step S302). The locked state of the projection lens 3 is a state in which the rotation position of the second holder 40 is 0°, 90°, or 180°, the rotation position of the third holder 50 is 0°, 90°, 180°, or 270°, and the unlocking operation by the first locking mechanism 60A and the second locking mechanism 60B is disabled.

The projection lens 3 can take twelve kinds of locked states by the combination of the rotation position (0°, 90°, 180°) of the second holder 40 and the rotation position (0°, 90°, 180°, 270°) of the third holder 50. Here, there are twelve specific "lens postures" of the projection lens 3 in which the projection lens 3 is in the locked state as illustrated in FIGS. 7 to 18. The CPU 210 can determine in which specific "lens posture" the current projection lens 3 is in accordance with detection signals (detection results) input from the first rotation position detection unit 70A and the second rotation position detection unit 70B.

When the CPU 210 determines that the projection lens 3 is in the locked state, the CPU 210 determines whether or not the projection lens 3 is in the housed state in which the projection lens 3 is housed in the recessed portion 15 of the projection apparatus main body 2 (step S304). The housed state is an aspect of the locked state of the projection lens 3, and refers to a state in which the rotation position of the second holder 40 is 90° and the rotation position of the third holder 50 is 0° (see FIG. 7).

When the CPU 210 determines that the projection lens 3 is in the locked state and the projection lens 3 is not in the housed state, the CPU 210 determines whether or not the projection image output from the DMD 22B functioning as an image output unit to the projection lens 3 has been rotated with respect to the "reference position" due to the change in the "lens posture" or the "main body posture" (step S306). The "main body posture" can be determined using the detection signal from the main body posture detection unit 23.

Here, the "reference position" refers to, for example, a rotation position of an erect image on a screen when, for example, a camera is held in a horizontal position, an image having a horizontally long aspect ratio is picked up, and the image is projected on the screen without rotation correction. Further, it is assumed that an angle of an image (an image angle viewed in the projection direction) at the "reference position" based on the "lens posture" and the "main body posture" is 0°, and an image angle in the clockwise direction is positive.

When the CPU 210 determines that the image is rotated with respect to the "reference position", the CPU 210 determines whether the image is rotated by 90°, is rotated by 180°, or is rotated by 270° (−90°) with respect to the "reference position" (step S308).

The display control unit 254 that functions as a control unit that performs rotation correction of an image receives the determination result in step S308 from the CPU 210. This determination result corresponds to a rotation correction command of an image, and when the image is rotated by 90° with respect to the "reference position", the display control unit 254 causes the OSD image input from the OSD image output unit 252 to be rotated by 270° (−90°) (step S310). That is, the OSD image emitted from the DMD 22B to the projection lens 3 is subjected to rotation correction by 270°. Consequently, in the OSD image projected on the screen, the characters (character image) of the OSD image are erected on the screen and are easily read.

Although the DMD 22B of this example has a horizontally long aspect ratio, it is preferable that the OSD image has an aspect ratio (for example, 1:1) such that a portion of the OSD image is not cut even when the OSD image is rotated by 90° or 270°. When a DMD 22B having an aspect ratio of 1:1 (square DMD) is used, the aspect ratio of the OSD image can be set to any aspect ratio.

In contrast, when the image is rotated by 90° with respect to the "reference position", the display control unit 254 does not cause the projection image input from the projection image output unit 250 to be rotated. This is because when the projection image is rotated by 90° or 270°, both ends of the projection image are cut. Note that correction of rotating the projection image by 0° or 360° does not correspond to "rotation correction".

When the projection image is rotated by 180° with respect to the "reference position", the display control unit 254 causes the projection image input from the projection image output unit 250 to be rotated by 180° (step S312), causes the projection image emitted from the DMD 22B to the projection lens 3 to be rotated by 180°, and similarly causes the OSD image projected on the screen to be rotated by 180° (step S314).

Thus, rotation correction is performed on the projection image and the OSD image such that the top-bottom directions of the images are correct. Line symmetry correction is also included in the rotation correction by 180°.

When the projection image is rotated by 270° with respect to the "reference position", the display control unit 254 causes the projection image input from the projection image output unit 250 by 90° (step S316). In contrast, when the image is rotated by 270° with respect to the "reference position", the display control unit 254 does not perform the rotation correction of the projection image.

In the embodiment illustrated in FIG. 58, the display control unit 254 performs the rotation correction on the OSD image and the projection image based on the determination results of the "lens posture" and the "main body posture". However, the display control unit 254 may use a table in which the relationship between the "lens posture" and the "main body posture" determined by the detection signals of the first rotation position detection unit 70A, the second rotation position detection unit 70B, and the main body posture detection unit 23, and the rotation correction of the OSD image and the projection image is registered. Then, the display control unit 254 may acquire the execution of the rotation correction and the correction angle of the OSD image and the projection image from the table based on the detection signals of the first rotation position detection unit 70A, the second rotation position detection unit 70B, and the main body posture detection unit 23.

Each of the detection units including the first rotation position detection unit 70A, the second rotation position detection unit 70B, and the main body posture detection unit 23 also includes a reception unit that receives an instruction (rotation instruction) of the "lens posture" and an instruction of the "main body posture" from the user. Furthermore, the present invention can be also applied to a projection apparatus in which the "main body posture" does not change.

FIGS. 59 to 62 are views illustrating the rotation correction of the projection image and the OSD image that are subjected to the rotation correction as described above, and particularly illustrate the case where the projection apparatus main body 2 is horizontally placed.

When the projection apparatus main body 2 is horizontally placed, there are a plurality of (twelve) specific lens postures in the locked state, and the lens posture numbers indicating the plurality of specific lens postures are set to Nos. 1 to 12 in association with the twelve lens postures illustrated in FIGS. 7 to 18.

As illustrated in FIGS. 59 to 62, when the lens posture numbers are Nos. 2, 5, 8, and 11 (FIGS. 6, 11, 14, and 17), the image angles viewed in the projection direction are 0°, 90°, 180°, and 270°, respectively. Note that the lens postures having the lens posture Nos. 2, 5, 8, and 11 are typical examples of the case where the image angles are 0°, 90°, 180°, and 270°, respectively.

When there is no image input, only the OSD image is projected as illustrated in the upper part of each of FIGS. 59 to 62. When there is an image input, a composite image of the projection image and the OSD image is projected as illustrated in the lower part of each of FIGS. 59 to 62.

The circular area illustrated in each of FIGS. 59 to 62 indicates the range in which projection can be performed by the projection lens 3, and "upper" indicates the orientation of an image before rotation correction.

As illustrated in FIGS. 59 to 62, when the image angle is one of 90°, 180°, and 270°, rotation correction by corresponding one of 270° (−90°), 180°, and 90° is performed. Consequently, the characters of the OSD image are always displayed erect.

In contrast, when the image angle of the input projection image is 180°, rotation correction by 180° is performed. Thus, when the image angle is other than 180° (90°, 270°), rotation correction of the projection image is not performed, and the projection image is displayed in a vertically long state (vertically displayed).

As described above, the rotation correction method of the projection image differs from the rotation correction method of the OSD image.

Another Embodiment of Rotation Correction of Projection Image

Figure 63:
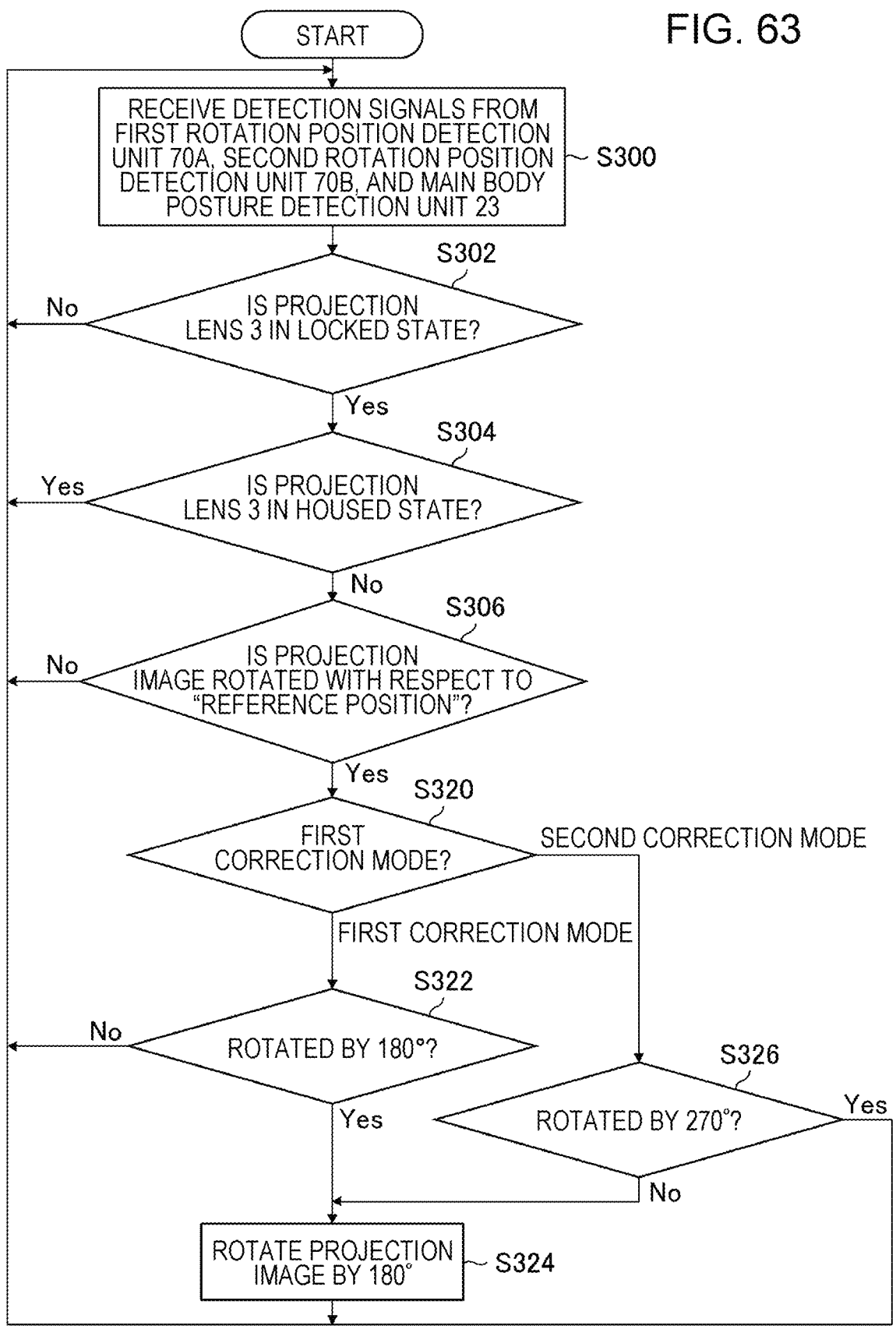
FIG. 63 is a flowchart illustrating another embodiment of rotation correction of a projection image.

FIG. 63 is a flowchart illustrating another embodiment of rotation correction of a projection image. In FIG. 63, portions common to those in the flowchart illustrated in FIG. 58 are denoted by the same step numbers, and detailed description thereof is omitted.

In FIG. 63, when the CPU 210 determines that the image rotates with respect to the "reference position" due to a change in the "lens posture" or the "main body posture" ("Yes" in step S306), the CPU 210 determines whether the first correction mode or the second correction mode is set as the correction mode for performing rotation correction on the projection image (step S320). The setting of the first correction mode or the setting of the second correction mode can be appropriately performed by the user operating the main body operating unit 6.

The first correction mode is a correction mode in which rotation correction is performed on the projection image by 180° when the image is rotated by 180° with respect to the "reference position". The second correction mode is a correction mode in which rotation correction is performed on the projection image by 180° when the image is rotated by 180° with respect to the "reference position", and rotation correction is performed on the projection image by 180° also when the image is rotated by 90° with respect to the "reference position".

When the CPU 210 determines that the first correction mode is set in step S320, the CPU 210 subsequently determines whether or not the image is rotated by 180° with respect to the "reference position" (step S322).

The display control unit 254 receives the determination result in step S322 from the CPU 210. This determination result corresponds to a rotation correction command of an image, and when the image is rotated by 180° with respect to the "reference position", the display control unit 254 causes the projection image input from the projection image output unit 250 to rotate by 180° (step S324).

In contrast, in the case of the first correction mode, when the image is rotated by 90° or 270° with respect to the "reference position", the display control unit 254 does not cause the projection image input from the projection image output unit 250 to rotate.

When the CPU 210 determines that the second correction mode is set in step S320, the CPU 210 subsequently determines whether or not the image is rotated by 270° with respect to the "reference position" (step S326).

The display control unit 254 receives the determination result in step S326 from the CPU 210, and when the image is rotated by 270° with respect to the "reference position", the CPU 210 does not cause the projection image input from the projection image output unit 250 to rotate. In contrast, when the image is not rotated by 270° with respect to the "reference position" (that is, when the image is rotated by 90° and 180°), the display control unit 254 causes the projection image input from the projection image output unit 250 to rotate by 180° (step S324).

FIG. 64 is a table summarizing the rotation correction of the projection image subjected to the rotation correction as described above, and illustrates the case where the projection apparatus main body 2 is horizontally placed similarly to FIG. 59.

As illustrated in FIG. 64, when the lens posture numbers are Nos. 2, 5, 8, and 11, the image angles viewed in the projection direction are 0°, 90°, 180°, and 270°, respectively.

In the first correction mode, when the image angle is 180°, rotation correction by 180° is performed. Thus, rotation correction is performed on the projection image projected in a horizontally long manner such that the top-bottom direction is correct.

In contrast, in the second correction mode, when the image angle is 90° or 180°, rotation correction by 180° is performed. Thus, rotation correction is performed on the projection image projected in a horizontally long manner such that the top-bottom direction is correct. Rotation correction is performed on the projection image projected in a vertically long manner such that "upper" in the top-bottom direction of the projection image is always on the left side in FIG. 56. This makes it possible to align the top-bottom directions of projection images projected in a vertically long manner.

In this example, in the second correction mode, the rotation correction is performed such that "upper" in the top-bottom direction of the projection image is on the left side; however, rotation correction may be performed such that "upper" in the top-bottom direction of the projection image is on the right side.

When a square DMD is used as the DMD 22B, the correction angle of the projection image may include an angle other than 0° and 180°. In this case, rotation correction can be performed such that the top-bottom direction of the projection image is always correct.

Embodiment of OSD Image Displayed by Projection Apparatus 1

Figure 65:
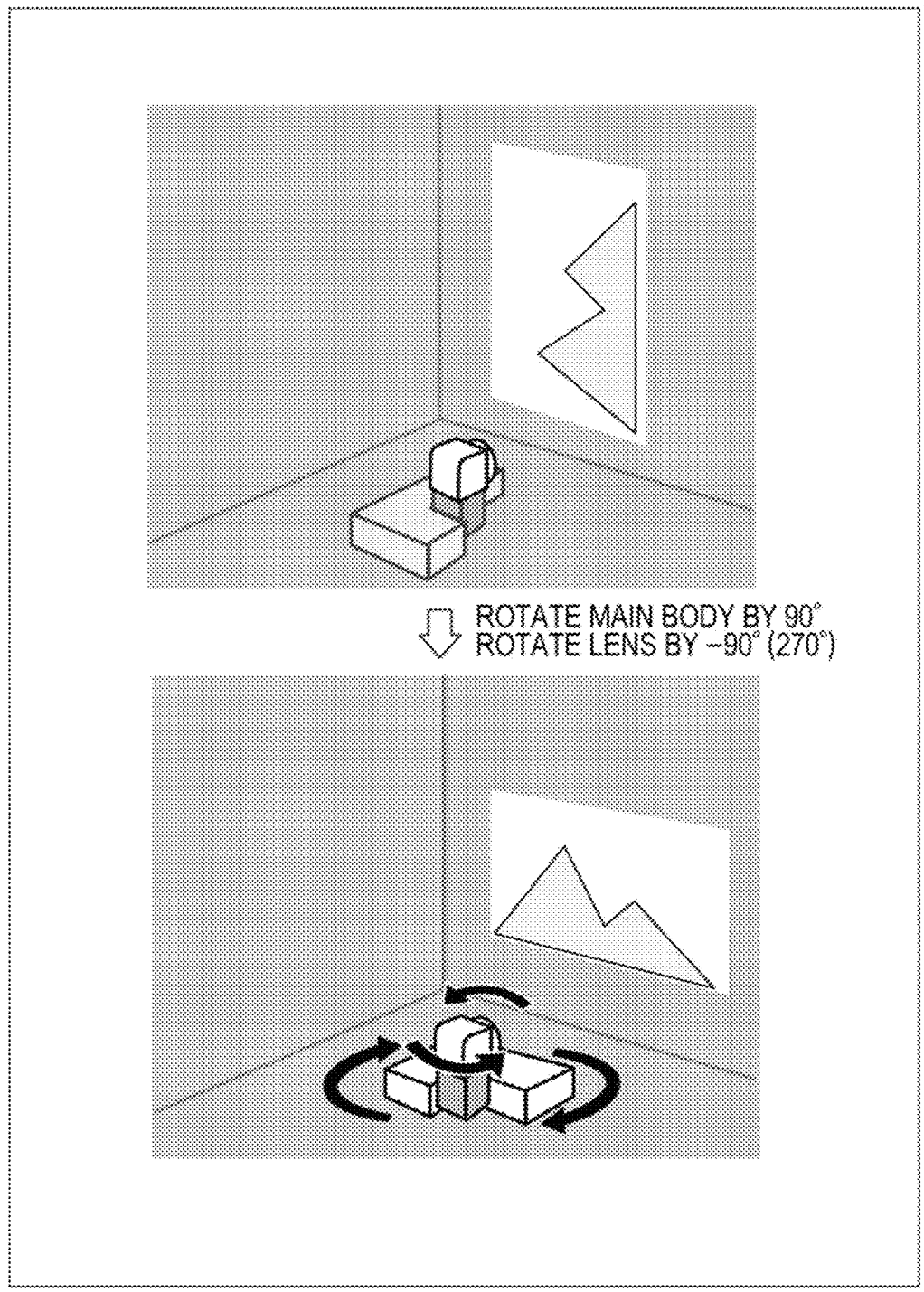
FIG. 65 is a diagram illustrating an example of an OSD image relating to an operation manual displayed by the projection apparatus.

FIG. 65 is a diagram illustrating an example of an OSD image displayed by the projection apparatus 1, and particularly illustrates an OSD image relating to an operation manual.

In the example illustrated in FIG. 65, an OSD image for supporting the operations for the "main body posture" and the "lens posture" is displayed when the posture of a vertically long projection image (the upper direction of the image is the left side) projected on a projection surface (wall) is changed on the same projection surface (in this example, when the top-bottom direction of the projection image is the correct top-bottom direction). The OSD image in this case is support information for supporting the operations for the "main body posture" and the "lens posture".

The CPU 210 illustrated in FIG. 45 can determine the "main body posture" of the projection apparatus main body 2 from the detection signal of the main body posture detection unit 23, and can determine the "lens posture" of the projection lens 3 from the respective detection signals of the first rotation position detection unit 70A and the second rotation position detection unit 70B.

When the CPU 210 receives the instruction input requesting the operation support for the "main body posture" and the "lens posture" from the main body operating unit 6, the CPU 210 causes the OSD image output unit 252 to output a corresponding "OSD image" (an OSD image illustrated in FIG. 56) based on the determined current "main body posture" and "lens posture".

By viewing the OSD image illustrated in FIG. 65, the user can understand how to operate the "main body posture" and the "lens posture". In this example, the horizontally placed projection apparatus main body 2 is rotated by 90°, and the third holder 50 of the projection lens 3 illustrated in FIG. 33 is rotated by −90° (270°). Thus, the top-bottom direction of the projection image can be set to the correct top-bottom direction.

Figure 66:
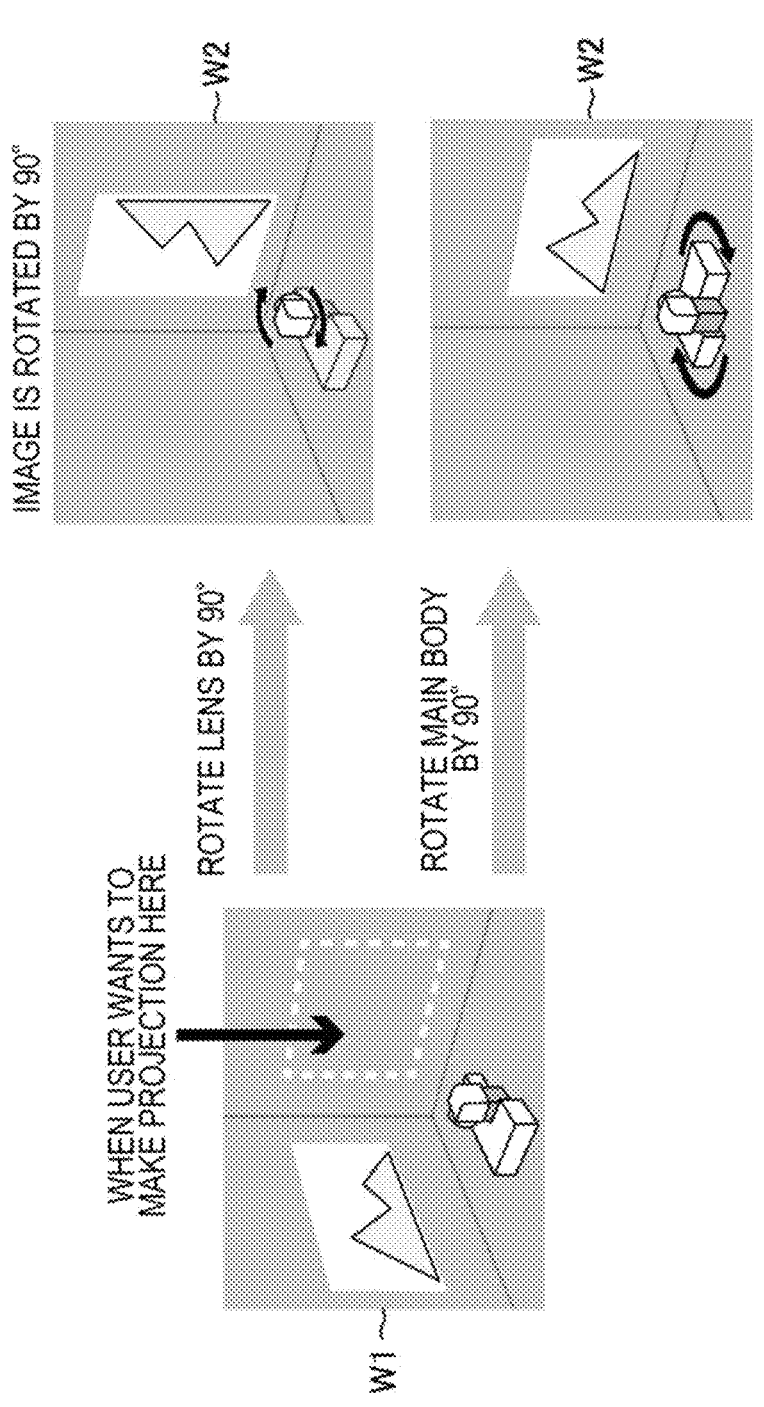
FIG. 66 is a diagram illustrating another example of an OSD image relating to the operation manual displayed by the projection apparatus.

FIG. 66 is a diagram illustrating another example of an OSD image displayed by the projection apparatus 1, and particularly illustrates an OSD image relating to the operation manual.

In FIG. 66, when the projection apparatus 1 is currently projecting a projection image on a wall surface W1, support information for supporting the "main body posture" and the "lens posture" in a case of projecting the projection image on a wall surface W2 different from the wall surface W1 is displayed.

Here, it is displayed that, when the third holder 50 of the projection lens 3 illustrated in FIG. 33 is rotated by 90° in order to project the projection image on the wall surface W2, the projection image is also rotated (rotated by 90°). That is, the OSD image illustrated in FIG. 56 notifies the user of an example of a change in the posture of the projection image when the rotation state of the projection lens 3 is changed. By viewing the OSD image illustrated in FIG. 66, the user understands that the user may rotate the third holder 50 of the projection lens 3 by 90° in order to display the projection image in a vertically long manner on the wall surface W2.

In contrast, there is displayed information that, when the horizontally placed projection apparatus main body 2 is rotated by 90° in the plane in which the projection apparatus main body 2 is installed (when the orientation in the plane is changed), the same projection image as the projection image projected on the wall surface W1 is projected on the wall surface W2 different from the wall surface W1. By viewing the OSD image illustrated in FIG. 66, the user understands that the user may rotate the projection apparatus main body 2 by 90° in the plane in which the projection apparatus main body 2 is installed when the user wants to display the projection image in a horizontally long manner on the wall surface W2.

Although not illustrated in FIGS. 65 and 66, it is possible to display information (vertically long, horizontally long, rotation angle, and so forth) relating to a change in the projection direction and posture of the projection image when the posture of the projection apparatus main body 2 is changed from horizontal placement to vertical placement, and thereby to use the information as support information for projecting a desired projection image on the projection surface.

In the embodiment illustrated in FIGS. 65 and 66, the projection apparatus 1 notifies the user of the support information for supporting the operation for the "main body posture" and the "lens posture" using the OSD image. However, without being limited to the notification unit that uses the OSD image, when the projection apparatus 1 includes a display device such as a liquid crystal monitor, the projection apparatus 1 may cause the display device (notification unit) to display the support information. When the projection apparatus 1 includes a voice notification function, the user may be notified of the support information using the voice notification function.

Projection Apparatus Kit

A projection apparatus kit is constituted of the projection apparatus 1 and an information medium having recorded therein support information (for example, support information as illustrated in FIGS. 65 and 66) for supporting an operation when a projection image is projected in a desired posture on any projection surface.

When the support information is recorded in the information medium, the projection apparatus 1 of the projection apparatus kit may not include the function of notifying the user of the support information for supporting the operation of the "main body posture" and the "lens posture" as illustrated in FIGS. 65 and 66 using the OSD image.

The information medium includes, for example, a paper medium and a recording medium having digital information recorded therein, such as a compact disc read only memory (CD-ROM) and a digital versatile disc (DVD).

The information medium is packaged together with the projection apparatus 1 and can be distributed as a projection apparatus kit.

The user can acquire, from the information medium, support information for supporting an operation when a projection image is projected in a desired posture on any projection surface.

The information recorded in the information medium is not limited to the support information itself, but includes access information (for example, uniform resource locator (URL)) for making an access to a website and acquiring support information from the website.

Embodiment of Shift Correction of Image

Next, control on the lens shift mechanism 80 (see FIG. 40) for moving the projection lens 3 with respect to the DMD 22B which is the electro-optical element illustrated in FIG. 35 will be described.

FIG. 67 is a schematic diagram illustrating the projection apparatus 1 and shift states of a projection image when the projection apparatus main body 2 is horizontally placed and the posture of the projection lens 3 is the second lens posture to the sixth lens posture (lens posture Nos. 2 to 6). Respective perspective views of the projection apparatus 1 when the projection apparatus main body 2 is horizontally placed and the posture of the projection lens 3 is the second lens posture to the sixth lens posture are as illustrated in FIGS. 8 to 12.

Figure 68:
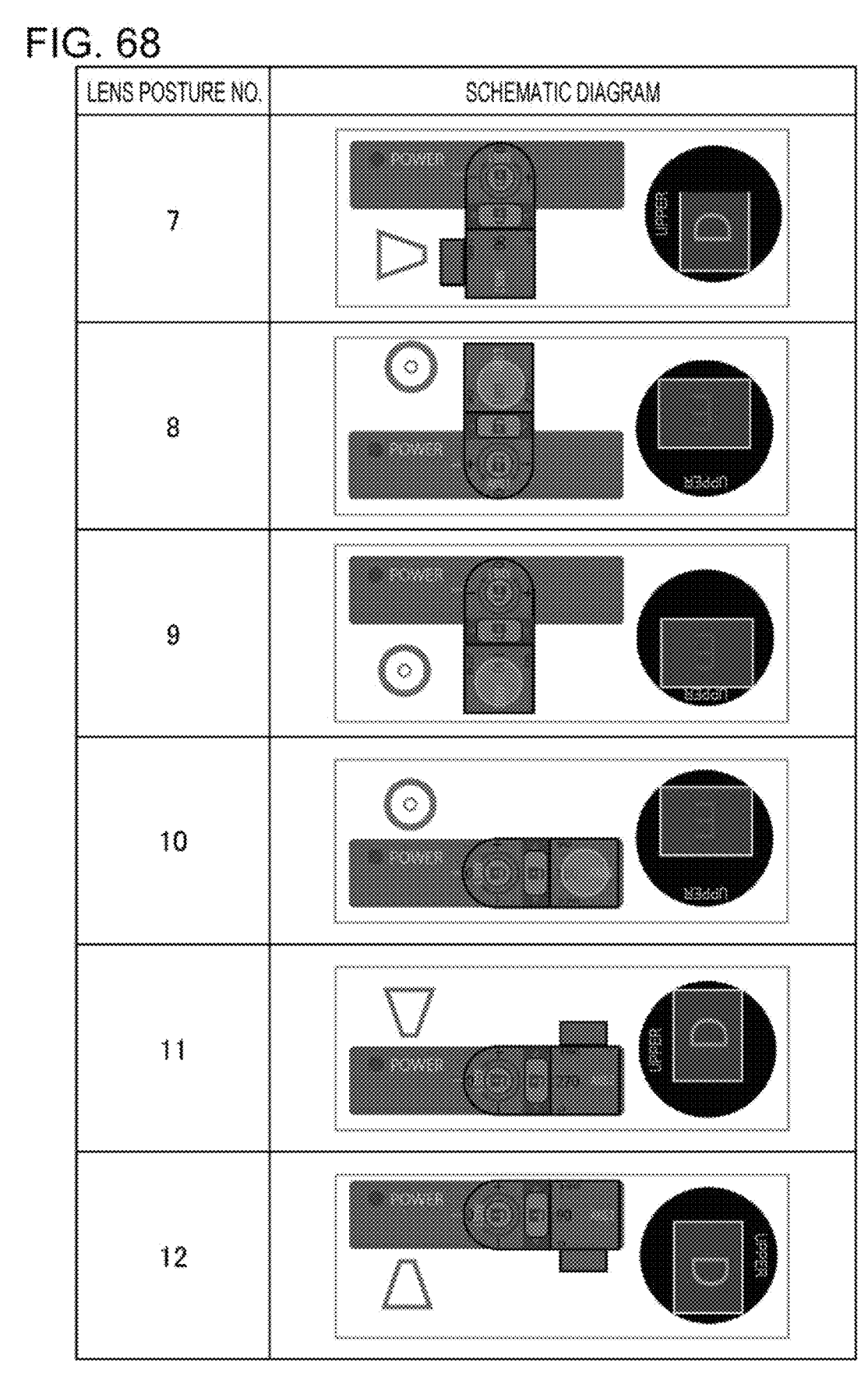

FIG. 68 is a schematic diagram illustrating the projection apparatus 1 and shift states of a projection image when the projection apparatus main body 2 is horizontally placed and the posture of the projection lens 3 is the seventh lens posture to the twelfth lens posture (lens posture Nos. 7 to 12). Respective perspective views of the projection apparatus 1 when the projection apparatus main body 2 is horizontally placed and the posture of the projection lens 3 is the seventh lens posture to the twelfth lens posture are as illustrated in FIGS. 13 to 18.

In contrast, FIG. 69 is a schematic diagram illustrating the projection apparatus 1 and shift states of a projection image when the projection apparatus main body 2 is vertically placed and the posture of the projection lens 3 is the second lens posture to the sixth lens posture (lens posture Nos. 2 to 6). Respective perspective views of the projection apparatus 1 when the projection apparatus main body 2 is vertically placed and the posture of the projection lens 3 is the second lens posture to the sixth lens posture are as illustrated in FIGS. 20 to 24.

Figure 70:
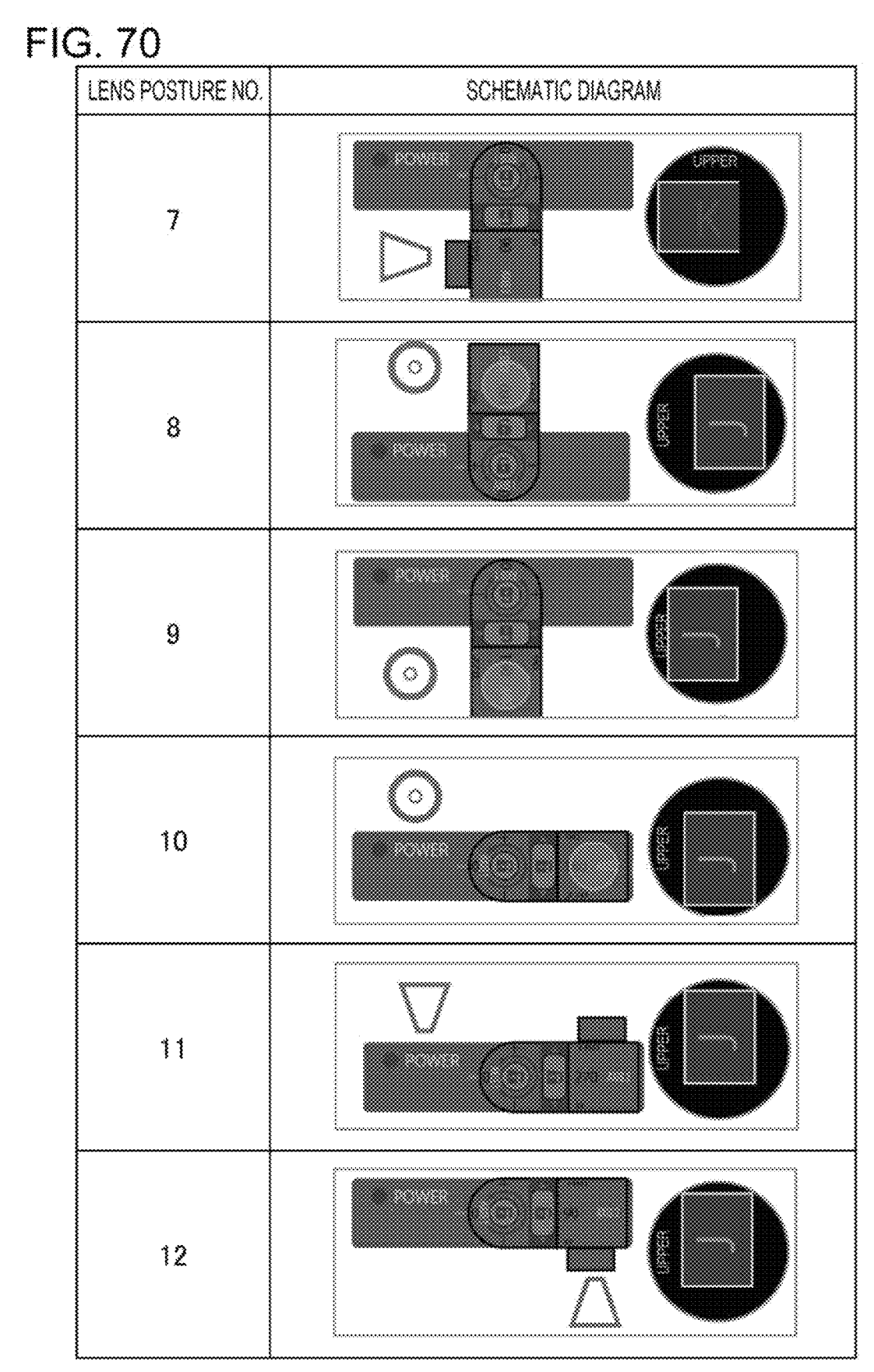

FIG. 70 is a schematic diagram illustrating the projection apparatus 1 and shift states of a projection image when the projection apparatus main body 2 is vertically placed and the posture of the projection lens 3 is the seventh lens posture to the twelfth lens posture (lens posture Nos. 7 to 12). Respective perspective views of the projection apparatus 1 when the projection apparatus main body 2 is vertically placed and the posture of the projection lens 3 is the seventh lens posture to the twelfth lens posture are as illustrated in FIGS. 25 to 30.

The CPU 210 and shift control unit 262 functioning as the control unit illustrated in FIG. 45 control driving of the lens shift mechanism 80 functioning as the shift unit to move the projection lens 3 in a plane intersecting with the axial direction of the first rotation axis θ1.

By this movement of the projection lens 3, the position of the image display unit 22 with respect to the first optical axis Z1 of the projection lens 3 illustrated in FIG. 35 changes in a plane perpendicular to the first optical axis Z1, and the projection image projected from the projection lens 3 can be shifted.

The circular area illustrated in each of FIGS. 67 to 70 indicates the range in which projection can be performed by the projection lens 3, and the rectangular area in the circular area indicates the projection image. By moving the projection lens 3 by the lens shift mechanism 80, the projection image can be shifted within the circular area in which projection can be performed. When the projection image is shifted beyond the circular region in which projection can be performed (when the projection lens 3 is moved by the lens shift mechanism 80), the projection image emitted from the image display unit 22 interferes with the projection lens 3, and "vignetting" occurs.

As illustrated in FIGS. 67 to 70, the direction in which the projection image is shifted differs depending on the "lens posture" of the projection lens 3 and the "main body posture" of the projection apparatus main body 2. Details of the direction in which the projection image is shifted will be described later.

Next, definitions of the "lens posture" and the "shift correction direction" for determining the "direction in which the projection image is shifted" will be described.

Figure 71:
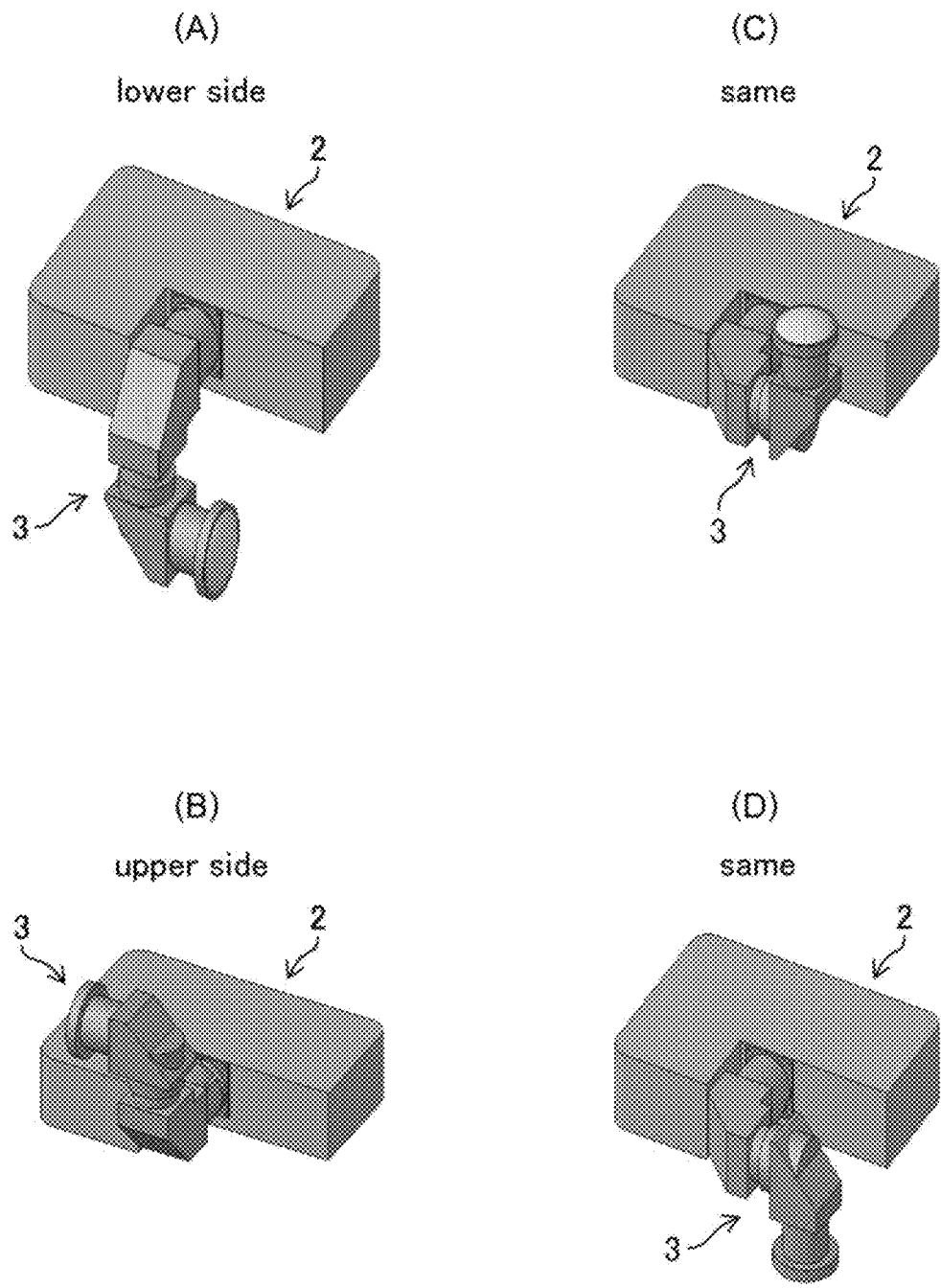
FIG. 71 is a view relating to "lens postures" that define positions of the projection lens with respect to the projection apparatus main body.

FIG. 71 provides drawings that define positions of the projection lens 3 with respect to the projection apparatus main body 2.

The position of the projection lens 3 with respect to the projection apparatus main body 2 is defined with reference to the position of the projection lens 3 with respect to the projection apparatus main body 2 when the projection apparatus main body 2 is horizontally placed. That is, in part (A) of FIG. 71, when the projection apparatus main body 2 is horizontally placed, the emission optical system of the projection lens 3 (third optical system third lens group G33 in FIG. 35) is located on the lower side with respect to the projection apparatus main body 2. In this case, the position of the projection lens with respect to the projection apparatus main body is defined as the lower side in both cases where the projection apparatus main body 2 is horizontally placed and vertically placed.

Similarly, in part (B) of FIG. 71, when the projection apparatus main body 2 is horizontally placed, the emission optical system of the projection lens 3 is located on the upper side with respect to the projection apparatus main body 2. In this case, the position of the projection lens with respect to the projection apparatus main body is defined as the upper side in both cases where the projection apparatus main body 2 is horizontally placed and vertically placed. In part (C) and part (D) of FIG. 71, the emission optical system of the projection lens 3 is located at the main body center of the projection apparatus main body 2. In this case, the position of the projection lens with respect to the projection apparatus main body is defined as the main body center position (same).

The "position of the projection lens with respect to the projection apparatus main body" defined as described above is used to determine the direction in which the projection image is shifted as described later.

According to the above definition, when the lens posture numbers of the projection lens 3 are Nos. 2, 4, 6, and 8 (see FIGS. 67 and 68), the position of the projection lens 3 with respect to the projection apparatus main body 2 is "upper side". When the lens posture numbers of the projection lens 3 are Nos. 3, 5, 7, and 9, the position of the projection lens 3 with respect to the projection apparatus main body 2 is "lower side". When the lens posture numbers of the projection lens 3 are Nos. 10, 11, and 12, the position of the projection lens 3 with respect to the projection apparatus main body 2 is the "main body center position" (same).

FIG. 72 is a diagram defining whether or not the projection apparatus main body 2 (main body) exists in front in the projection direction.

In the lens postures in part (A) and part (B) of FIG. 72, a portion of the projection apparatus main body 2 exists on the side of the emission direction along the third optical axis Z3 in FIG. 35 with respect to a plane including the emission optical system (third optical system third lens group G33 in FIG. 35). In such a lens posture, it is defined that the projection apparatus main body exists in front in the projection direction (Yes).

In contrast, in the lens postures in part (C) of FIG. 72, a portion of the projection apparatus main body 2 does not exist on the side of the emission direction along the third optical axis Z3 in FIG. 35 with respect to a plane including the emission optical system (third optical system third lens group G33 in FIG. 35). In such a lens posture, it is defined that the projection apparatus main body does not exist in front in the projection direction (NO).

Thus, when the lens posture numbers are Nos. 2, 3, 4, 5, 6, and 7, the main body exists in front in the projection direction, and when the lens posture numbers are Nos. 8, 9, 10, 11, and 12, the main body does not exist in front in the projection direction.

When the projection apparatus main body 2 exists in front in the projection direction (when "main body in front in projection direction" in FIG. 75A, FIG. 75B, FIG. 76A, and FIG. 76B is "Yes"), "vignetting" of the projection image may occur due to the projection apparatus main body 2. In contrast, when the main body does not exist in front in the projection direction (when "main body in front in projection direction" in FIG. 75A, FIG. 75B, FIG. 76A, and FIG. 76B is "NO"), "vignetting" of the projection image due to the projection apparatus main body 2 does not occur.

The information on whether or not the main body exists in front in the projection direction is used to determine the direction in which the projection image is shifted.

FIG. 73 is a diagram defining "shift correction directions" of a projection image.

The upper part of FIG. 73 illustrates a projection image when the lens posture number of the projection lens 3 illustrated in FIG. 67 is No. 6, and the lower part of FIG. 73 illustrates a projection image when the lens posture number of the projection lens 3 illustrated in FIG. 68 is No. 7.

The projection image illustrated in FIG. 73 is projected in a vertically long manner. As illustrated in FIG. 73, the "shift correction direction" of the projection image is defined with reference to the actual "projection image".

For example, regarding the "shift correction direction" for the "projection image" in the upper part of FIG. 73, the shift correction direction in the case of shifting the "projection image" to the right side is upper, and the shift correction direction in the case of shifting the "projection image" to the left side is lower, on the paper surface of FIG. 73. Moreover, the shift correction direction in the case of shifting the "projection image" to the upper side is left, and the shift correction direction in the case of shifting the "projection image" to the lower side is right, on the paper surface of FIG. 73.

Basic Idea of Direction in which Projection Image is Shifted when Projection Apparatus Main Body is Horizontally Placed (1) When "vignetting" due to the main body occurs in a projection image, the image is shifted in a direction in which the "vignetting" is reduced.

(2) When a projection image is projected on a wall surface, the projection image is shifted in a direction away from the main body.

The projection lens is above the main body: shift the "projection image" in the upper direction (As described above, note that the shift direction on the basis of the "projection image" and the "shift correction direction" do not necessarily coincide with each other.)

The projection lens is below the main body: shift the "projection image" in the lower direction The projection lens is at the main body center: shift the "projection image" in the upper direction (Shift the projection image in a direction away from the floor based on placement on the floor.)

(3) When a projection image is projected on a top surface or a floor surface, the projection image is shifted in a direction away from the main body.

When the "shift correction direction" is determined according to (1), (2), and (3) described above, (1) and (2) or (1) and (3) may conflict with each other; however, in this case, the "shift correction direction" according to (1) is prioritized.

According to the basic idea of the "shift direction" described above, the "shift correction direction" when the lens posture numbers are Nos. 2 and 9 illustrated in FIGS. 67 and 68 is the upper direction, and the "shift correction direction" when the lens posture numbers are Nos. 3, 8, and 10 is the lower direction. Further, the "shift correction direction" when the lens posture numbers are Nos. 4, 5, 11, and 12 is the right direction, and the "shift correction direction" when the lens posture numbers are Nos. 6 and 7 is the left direction.

When the lens posture numbers illustrated in FIGS. 67 and 68 are Nos. 2 to 7, the main body exists in front in the projection direction, and "vignetting" may occur in the projection image. Thus, in the case of these lens postures, the projection image is shifted in a direction in which "vignetting" is reduced. When the lens posture numbers are Nos. 6 and 7, "vignetting" occurs in the projection image even after shift correction.

When the lens posture numbers illustrated in FIGS. 67 and 68 are Nos. 8 to 10, the main body does not exist in front in the projection direction, and the projection image is projected in the wall direction. Thus, in the case of these lens postures, the projection image is shifted in a direction away from the projection apparatus main body 2 in accordance with the definition of "position of projection lens with respect to main body" illustrated in FIG. 71. When the projection lens 3 is located on the upper side of the projection apparatus main body 2 (lens posture No. 8) and when the projection lens 3 is positioned at the main body center of the projection apparatus main body 2 (lens posture No. 10), the projection image is shifted in the upper direction (in the lower direction according to the definition of "shift correction direction") on the basis of the "projection image" actually projected on the wall surface. When the projection lens 3 is located on the lower side of the projection apparatus main body 2, the projection image is shifted in the lower direction (in the upper direction according to the definition of "shift correction direction") on the basis of the "projection image" actually projected on the wall surface.

When the lens posture numbers illustrated in FIGS. 67 and 68 are Nos. 11 and 12, the "main body in front in projection direction" does not exist, and the projection images are projected in the ceiling direction and the floor direction, respectively. Thus, in the case of these lens postures, the projection image is shifted in a direction away from the projection apparatus main body 2.

Basic Idea of Direction in which Projection Image is Shifted when Projection Apparatus Main Body is Vertically Placed (1) When "vignetting" due to the main body occurs in a projection image, the projection image is shifted in a direction in which the "vignetting" is reduced.

(2) When a projection image is projected on a wall surface, the projection image is shifted in a direction away from the floor.

(3) When a projection image is projected on a top surface or a floor surface, the projection image is shifted in a direction away from the main body.

According to the basic idea of the "shift direction" described above, the "shift correction direction" when the lens posture numbers of the projection lens 3 are Nos. 2, 5, and 9 illustrated in FIGS. 69 and 70 is the upper direction, and the "shift correction direction" when the lens posture numbers are Nos. 3, 4, and 8 is the lower direction. Further, the "shift correction direction" when the lens posture numbers are Nos. 11 and 12 is the right direction, and the "shift correction direction" when the lens posture numbers are Nos. 6, 7, and 10 is the left direction.

When the lens posture numbers of the projection lens 3 are Nos. 2 to 7 illustrated in FIGS. 69 and 70, the "main body in front in projection direction" exists, and "vignetting" may occur in the projection image. Thus, in the case of these lens postures, the projection image is shifted in a direction in which "vignetting" is reduced. When the lens posture numbers are Nos. 6 and 7, "vignetting" occurs in the projection image even after the shift correction.

When the lens posture numbers of the projection lens 3 are Nos. 8 to 10, the main body does not exist in front in the projection direction, and a projection image is projected in the ceiling direction. Thus, in the case of these lens postures, the projection image is shifted in a direction away from the projection apparatus main body 2.

In the case of the "lens posture" having the lens posture Nos. 11 and 12, the "main body in front in projection direction" does not exist, and the projection image is projected in the wall direction. Thus, in the case of these lens postures, the projection image is shifted in a direction away from the floor.

Shift Amount

Next, the shift amount of a projection image (the movement amount of the projection lens 3 by the lens shift mechanism 80) will be described.

Figure 74:
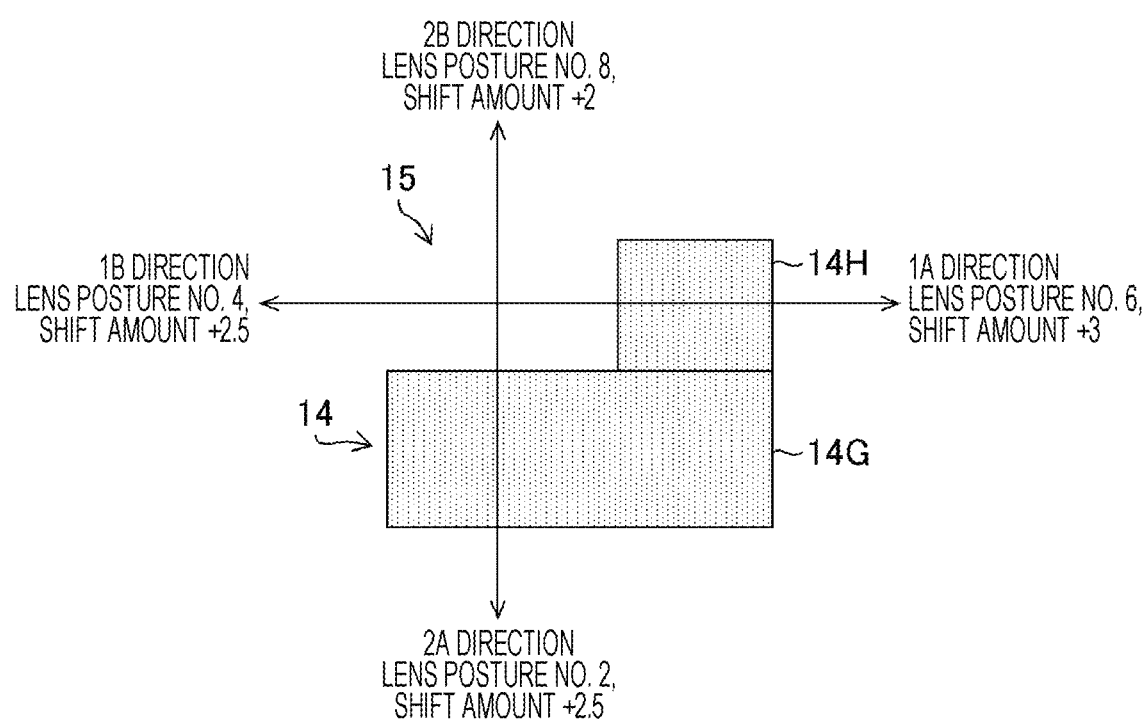
FIG. 74 is a plan view of a housing of the projection apparatus main body used for explaining shift amounts of a projection image.

FIG. 74 is a plan view of the housing 14 of the projection apparatus main body 2 for explaining the shift amount of a projection image when the projection apparatus main body is horizontally placed (a view of the housing 14 viewed from the upper side when the projection apparatus main body 2 is horizontally placed).

As illustrated in FIG. 74, the housing 14 has a base portion 14G and a protruding portion 14H protruding from the base portion 14G, and the recessed portion 15 adjacent to the protruding portion 14H in a first direction is formed. The projection lens 3 is disposed in the recessed portion 15.

In FIG. 74, the first direction in which the protruding portion 14H and the recessed portion 15 are adjacent to each other has a 1A direction that is one side in the first direction and a 1B direction that is the other side in the first direction, and the protruding portion 14H is located on the side of the 1A direction with respect to the recessed portion 15.

A second direction intersecting with the first direction has a 2A direction that is one side in the second direction and a 2B direction that is the other side in the second direction, and the base portion 14G is located on the side of the 2A direction.

In the projection apparatus 1 having the housing 14 with the above-described shape and the projection lens 3 disposed in the recessed portion 15, when "the position of the projection lens with respect to the projection apparatus main body" is the upper side or the lower side and the projection lens 3 projects a projection image in the 1A direction, the 1B direction, and the 2A direction, "projection apparatus main body in front in projection direction" exists and "vignetting" occurs in the projection image. The lens posture numbers of the projection lens 3 when the projection lens 3 projects a projection image in the 1A direction, the 1B direction, the 2A direction, and the 2B direction are Nos. 6, 4, 2, and 8, respectively (see FIGS. 67 and 68).

Thus, when the upper surface of the housing 14 illustrated in FIG. 74 is set as a "reference surface", the shift direction of the projection image is changed between the case where the projection direction of the projection lens 3 is in the direction in the same plane as the "reference surface" and the case where the projection direction of the projection lens 3 is in the direction intersecting with the direction in the same plane.

That is, in the case of the "lens posture" illustrated in part (A) and part (B) of FIG. 71 (see lens posture Nos. 5 and 6 of FIG. 67), the projection image is shifted in the direction in the same plane as the "reference surface" and in the direction perpendicular to the "reference surface". In contrast, in the case of the "lens posture" illustrated in part (C) and part (D) of FIG. 71 (see lens posture Nos. 11 and 12 in FIG. 68), since the projection image can be shifted only in a direction in the same plane as the "reference surface", the projection image is shifted in the direction in the same plane as the "reference surface".

When the projection direction of the projection lens 3 is a direction in the same plane as the "reference surface" of the projection apparatus main body 2, the projection image is shifted in a direction intersecting with the direction in the same plane as the "reference surface" in order to reduce "vignetting" of the projection image. When the projection direction of the projection lens 3 is a direction intersecting with the "reference surface" of the projection apparatus main body 2, the projection image is shifted in a direction in the same plane as the "reference surface".

In addition, it is preferable that the shift amount of the projection image is changed in accordance with the "lens posture". When the projection direction of the projection lens 3 is on the side on which the housing 14 is located, the shift amount of the projection image is made larger than that when the projection direction is on the side opposite to the side on which the housing 14 is located. Regarding the shift amount of the projection image, since the presence of "vignetting" of the projection image and the magnitude of the "vignetting" change in accordance with the "lens posture", the shift amount of the projection image is preferably changed in accordance with the presence of "vignetting" and the magnitude of "vignetting". That is, as the "vignetting" is larger, the shift amount of the projection image is increased to reduce the "vignetting" of the projection image.

In the example illustrated in FIG. 74, the "vignetting" when the projection lens projects the projection image to the side of the 1A direction is larger than the "vignetting" when the projection lens projects the projection image to the side of the 1B direction and the side of the 2A direction, and the "vignetting" does not occur when the projection lens projects the projection image to the side of the 2B direction.

Thus, when the projection lens 3 performs projection to the side of the 1A direction, the shift amount of the projection lens 3 is made larger than that when the projection lens 3 performs projection to the side of the 1B direction. The shift amount of the projection lens 3 is made larger when the projection lens 3 performs projection to the side of the 2A direction than that when the projection lens 3 performs projection to the side of the 2B direction. Similarly, the shift amount of the projection lens 3 is made larger when the projection lens 3 performs projection to the side of the 1B direction than that when the projection lens 3 performs projection to the side of the 2B direction.

In the example illustrated in FIG. 74, the shift amount when the projection lens 3 projects the projection image to the side of the 1A direction is +3, the shift amount when the projection lens 3 projects the projection image to the side of the 1B direction and to the side of the 2A direction is +2.5, and the shift amount when the projection lens 3 projects the projection image to the side of the 2B direction is +2. The numerical values (+3, +2.5, and +2) indicating the shift amounts are numerical values indicating relative magnitudes of the shift amounts.

The shift amount of the projection image is not limited to the case where the shift amount is changed in accordance with the "lens posture". For example, when the zoom optical system of the projection lens 3 is in a wide angle state, the shift amount may be larger than that when the zoom optical system is in a telephoto state.

Rotation Correction and Shift Correction of Image

FIGS. 75 to 78 are tables summarizing rotation correction and shift correction of an image.

FIG. 75A, FIG. 75B, FIG. 76A, and FIG. 76B illustrate rotation correction, shift correction, and so forth of an image for each of twelve lens postures when the projection apparatus main body 2 is horizontally placed, and FIG. 77A, FIG. 77B, FIG. 78A, and FIG. 78B illustrate rotation correction, shift correction, and so forth of an image for each of twelve lens postures when the projection apparatus main body 2 is vertically placed.

When the lens posture number of the projection lens 3 is No. 1, the projection lens 3 is in the housed state in which projection is not possible, and thus rotation correction and shift correction of an image are not performed.

According to FIG. 75A, FIG. 75B, FIG. 76A, and FIG. 76B, when the projection apparatus main body 2 is horizontally placed and the lens posture numbers of the projection lens 3 are Nos. 11 and 12, the projection images are projected on the top surface and the floor surface, respectively, and the "shift amounts" in this case are each +1. This is because "vignetting" of the projection image does not occur in the case of the "lens postures" of the lens posture Nos. 11 and 12.

Similarly, according to FIG. 77A, FIG. 77B, FIG. 78A, and FIG. 78B, when the projection apparatus main body 2 is vertically placed and the lens posture Numbers of the projection lens 3 are Nos. 2 and 3, the projection image is projected on the floor surface, and when the lens posture numbers are Nos. 8 to 10, the projection image is projected on the top surface. The "shift amounts" in the former case are each +1.5, and the "shift amounts" in the latter case are each +1. These "shift amounts" are merely examples, and the shift amounts are not limited thereto. Further, a "shift amount" may be fixed to the maximum value of a shift allowable range. Furthermore, an aspect in which shift correction is not performed may be considered depending on the "lens posture".

When the projection apparatus main body 2 is horizontally placed, the projection apparatus main body 2 is installed with the horizontal placement leg portions 12 facing the floor surface side (FIG. 1); however, the horizontal placement leg portions 12 may be disposed to face the top surface side.

When the projection apparatus main body 2 is installed with the horizontal placement leg portions 12 facing the top surface side, the rotation correction amount of an OSD image needs to be rotated by ±180° as compared to the case where the horizontal placement leg portions 12 are disposed to face the floor surface side, and similarly, the correction amount of a projection image needs to be rotated by ±180° as compared to the case where the horizontal placement leg portions 12 are disposed to face the floor surface side. The "main body posture" when the projection apparatus main body 2 is installed with the horizontal placement leg portions 12 facing the top surface side can be detected by the main body posture detection unit 23 constituted of an acceleration sensor.

Figure 79:
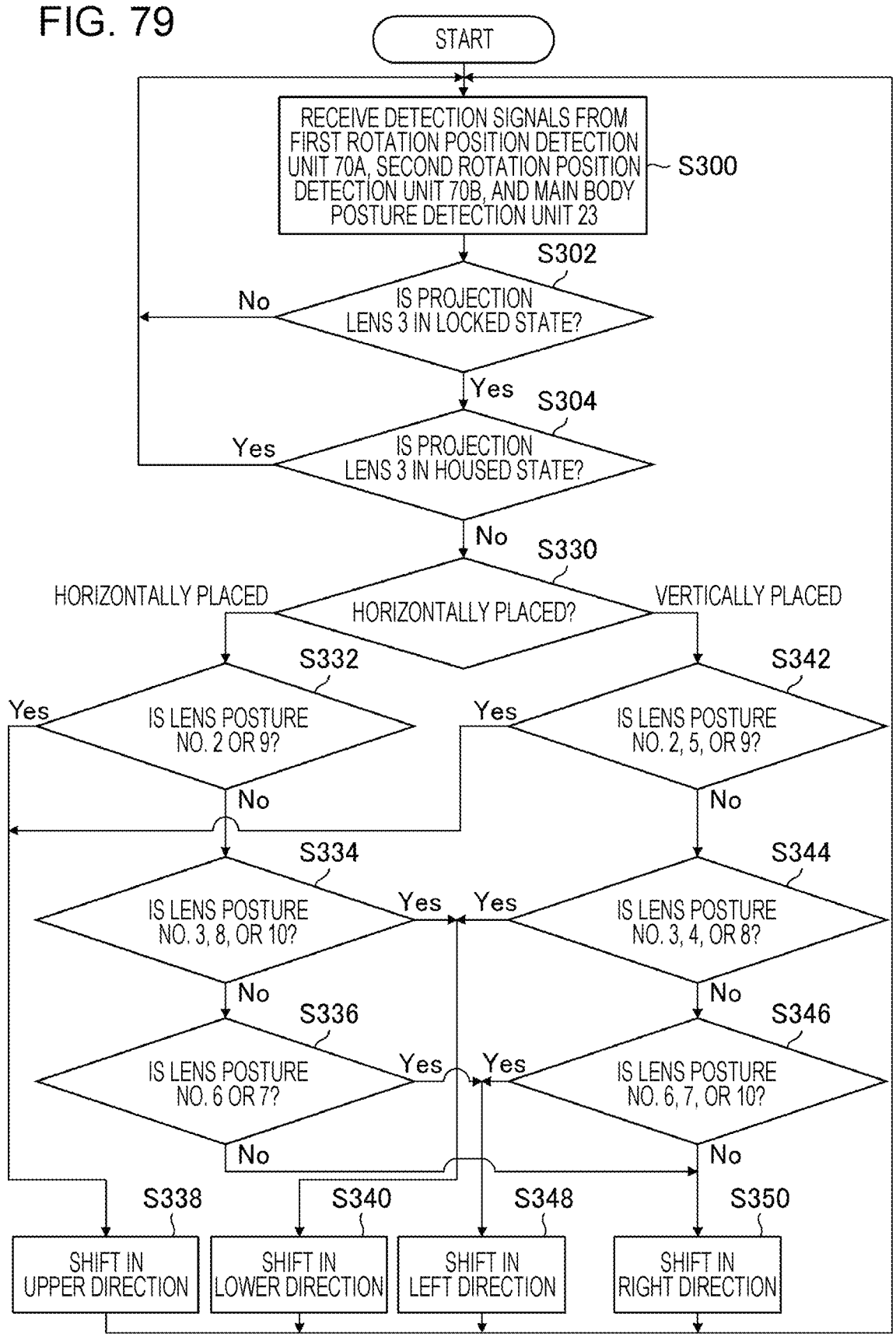
FIG. 79 is a flowchart illustrating an embodiment of shift correction of an image by the CPU and a shift control unit.

FIG. 79 is a flowchart illustrating an embodiment of shift correction of an image by the CPU 210 and the shift control unit 262. Note that the same step numbers are applied to portions common to those in the flowchart illustrating the embodiment of "rotation correction of image" illustrated in FIG. 58, and detailed description thereof is omitted.

In FIG. 79, when the CPU 210 functioning as the control unit that performs shift correction of an image determines that the projection lens 3 is in the locked state and that the projection lens 3 is not in the housed state by processing of steps S300, S302, and S304, the CPU 210 subsequently determines whether or not the "main body posture" is horizontal placement (step S330). The "main body posture" can be determined using a detection signal from the main body posture detection unit 23.

When the "main body posture" is horizontal placement, the CPU 210 determines whether or not the current "lens posture" is included in the lens posture Nos. 2 and 9 (step S332).

When the shift control unit 262 that functions as a control unit that performs shift correction of an image receives, from the CPU 210, a determination result that the "lens posture" is included in the lens posture Nos. 2 and 9, the shift control unit 262 controls driving of the lens shift mechanism 80 to shift the projection image in the upper direction (in the upper direction in the definition of the "shift correction direction") (step S338).

When the current "lens posture" is not included in the lens posture Nos. 2 and 9, the CPU 310 determines whether or not the "lens posture" is included in the lens posture Nos. 3, 8, and 10 (step S334). When the shift control unit 262 receives the determination result that the "lens posture" is included in the lens posture Nos. 3, 8, and 10 from the CPU 210, the shift control unit 262 controls driving of the lens shift mechanism 80 to shift the projection image in the lower direction defined by the "shift correction direction" (step S340).

When the current "lens posture" is not included in the lens posture Nos. 3, 8, and 10, the CPU 210 determines whether or not the current "lens posture" is included in the lens posture Nos. 6 and 7 (step S336). When the shift control unit 262 receives the determination result that the "lens posture" is included in the lens posture Nos. 6 and 7 from the CPU 210, the shift control unit 262 controls driving of the lens shift mechanism 80 to shift the projection image in the left direction defined by the "shift correction direction" (step S348).

When the current "lens posture" does not correspond to any lens posture number through the determination in steps S332, S334, and S336 (in step S336 (in the case of "NO")), the current "lens posture" is one of the remaining lens posture Nos. 4, 5, 11, and 12. In this case, the shift control unit 262 controls driving of the lens shift mechanism 80 to shift the projection image in the right direction defined by the "shift correction direction" (step S350).

In contrast, in step S330, when the CPU 210 determines that the "main body posture" is vertical placement, the CPU 210 determines whether or not the current "lens posture" is included in the lens posture Nos. 2, 5, and 9 (step S342).

When the shift control unit 262 receives the determination result that the "lens posture" is included in the lens postures No. 2, No. 5, and No. 9 from the CPU 210, the shift control unit 262 controls driving of the lens shift mechanism 80 to shift the projection image in the upper direction defined by the "shift correction direction" (step S338).

When the current "lens posture" is not included in the lens posture Nos. 2, 5, and 9, the CPU 210 determines whether or not the current "lens posture" is included in the lens posture Nos. 3, 4, and 8 (step S344). When the shift control unit 262 receives the determination result that the "lens posture" is included in the lens posture Nos. 3, 4, and 8 from the CPU 210, the shift control unit 262 controls driving of the lens shift mechanism 80 to shift the projection image in the lower direction defined by the "shift correction direction" (step S340).

When the current "lens posture" is not included in the lens posture Nos. 3, 4, and 8, the CPU 210 determines whether or not the current "lens posture" is included in the lens posture Nos. 6, 7, and 10 (step S346). When the shift control unit 262 receives the determination result that the "lens posture" is included in the lens posture Nos. 6, 7, and 10 from the CPU 210, the shift control unit 262 controls driving of the lens shift mechanism 80 to shift the projection image in the left direction defined by the "shift correction direction" (step S348).

When the current "lens posture" does not correspond to any lens posture number through the determination in steps S342, S344, and S346 (in step S346 (in the case of "NO")), the current "lens posture" is one of the remaining lens posture Nos. 11 and 12. In this case, the shift control unit 262 controls driving of the lens shift mechanism 80 to shift the projection image in the right direction defined by the "shift correction direction" (step S350).

In the embodiment illustrated in FIG. 79, the shift correction is performed on the projection image based on the determination results of the "lens posture" and the "main body posture"; however, information on the shift correction direction of a projection image may be acquired from a table for shift correction. In the table for shift correction, a relationship between a plurality of "lens postures" and "main body postures" being selectable when a projection image determined using the respective detection signals of the first rotation position detection unit 70A, the second rotation position detection unit 70B, and the main body posture detection unit 23 is projected, and a shift correction direction (including a shift amount) of the projection image is registered in advance. Then, information on the shift correction direction of the projection image may be acquired from the table based on the respective detection signals of the first rotation position detection unit 70A, the second rotation position detection unit 70B, and the main body posture detection unit 23.

Each of the detection units including the first rotation position detection unit 70A, the second rotation position detection unit 70B, and the main body posture detection unit 23 also includes a reception unit that receives instructions of the "lens posture" and the "main body posture" from the user.

Further, in the present embodiment, when the shift correction of a projection image is performed, the projection lens is moved in the plane intersecting with the axial direction of the rotation axis (first rotation axis) of the projection lens. However, the projection lens may not be moved, and the DMD (electro-optical element) side that emits a projection image to the projection lens may be moved. In short, it is sufficient that the projection lens and the electro-optical element are moved relative to each other.

Although the embodiments and other aspects of the present invention have been described above, the present invention is not limited to the above-described embodiments and aspects, and various modifications can be made without departing from the spirit of the present invention. Also, the embodiments and aspects described above may be combined.

Modification of Locking Mechanism

The first locking mechanism 60A and the second locking mechanism 60B employed in the projection apparatus 1 according to the above-described embodiment are examples of the locking mechanism. It is sufficient that the first locking mechanism 60A is configured to lock the second holder 40 at a desired position. Similarly, it is sufficient that the second locking mechanism 60B is configured to lock the third holder 50 at a desired position. For example, a pin and a pin hole may be used for locking.

Modification of Lens Shift Mechanism

The lens shift mechanism 80 employed in the projection apparatus 1 according to the above-described embodiment is an example of a shift unit. The shift unit is not limited to a unit that shifts the entire projection lens, and may be a unit that shifts a portion of the projection lens, or may be a unit that shifts the image display unit 22 with respect to the projection lens 3. Instead of the lens shift mechanism 80 configured as described above, a known shift mechanism may be employed.

REFERENCE SIGNS LIST 1 projection apparatus
2 projection apparatus main body
3 projection lens
6 main body operating unit
6A power supply switch
6B MENU key
6C cross key
6D ENTER key
6E BACK key
7 air supply portion
8 exhaust portion
9 power supply connector
10 video input terminal
11 unlocking operating unit
11A first unlocking switch
11B second unlocking switch
12 horizontal placement leg portion
13 vertical placement leg portion
14 housing
14A housing front portion
14B housing rear portion
14C housing left side portion
14D housing right side portion
14E housing top portion
14F housing bottom portion
15 recessed portion
15A inner wall surface
15a recess
18 lens cover
18A lens cover front portion
18D lens cover right side portion
18E lens cover top portion
18F lens cover bottom portion
20 light source unit
20A laser light source
20B fluorescent body wheel
20C mirror
20D color wheel
21 Illumination unit
21A rod integrator
21B lens
21C lens
21D lens
21E mirror
21F mirror
22 video display unit
22A total reflection prism
22B DMD
23 main body posture detection unit
30 lens barrel
31 first holder
32 fixed frame
32A flange portion
32B straight groove
32C first support roller
32D claw portion guide groove
32E first locking groove portion
33 cam frame
33A first cam groove
33B second cam groove
34 first lens holding frame
35 second lens holding frame
35A first cam pin
35B second cam pin
36 third lens holding frame
37 zoom gear frame
37A gear portion
38 zoom motor
38A zoom driving gear
38B bracket
40 second holder
41 first rotating frame
41A first guide groove
42 first mirror holding frame
43 lens holding frame
43A second guide groove
50 third holder
51 second rotating frame
51A second support roller
51B claw portion guide groove
51C second locking groove portion
52 second mirror holding frame
53 helicoid frame
53A female helicoid portion
54 final lens holding frame
55 focus lens holding frame
55A male helicoid portion
55B connecting pin
56 focus gear frame
56A gear portion
58 focus motor
58A focus driving gear
58B bracket
60 locking mechanism
60A first locking mechanism
60B second locking mechanism
61A first locking claw
61B second locking claw
62A first locking claw main body
62B second locking claw main body
63A arm portion
64A claw portion
64B claw portion
65A connecting portion
65B connecting portion
66A long hole
66B long hole
67A screw
67B screw
68A first solenoid
68B second solenoid 68a plunger
68b plunger
70A first rotation position detection unit
70B second rotation position detection unit
71A first optical scale
71B second optical scale
72A first reading sensor
72B second reading sensor
80 lens shift mechanism
81 base plate
81A base opening
81C first slide rail
82 first slide plate
82A first opening
82B first groove portion
82C second slide rail
83 second slide plate
83A second opening
83B second groove portion
83M mount portion
84 first slide plate driving mechanism
85 second slide plate driving mechanism
86 first shift motor
86A first driving shaft
87 first rotating shaft
87A first screw portion
88 first moving piece
88A first moving piece main body
88B first connecting portion
89 first worm gear
89A first worm
89B first worm wheel
90 second shift motor
90A second driving shaft
91 second rotating shaft
91A second screw portion
92 second moving piece
92A second moving piece main body
92B second connecting portion
93 second worm gear
93A second worm
93B second worm wheel
98 projection image
99A OSD image
99B OSD image
99C OSD image
99D OSD image
99E OSD image
99F OSD image
G1 first optical system
G11 first optical system first lens group
G12 first optical system second lens group
G13 first optical system third lens group
G14 first optical system fourth lens group
G2 second optical system
G21 second optical system first lens group
G22 second optical system second lens group
G3 third optical system
G31 third optical system first lens group
G32 third optical system second lens group
G33 third optical system third lens group
R1 first mirror
R2 second mirror
S100 to S270 each step of control relating to projection lens
S300 to S350 each step of control relating to projection lens
X arrow
Y arrow
Z1 first optical axis
Z2 second optical axis
Z3 third optical axis
α first direction
β second direction
θ1 first rotating shaft
θ2 second rotating shaft

What is claimed is:

1. A projection apparatus comprising:
a housing;
a power supply;
a projection lens attached to the housing, the projection lens having a holder and a locking mechanism unit that brings rotation of the holder into a locked state or an unlocked state;
a light source;
a light source control unit that controls the light source; and
an emission optical system that is provided in the projection lens and that emits light from the light source,
wherein the projection lens is displaceable between a first position at which the emission optical system faces the housing and a second position other than the first position by rotation of the holder, and
wherein, when the power supply has been turned on, the light source control unit does not turn on the light source when the projection lens is at the first position, and turns on the light source when the projection lens is at the second position.

2. The projection apparatus according to claim 1,
wherein the locking mechanism unit has a moving portion configured to be movable and an urging portion that urges the moving portion,
wherein the moving portion moves in the locking mechanism unit to switch rotation of the holder between the locked state and the unlocked state, and
wherein, when the power supply has been turned off with rotation of the holder being in the locked state, the urging portion urges the moving portion to a position of the locked state such that rotation of the holder is in the locked state when the power supply has been turned on.

3. The projection apparatus according to claim 2,
wherein the locking mechanism unit has a groove, and
wherein the moving portion moves in the groove to switch rotation of the holder between the locked state and the unlocked state.

4. The projection apparatus according to claim 1, wherein the power supply is not turned off when an instruction to turn off the power supply has been input and the locking mechanism unit is not able to bring rotation of the holder into the locked state.

5. The projection apparatus according to claim 1, further comprising:
an unlocking switch that unlocks the locked state,
wherein the light source is turned on when the unlocking switch has been input.

6. The projection apparatus according to claim 1,
wherein the holder has a second holder and a third holder,
wherein the locking mechanism unit has a first locking mechanism unit that brings rotation of the second holder into a locked state or an unlocked state, and a second locking mechanism unit that brings rotation of the third holder into a locked state or an unlocked state, and wherein, when one of the second holder and the third holder is in an unlocked state, the locking mechanism unit brings the other into a locked state.

7. The projection apparatus according to claim 1, wherein the power supply is not turned on when an instruction to turn on the power supply has been input and the locking mechanism unit is in the unlocked state.

8. The projection apparatus according to claim 1,
wherein the holder comprises
a first holder that is connected to the housing and through which light of a first optical axis passes, and
a second holder through which light of a second optical axis obtained by bending light of the first optical axis passes,
wherein the second holder rotates with respect to the housing, and
wherein the locking mechanism unit brings rotation of the second holder into the locked state or the unlocked state.

9. The projection apparatus according to claim 1, wherein, in the unlocked state, a user is able to perform a rotation operation of the holder.

10. The projection apparatus according to claim 2, wherein the power supply is not turned off when an instruction to turn off the power supply has been input and the locking mechanism unit is not able to bring rotation of the holder into the locked state.

11. The projection apparatus according to claim 3, wherein the power supply is not turned off when an instruction to turn off the power supply has been input and the locking mechanism unit is not able to bring rotation of the holder into the locked state.

12. The projection apparatus according to claim 2,
wherein the holder has a second holder and a third holder,
wherein the locking mechanism unit has a first locking mechanism unit that brings rotation of the second holder into a locked state or an unlocked state, and a second locking mechanism unit that brings rotation of the third holder into a locked state or an unlocked state, and
wherein, when one of the second holder and the third holder is in an unlocked state, the locking mechanism unit brings the other into a locked state.

13. The projection apparatus according to claim 3,
wherein the holder has a second holder and a third holder,
wherein the locking mechanism unit has a first locking mechanism unit that brings rotation of the second holder into a locked state or an unlocked state, and a second locking mechanism unit that brings rotation of the third holder into a locked state or an unlocked state, and
wherein, when one of the second holder and the third holder is in an unlocked state, the locking mechanism unit brings the other into a locked state.

14. The projection apparatus according to claim 4,
wherein the holder has a second holder and a third holder,
wherein the locking mechanism unit has a first locking mechanism unit that brings rotation of the second holder into a locked state or an unlocked state, and a second locking mechanism unit that brings rotation of the third holder into a locked state or an unlocked state, and
wherein, when one of the second holder and the third holder is in an unlocked state, the locking mechanism unit brings the other into a locked state.

15. The projection apparatus according to claim 1,
wherein the holder has a second holder and a third holder,
wherein the locking mechanism unit has a first locking mechanism unit that brings rotation of the second holder into a locked state or an unlocked state, and a second locking mechanism unit that brings rotation of the third holder into a locked state or an unlocked state, and
wherein, when one of the second holder and the third holder is in an unlocked state, the locking mechanism unit brings the other into a locked state.

16. The projection apparatus according to claim 6,
wherein the holder has a second holder and a third holder,
wherein the locking mechanism unit has a first locking mechanism unit that brings rotation of the second holder into a locked state or an unlocked state, and a second locking mechanism unit that brings rotation of the third holder into a locked state or an unlocked state, and
wherein, when one of the second holder and the third holder is in an unlocked state, the locking mechanism unit brings the other into a locked state.

17. The projection apparatus according to claim 1,
wherein the holder has a second holder and a third holder,
wherein the locking mechanism unit has a first locking mechanism unit that brings rotation of the second holder into a locked state or an unlocked state, and a second locking mechanism unit that brings rotation of the third holder into a locked state or an unlocked state, and
wherein, when one of the second holder and the third holder is in an unlocked state, the locking mechanism unit brings the other into a locked state.

18. A projection apparatus comprising:
a housing;
a power supply; and
a projection lens attached to the housing, the projection lens having a holder and a locking mechanism unit that brings rotation of the holder into a locked state or an unlocked state,
wherein rotation of the holder is in the locked state when the power supply has been turned on,
wherein the locking mechanism unit has a moving portion configured to be movable and an urging portion that urges the moving portion,
wherein the moving portion moves in the locking mechanism unit to switch rotation of the holder between the locked state and the unlocked state, and
wherein, when the power supply has been turned off with rotation of the holder being in the locked state, the urging portion urges the moving portion to a position of the locked state such that rotation of the holder is in the locked state when the power supply has been turned on.

19. A projection apparatus comprising:
a housing;
a power supply; and
a projection lens attached to the housing, the projection lens having a holder and a locking mechanism unit that brings rotation of the holder into a locked state or an unlocked state,
wherein rotation of the holder is in the locked state when the power supply has been turned on,
wherein the holder comprises
a first holder that is connected to the housing and through which light of a first optical axis passes, and
a second holder through which light of a second optical axis obtained by bending light of the first optical axis passes, wherein the second holder rotates with respect to the housing, and wherein the locking mechanism unit brings rotation of the second holder into the locked state or the unlocked state.

* * * * *